(12) United States Patent
Kozuma

(10) Patent No.: US 10,540,944 B2
(45) Date of Patent: Jan. 21, 2020

(54) SEMICONDUCTOR DEVICE COMPRISING REGISTER

(71) Applicant: Semiconductor Energy Laboratory Co., Ltd., Atsugi-shi, Kanagawa-ken (JP)

(72) Inventor: Munehiro Kozuma, Kanagawa (JP)

(73) Assignee: Semiconductor Energy Laboratory Co., Ltd., Atsugi-shi, Kanagawa-ken (JP)

( * ) Notice: Subject to any disclaimer, the term of this patent is extended or adjusted under 35 U.S.C. 154(b) by 34 days.

(21) Appl. No.: 15/709,929

(22) Filed: Sep. 20, 2017

(65) Prior Publication Data

US 2018/0090111 A1 Mar. 29, 2018

(30) Foreign Application Priority Data

Sep. 29, 2016 (JP) .................. 2016-191171

(51) Int. Cl.
*G09G 5/395* (2006.01)
*G06F 13/16* (2006.01)
*G06F 3/06* (2006.01)
*G09G 3/3208* (2016.01)
*G09G 3/36* (2006.01)

(52) U.S. Cl.
CPC ............. *G09G 5/395* (2013.01); *G06F 3/061* (2013.01); *G06F 3/0685* (2013.01); *G06F 13/1668* (2013.01); *G09G 3/3208* (2013.01); *G09G 3/36* (2013.01)

(58) Field of Classification Search
CPC .... G09G 5/395; G09G 3/2092; G09G 3/3225; G09G 3/3648; G09G 3/3208; G09G 3/36; G09G 2300/0426; G09G 2330/027; G09G 2370/08; G06F 3/0685; G06F 3/061; G06F 13/1668; Y02D 10/14
See application file for complete search history.

(56) References Cited

U.S. PATENT DOCUMENTS

2003/0052869 A1 3/2003 Fujii et al.
2010/0194427 A1* 8/2010 Kobayakawa ... H03K 19/01858
326/27

(Continued)

FOREIGN PATENT DOCUMENTS

JP 2003-157026 A 5/2003
JP 2011-141522 A 7/2011

(Continued)

*Primary Examiner* — Maurice L. McDowell, Jr.
*Assistant Examiner* — Donna J. Ricks
(74) *Attorney, Agent, or Firm* — Fish & Richardson P.C.

(57) ABSTRACT

A small semiconductor device is provided. The semiconductor device includes a register, switches, a memory circuit, a controller, and a display. An output terminal of the register is electrically connected to two or more of the switches. The switches are electrically connected to the memory circuit. The register has a function of retaining data corresponding to a parameter used when the controller operates. The switches have a function of selecting the memory circuit to which the data retained in the register is to be output. The memory circuit has a function of retaining the data output from the register. The controller has a function of reading the data retained in the memory circuit to control operation of the display.

12 Claims, 29 Drawing Sheets

(56) References Cited

U.S. PATENT DOCUMENTS

| | | |
|---|---|---|
| 2011/0090183 A1 | 4/2011 | Yamazaki et al. |
| 2011/0090207 A1 | 4/2011 | Yamazaki et al. |
| 2011/0156027 A1 | 6/2011 | Yamazaki et al. |
| 2013/0070515 A1* | 3/2013 | Mayhew ............ G11C 13/0002 365/148 |
| 2013/0191673 A1* | 7/2013 | Koyama ................ G06F 1/26 713/324 |
| 2014/0269014 A1* | 9/2014 | Ohmaru ................ G11C 11/24 365/149 |
| 2014/0368235 A1 | 12/2014 | Aoki et al. |

FOREIGN PATENT DOCUMENTS

| | | | | |
|---|---|---|---|---|
| JP | 2011-141524 A | | 7/2011 | |
| JP | 2011-151383 A | | 8/2011 | |
| JP | 2014142805 A | * | 8/2014 | ............ G06F 15/78 |
| JP | 2016-105595 A | | 6/2016 | |

* cited by examiner

SEMICONDUCTOR DEVICE COMPRISING REGISTER

BACKGROUND OF THE INVENTION

1. Field of the Invention

One embodiment of the present invention relates to a semiconductor device, a method for operating the semiconductor device, and an electronic device.

Note that one embodiment of the present invention is not limited to the above technical fields. The technical fields of the invention disclosed in this specification and the like relate to an object, a method, or a manufacturing method. Furthermore, one embodiment of the present invention relates to a process, a machine, manufacture, or a composition of matter.

Specifically, examples of the technical field of one embodiment of the present invention disclosed in this specification and the like include a semiconductor device, a display device, an electronic device, a method for operating any of them, and a method for manufacturing any of them. In this specification and the like, a semiconductor device generally means a device that can function by utilizing semiconductor characteristics.

2. Description of the Related Art

A semiconductor device having a function of backing up data retained in a register to a nonvolatile memory device has been proposed (Patent Document 1). In Patent Document 1, the data backed up to the nonvolatile memory device is recovered to a volatile memory device.

A technique for using a metal oxide transistor (or a metal oxide semiconductor transistor; hereinafter referred to as an OS transistor) for a display device such as a liquid crystal display or an organic electroluminescent (EL) display has been proposed. An OS transistor has an extremely low off-state current. With use of this, a technique for reducing refresh frequency in displaying still images and reducing power consumption of liquid crystal displays or organic EL displays has been disclosed (Patent Document 2 and Patent Document 3). Note that the above-described technique for reducing the power consumption of the display device is referred to as idling stop or IDS driving (registered trademark) in this specification and the like.

An example of using an OS transistor for a nonvolatile memory device to utilize the extremely low off-state current has been disclosed (Patent Document 4).

A display device in which a reflective element and a light-emitting element are combined has been disclosed (Patent Document 5). The proposed display device achieves low power consumption and favorable display quality independent of the ambient-light environment by using the reflective element in a bright environment and the light-emitting element in a dark environment.

REFERENCE

Patent Document

[Patent Document 1] Japanese Published Patent Application No. 2016-105595
[Patent Document 2] Japanese Published Patent Application No. 2011-151383
[Patent Document 3] Japanese Published Patent Application No. 2003-157026
[Patent Document 4] Japanese Published Patent Application No. 2011-141522
[Patent Document 5] Japanese Published Patent Application No. 2011-141524

SUMMARY OF THE INVENTION

In a conventional semiconductor device including a setup register and a register chain, the register chain includes series-connected resisters the number of which is greater than or equal to the number of data corresponding to parameters necessary for operation or the like of the semiconductor device. Accordingly, the number of registers and the size of the semiconductor device increase with an increase in the number of data corresponding to the parameters.

Thus, an object of one embodiment of the present invention is to provide a semiconductor device in which the number of registers is smaller than the number of data corresponding to parameters. Another object of one embodiment of the present invention is to provide a small semiconductor device. Another object of one embodiment of the present invention is to provide a semiconductor device with low power consumption. Another object of one embodiment of the present invention is to provide a semiconductor device that operates through a simple process. Another object of one embodiment of the present invention is to provide a semiconductor device that operates at high speed. Another object of one embodiment of the present invention is to provide a novel semiconductor device. Another object of one embodiment of the present invention is to provide a novel method for operating a semiconductor device. Another object of one embodiment of the present invention is to provide a novel electronic device.

One embodiment of the present invention does not necessarily achieve all the objects listed above and only needs to achieve at least one of the objects. The description of the above objects does not preclude the existence of other objects. Other objects will be apparent from and can be derived from the description of the specification, the claims, the drawings, and the like.

One embodiment of the present invention is a semiconductor device that includes registers, switches, memory circuits, a controller, and a display. An output terminal of the register is electrically connected to two or more of the switches. The switches are electrically connected to the memory circuits. The register has a function of retaining data corresponding to a parameter used when the controller operates. The switches have a function of selecting the memory circuit to which the data retained in the register is to be output. The memory circuit has a function of retaining the data output from the register. The controller has a function of reading the data retained in the memory circuit to control operation of the display.

The above semiconductor device may include a first circuit and the first circuit may have a function of selecting the switch that is to be turned on.

In the above semiconductor device, the register may have a function of retaining data including information on the switch that is to be turned on.

In the above semiconductor device, the memory circuit may include a backup circuit, and the backup circuit may have a function of, when power supply to the memory circuit is stopped, retaining the data output from the register.

In the above semiconductor device, the backup circuit may include a transistor, and the transistor may include a metal oxide in a channel formation region.

Another embodiment of the present invention is an electronic device including the semiconductor device of one embodiment of the present invention and an operation button.

One embodiment of the present invention can provide a semiconductor device in which the number of registers is smaller than the number of data corresponding to parameters. One embodiment of the present invention can provide a small semiconductor device. One embodiment of the present invention can provide a semiconductor device with low power consumption. One embodiment of the present invention can provide a semiconductor device that operates through a simple process. One embodiment of the present invention can provide a semiconductor device that operates at high speed. One embodiment of the present invention can provide a novel semiconductor device. One embodiment of the present invention can provide a novel method for operating a semiconductor device. One embodiment of the present invention can provide a novel electronic device.

Note that the effects of one embodiment of the present invention are not limited to the above effects. The above effects do not preclude the existence of other effects. The other effects are not described above and will be described below. The other effects will be apparent from and can be derived from the description of the specification, the drawings, and the like by those skilled in the art. One embodiment of the present invention has at least one of the above effects and the other effects. Accordingly, one embodiment of the present invention does not have the above effects in some cases.

DETAILED DESCRIPTION OF THE INVENTION

Figure 1:
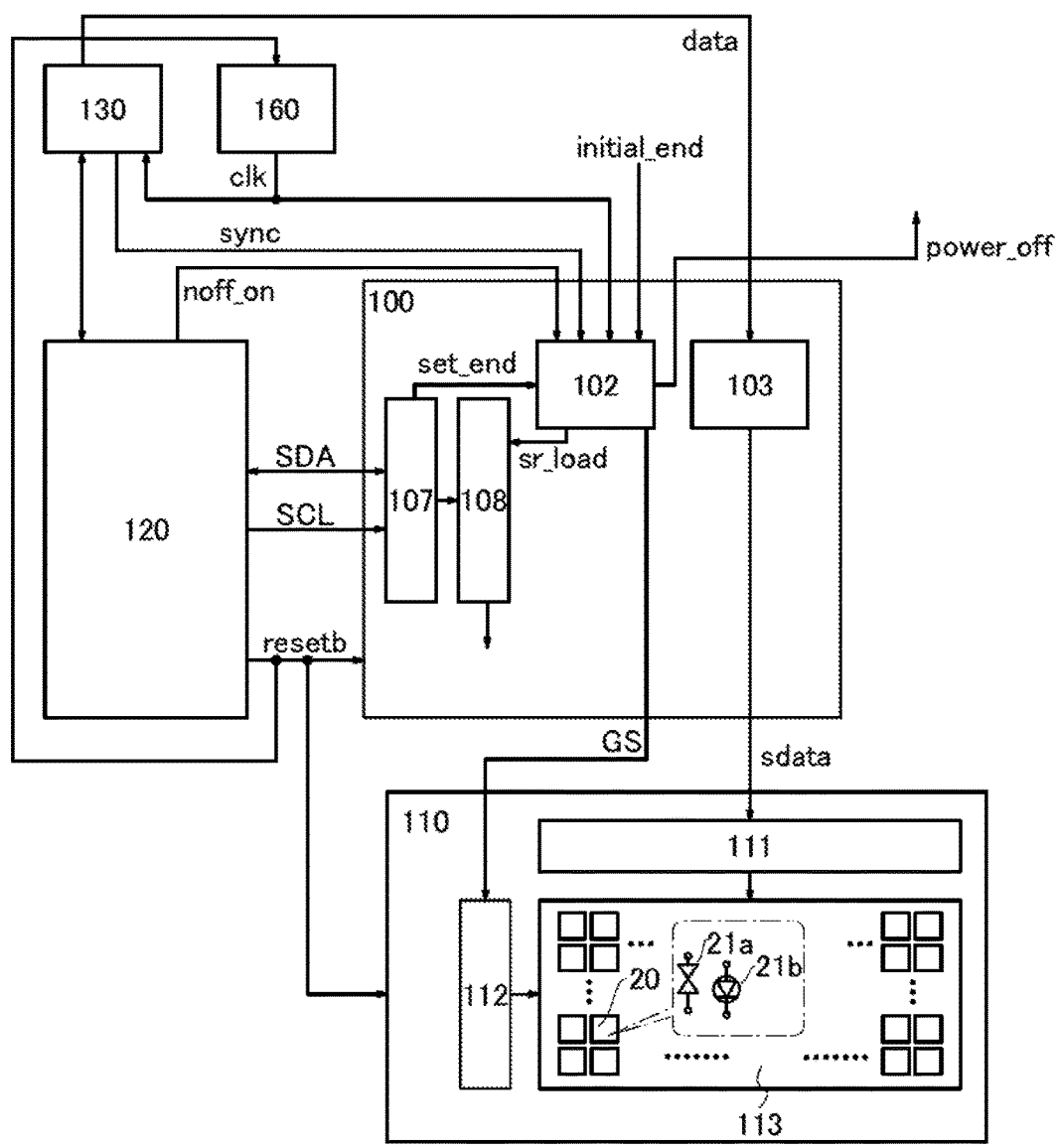
FIG. 1 is a block diagram illustrating a configuration example of a display device.

Hereinafter, embodiments will be described with reference to drawings. However, the embodiments can be implemented with various modes. It will be readily appreciated by those skilled in the art that modes and details can be changed in various ways without departing from the spirit and scope of the present invention. Thus, the present invention should not be interpreted as being limited to the following description of the embodiments. Any of the embodiments described below can be combined as appropriate.

In the drawings and the like, the size, the layer thickness, the region, or the like is exaggerated for clarity in some cases. Therefore, embodiments of the present invention are not limited to such a scale. Note that the drawings are schematic views showing ideal examples, and embodiments of the present invention are not limited to shapes or values shown in the drawings.

The same elements or elements having similar functions, elements formed using the same material, elements formed at the same time, or the like in the drawings and the like are denoted by the same reference numerals, and the description thereof is not repeated in some cases.

In this specification and the like, the terms "film" and "layer" can be interchanged with each other. For example, the term "conductive layer" can be changed into the term "conductive film" in some cases. Moreover, the term "insulating film" can be changed into the term "insulating layer" in some cases.

In this specification and the like, the term for describing arrangement, such as "over" or "below" does not necessarily mean that a component is placed "directly over" or "directly below" another component. For example, the expression "a gate electrode over a gate insulating layer" can mean the case where there is an additional component between the gate insulating layer and the gate electrode.

In this specification and the like, ordinal numbers such as "first", "second", and "third" are used in order to avoid confusion among components, and do not limit the number of components.

In this specification and the like, the term "electrically connected" includes the case where components are connected through an object having any electric function. There is no particular limitation on the "object having any electric function" as long as electric signals can be transmitted and received between components that are connected through the object. Examples of the "object having any electric function" include a switching element such as a transistor, a resistor, an inductor, a capacitor, and an element with a variety of functions as well as an electrode and a wiring.

In this specification and the like, "voltage" refers to a difference between a given potential and a reference potential (e.g., a ground potential) in many cases. Accordingly, voltage, potential, and potential difference can also be referred to as potential, voltage, and voltage difference, respectively.

In this specification and the like, a transistor is an element having at least three terminals of a gate, a drain, and a source. The transistor has a channel region between a drain (a drain terminal, a drain region, or a drain electrode) and a source (a source terminal, a source region, or a source electrode), and current can flow between the source and the drain through the channel formation region. Note that in this specification and the like, a channel region refers to a region through which current mainly flows.

Furthermore, the functions of a source and a drain might be switched when transistors having different polarities are employed or a direction of current flow is changed in circuit operation, for example. Therefore, the terms "source" and "drain" can be interchanged in this specification and the like.

Unless otherwise specified, off-state current in this specification and the like refers to drain current of a transistor in an off state (also referred to as a non-conduction state or a cutoff state). Unless otherwise specified, the off state of an n-channel transistor means that the voltage between its gate and source (Vgs: gate-source voltage) is lower than the threshold voltage Vth, and the off state of a p-channel transistor means that the gate-source voltage Vgs is higher than the threshold voltage Vth. That is, the off-state current of an n-channel transistor sometimes refers to drain current that flows when the gate-source voltage Vgs is lower than the threshold voltage Vth.

In the above description of off-state current, a drain may be replaced with a source. That is, the off-state current sometimes refers to current that flows through a source when a transistor is off In this specification and the like, the term "leakage current" sometimes expresses the same meaning as off-state current. In addition, in this specification and the like, the off-state current sometimes refers to current that flows between a source and a drain when a transistor is off.

In this specification and the like, a metal oxide is referred to as an OS in some cases. Thus, a transistor including a metal oxide in a channel formation region is referred to as a metal oxide transistor, an OS transistor, or an OS FET in some cases.

In this specification and the like, a metal oxide means an oxide of metal in a broad sense. Metal oxides are classified into an oxide insulator, an oxide conductor (including a transparent oxide conductor), an oxide semiconductor (also simply referred to as an OS), and the like. For example, a metal oxide used in a semiconductor layer of a transistor is called an oxide semiconductor in some cases. That is, in the case where a metal oxide has at least one of amplifying, rectifying, and switching effects, the metal oxide can be referred to as a metal oxide semiconductor (OS, for short). In addition, an OS FET is a transistor including a metal oxide or an oxide semiconductor.

In this specification and the like, a metal oxide including nitrogen is also called a metal oxide in some cases. Moreover, a metal oxide including nitrogen may be called a metal oxynitride.

In this specification and the like, "c-axis aligned crystal (CAAC)" or "cloud-aligned composite (CAC)" may be stated. CAAC refers to an example of a crystal structure, and CAC refers to an example of a function or a material composition.

In this specification and the like, a CAC-OS or a CAC metal oxide has a conducting function in a part of the material and has an insulating function in another part of the material; as a whole, the CAC-OS or the CAC metal oxide has a function of a semiconductor. In the case where the CAC-OS or the CAC metal oxide is used in a semiconductor layer of a transistor, the conducting function is to allow electrons (or holes) serving as carriers to flow, and the insulating function is to not allow electrons serving as carriers to flow. By the complementary action of the conducting function and the insulating function, the CAC-OS or the CAC metal oxide can have a switching function (on/off function). In the CAC-OS or CAC metal oxide, separation of the functions can maximize each function.

In this specification and the like, the CAC-OS or the CAC metal oxide includes conductive regions and insulating regions. The conductive regions have the above-described conducting function, and the insulating regions have the above-described insulating function. In some cases, the conductive regions and the insulating regions in the material are separated at the nanoparticle level. In some cases, the conductive regions and the insulating regions are unevenly distributed in the material. The conductive regions are observed to be coupled in a cloud-like manner with their boundaries blurred, in some cases.

Furthermore, in the CAC-OS or the CAC metal oxide, the conductive regions and the insulating regions each have a size of more than or equal to 0.5 nm and less than or equal to 10 nm, preferably more than or equal to 0.5 nm and less than or equal to 3 nm and are dispersed in the material, in some cases.

The CAC-OS or the CAC metal oxide includes components having different band gaps. For example, the CAC-OS or the CAC metal oxide includes a component having a wide gap due to the insulating region and a component having a narrow gap due to the conductive region. In the case of such a composition, carriers mainly flow in the component having a narrow gap. The component having a narrow gap complements the component having a wide gap, and carriers also flow in the component having a wide gap in conjunction with the component having a narrow gap. Therefore, in the case where the above-described CAC-OS or the CAC metal oxide is used in a channel region of a transistor, high current drive capability in the on state of the transistor, that is, high on-state current and high field-effect mobility, can be obtained.

In other words, a CAC-OS or CAC metal oxide can be called a matrix composite or a metal matrix composite.

Embodiment 1

In this embodiment, a display device that is an example of a semiconductor device of one embodiment of the present invention, an operation method thereof, and a display system are described with reference to FIG. 1, FIG. 2, FIG. 3, FIG. 4, FIG. 5, FIG. 6, FIG. 7, FIGS. 8A and 8B, FIG. 9, FIGS. 10A and 10B, FIG. 11, FIG. 12, FIG. 13, and FIG. 14.

One embodiment of the present invention relates to a display device including a register chain and a setup register and an operation method of the display device. The register chain includes a plurality of registers. The setup register includes switches and memory circuits. An output terminal of one register is electrically connected to two or more switches. One switch is electrically connected to, for example, one memory circuit. When the register chain and the setup register have the above structure, the number of registers included in the register chain can be smaller than the number of data corresponding to parameters necessary for operation or the like of the display device, for example. As a result, the display device of one embodiment of the present invention can have a reduced size.

The memory circuit included in the setup register can include, for example, a volatile latch circuit and a nonvolatile backup circuit. The data corresponding to a parameter retained in the backup circuit is not lost even when power supply to the setup register is stopped. In the above manner, at the time of resumption of the power supply to the setup register that has been stopped, the data corresponding to a parameter set before the stop of the power supply can be immediately read from the backup circuit. Thus, restoration after the resumption of power supply can be performed at high speed. Owing to the structure in which the backup circuit, the latch circuit, and the like are provided in one memory circuit, data can be restored through a simple process at the time of the resumption of power supply to the setup register.

Note that the above backup circuit preferably includes OS transistors or other transistors having a lower off-state current than transistors whose semiconductor layers include silicon (hereinafter referred to as Si transistors). In that case, even when power supply is stopped, the data corresponding to a parameter written to the backup circuit can be retained for a long time.

FIG. 1 is a block diagram illustrating a configuration example of a display device 10 that is a display device of one embodiment of the present invention. In other words, FIG. 1 is a block diagram illustrating an example of a display system of one embodiment of the present invention. The display device 10 includes a controller 100, a display 110, an arithmetic circuit 120, a memory circuit 130, and a clock signal generation circuit 160. Note that the clock signal generation circuit 160 may be provided in the controller 100.

The controller 100 is a circuit having a function of controlling the operation of the display 110. The display 110 has a function of displaying images. The arithmetic circuit 120 has a function of controlling the operation of the controller 100. In addition, the arithmetic circuit 120 has a function of generating image data corresponding to images to be displayed on the display 110.

The arithmetic circuit 120 also has a function of generating a data signal SDA and a clock signal SCL. The data signal SDA corresponds to a parameter used for, for example, defining the state of a circuit included in the controller 100. The clock signal SCL synchronizes with output of the data signal SDA. Note that the data signal SDA can be transmitted to a later-described register chain 107 using I²C, for example.

The arithmetic circuit 120 also has a function of generating a normally-off control signal noff_on. Although details will be described later, making the normally-off control signal noff_on active allows normally-off operation of the display device 10. Here, normally-off operation means stopping power supply to a circuit and the like included in the display device 10, for example. Note that even during the normally-off operation, power can be supplied to, for example, part of a circuit controlling power supply to the circuit and the like included in the display device 10, such as a later-described master controller 102.

In this specification and the like, setting a signal to a high potential makes the signal active, and setting the signal to a low potential makes the signal inactive. Furthermore, in this specification and the like, setting an inverted signal to a low potential makes the signal active, and setting an inverted signal to a high potential makes the signal inactive. In this specification and the like, a low potential can be a ground potential, for example. The logic of a signal and that of an inverted signal can be appropriately inverted.

The normally-off operation is preferably performed when the display 110 does not display images, for example. For example, the normally-off operation is preferably performed in a sleep mode. This reduces the power consumption of the display device 10.

The arithmetic circuit 120 also has a function of generating a reset inverted signal resetb. When the reset inverted signal resetb is active, a circuit included in the display device 10 can be reset. Here, resetting the circuit means, for example, setting a potential held by a flip-flop or the like in the circuit of the display device 10 to a reset potential when the in-circuit potential of the circuit is indefinite after turning on the display device 10.

The arithmetic circuit 120 may be a central processing unit (CPU), a digital signal processor (DSP), a graphics processing unit (GPU), or the like, which may be obtained with a programmable logic device (PLD) such as a field programmable gate array (FPGA) or a field programmable analog array (FPAA).

The memory circuit 130 has a function of retaining the image data that is generated by the arithmetic circuit 120 and outputting the image data to the controller 100 as image data data at a predetermined timing based on a frame period or the like. The memory circuit 130 also has a function of generating a start-of-frame signal sync. Here, the start-of-frame signal sync rises at the start of a frame. That is, the start-of-frame signal sync is set to a high potential at the start of a frame, for example. Note that the memory circuit 130 may have a function of retaining image data for two or more frames to compare the image data between the frames. Although not illustrated, the memory circuit 130 can include a controller, and for example, the start-of-frame signal sync can be generated by the controller.

The clock signal generation circuit 160 has a function of generating a clock signal clk. When the memory circuit 130 reads the image data data on the basis of the clock signal clk, for example, the image data data that is an output signal from the memory circuit 130 becomes a signal synchronizing with the clock signal clk. The controller 100 can operate on the basis of the clock signal clk.

The controller 100 includes the master controller 102, a data processing circuit 103, the register chain 107, and a setup register 108.

The master controller 102 is a circuit having a function of receiving the normally-off control signal noff_on from the arithmetic circuit 120, the start-of-frame signal sync from the memory circuit 130, and the clock signal clk from the clock signal generation circuit 160 and receiving a later-described output completion signal initial_end to control the operation of circuits included in the controller 100. The master controller 102 is a circuit having a function of generating a signal GS for controlling the operation of a later-described gate driver 112.

Although details will be described later, the master controller 102 also has a function of receiving a setting completion signal set_end from the register chain 107 to determine whether or not data setting to the register chain 107 is completed. Although details will be described later, the master controller 102 also has a function of making a signal sr_load active and outputting the signal sr_load to the setup register 108 after the data setting to the register chain 107 is completed, to enable the setup register 108 to read the data set to the register chain 107.

The master controller 102 is a circuit having a function of generating a power supply stop signal power_off for controlling whether to stop power supply to the circuit and the like included in the display device 10 or not. When the power supply stop signal power_off is active, power supply to the circuit and the like included in the display device 10 can be stopped. Note that even when the power supply stop signal power_off is active, power can keep being supplied to a portion of the master controller 102 that is necessary for generation of the power supply stop signal power_off.

The data processing circuit 103 has a function of receiving the image data data from the memory circuit 130 and performing image processing, correction processing, and the like on the image data data. Furthermore, in the case where the image data data is compressed image data, the data processing circuit 103 has a function of decoding the image data data to decompress it. Note that the image data output from the data processing circuit 103 is image data sdata.

The register chain 107 is a circuit having a function of transmitting a parameter that corresponds to the data signal SDA transmitted from the arithmetic circuit 120, to the setup register 108 in synchronization with the clock signal SCL generated by the arithmetic circuit 120. The register chain 107 also has a function of generating the setting completion signal set_end. At the time of completion of the parameter transmission to the setup register 108, for example, a pulse signal (e.g., a high-potential pulse signal) is output as the setting completion signal set_end, which allows the master controller 102 to recognize the completion of the parameter transmission to the setup register 108. Note that the register chain 107 can transmit a parameter to the setup register 108 in a serial manner.

The setup register 108 is a circuit having a function of retaining the data corresponding to the parameter transmitted from the register chain 107, and outputting the data to the circuits included in the controller 100, for example. The setup register 108 also has a function of receiving the signal sr_load from the master controller 102, for example. As described above, when the signal sr_load is active, the setup register 108 reads the parameter from the register chain 107, retains the data corresponding to the parameter, and then outputs the data to a circuit included in the controller 100, for example.

Although details are described later, the setup register 108 is provided with a backup circuit having a function of retaining data corresponding to a parameter even when power supply to the setup register 108 is stopped. Owing to this, at the time of resumption of the power supply to the setup register 108 by termination of the normally-off operation where the power supply is stopped, the circuit and the like included in the controller 100 can be immediately returned to the state before the power supply is stopped.

Note that the backup circuit can include OS transistors or other transistors having a lower off-state current than Si transistors.

A metal oxide has a band gap of 2.5 eV or higher; thus, leakage current of an OS transistor due to thermal excitation is low and, as described above, its off-state current is extremely low. A metal oxide used in a channel formation region is preferably a metal oxide containing at least one of indium (In) and zinc (Zn). Typical examples of such a metal oxide include an In-M-Zn oxide (the element M is, for example, a metal such as gallium, aluminum, silicon, titanium, germanium, boron, yttrium, copper, vanadium, beryllium, iron, nickel, zirconium, molybdenum, lanthanum, cerium, neodymium, hafnium, tantalum, tungsten, or magnesium). By reducing impurities serving as electron donors, such as moisture or hydrogen, and also reducing oxygen vacancies, an i-type (intrinsic) or substantially i-type metal oxide can be obtained. Here, such a metal oxide can be referred to as a highly purified metal oxide. By using a highly purified metal oxide, the off-state current of the OS transistor that is normalized by channel width can be as low as approximately several yoctoamperes per micrometer to several zeptoamperes per micrometer.

Note that a transistor that does not include a metal oxide may be used for the backup circuit as long as its off-state current is low. For example, a transistor including a wide-band-gap semiconductor may be used. The wide-band-gap semiconductor is a semiconductor whose band gap is 2.2 eV or more. Examples of the wide-band-gap semiconductor include silicon carbide, gallium nitride, and diamond.

The display 110 includes a source driver 111 and the gate driver 112. In the display 110, pixels 20 are arranged in matrix to form a pixel array 113. The pixel 20 is an active matrix element driven with a transistor and includes a reflective element 21a and a light-emitting element 21b. Note that the pixel 20 without the reflective element 21a may be employed. The pixel 20 without the light-emitting element 21b may also be employed. A more specific structure example of the pixel 20 will be described in Embodiment 2.

The reflective element 21a has a function of displaying images by reflecting external light, for example. The light-emitting element 21b has a function of displaying images with self-emitted light, for example.

The source driver 111 is a circuit having a function of receiving the image data sdata from the data processing circuit 103, performing digital-to-analog (D/A) conversion on the received image data sdata, and writing the image data into the pixel 20. The gate driver 112 is a circuit having a function of selecting the pixel 20 on the basis of the signal GS.

Note that the image data data can be an n-bit data signal (n is an integer of one or more). In that case, $2^n$ patterns of image data are possible as the image data written to the pixel 20. Accordingly, the pixels 20 can each produce $2^n$ patterns of gray levels. For example, when n is eight, the pixels 20 can each produce 256 patterns of gray levels. In other words, the luminance of the light reflected by the reflective element 21a and the luminance of the light emitted by the light-emitting element 21b can each have 256 levels.

Although details are described later, the pixel 20 preferably includes a transistor having a lower off-state current than a Si transistor, such as an OS transistor. In that case, the pixel 20 can retain image data for a long time. As a result, even if the number of times of writing image data into the pixel 20 in a certain period is small, the display 110 can keep displaying an image in accordance with the image data retained in the pixel 20. For example, without writing image data into the pixel 20 every frame, i.e., without performing refresh operation every frame, the display 110 can keep displaying an image in accordance with the image data retained in the pixel 20. This reduces the power consumption of the display device 10.

The structure of the display device 10 illustrated in FIG. 1 is merely an example and it is possible to add or omit a circuit as necessary or as appropriate. For example, the data processing circuit 103 can be omitted. In the case where the data processing circuit 103 is not provided, the source driver 111 can receive the image data data output from the memory circuit 130, for example.

Figure 2:
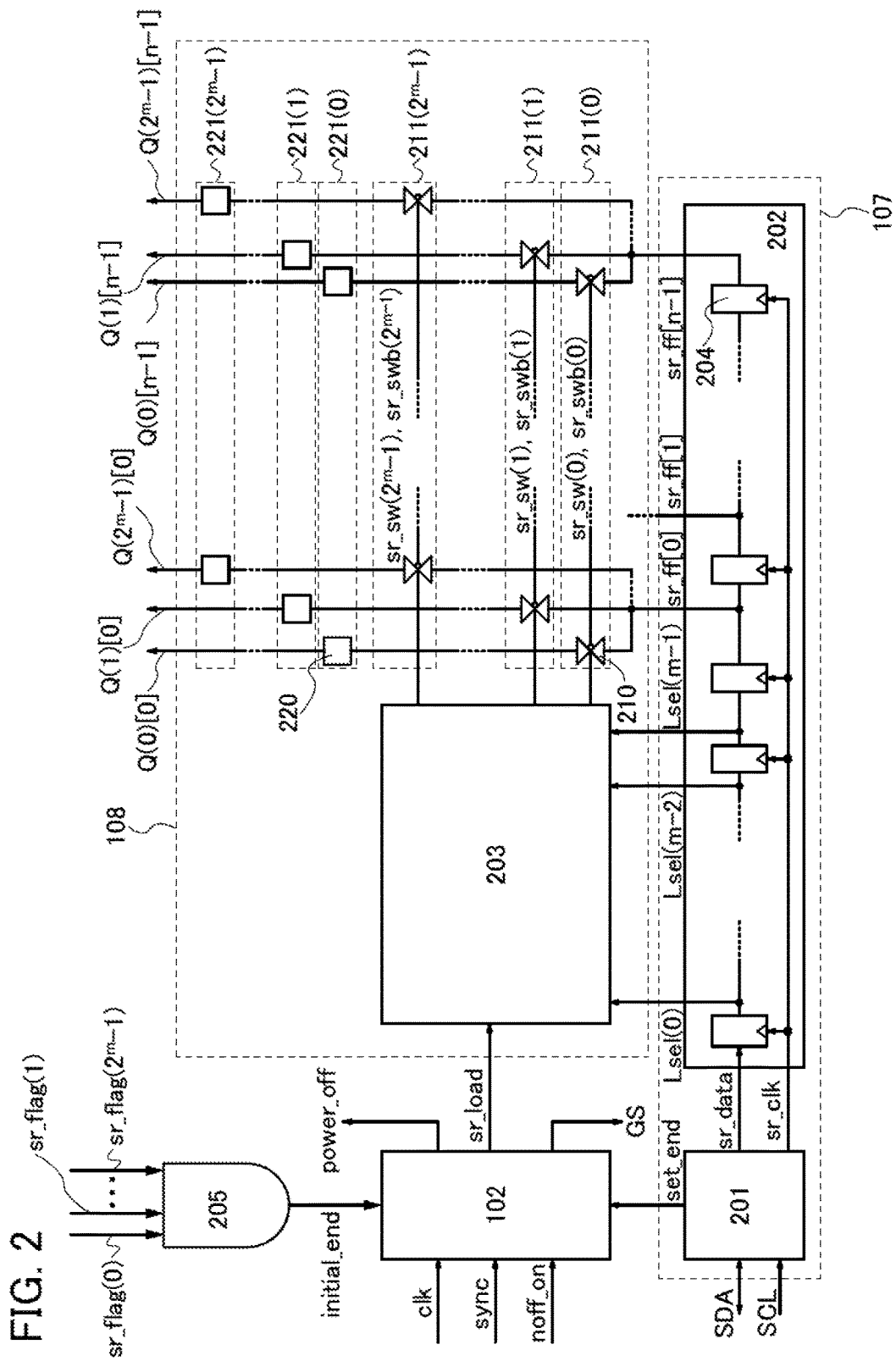
FIG. 2 is a block diagram illustrating a configuration example of a setup register control system.

FIG. 2 illustrates specific circuit configuration examples of the register chain 107 and the setup register 108. In addition to the register chain 107 and the setup register 108, the master controller 102 having a function of controlling operation of the register chain 107 and the setup register 108, and an AND circuit 205 having a function of outputting the output completion signal initial_end are illustrated in FIG. 2. In this specification and the like, a system that includes the register chain 107, the setup register 108, the master controller 102, and the AND circuit 205 illustrated in FIG. 2 is sometimes called a setup register control system.

The register chain 107 includes a controller 201 and a register portion 202. The register portion 202 includes a plurality of registers 204. The register 204 is, for example, a flip-flop circuit. The registers 204 are connected in series.

The controller 201 has a function of receiving the clock signal SCL, generating a clock signal sr_clk on the basis of the clock signal SCL, and outputting the clock signal sr_clk to the registers 204 to control operation of the registers 204. The controller 201 has a function of receiving the data signal SDA, generating a data signal sr_data on the basis of the data signal SDA, and outputting the data signal sr_data to the register 204. The data signal sr_data includes, for example, data corresponding to a later-described m-bit selection signal Lsel (m is an integer of one or more) and data corresponding to a later-described n-bit parameter signal sr_ff (n is an integer of one or more). Note that the parameter signal sr_ff is a signal corresponding to a parameter used for defining the state of a circuit or the like included in the controller 100 or the like.

In this specification and the like, the bits of the m-bit selection signal Lsel are referred to as selection signals Lsel(0) to Lsel(m−1), for example. In addition, in this specification and the like, the bits of the n-bit parameter signals sr_ff are referred to as parameter signals sr_ff[0] to sr_ff[n−1], for example.

The controller 201 has a function of generating the setting completion signal set_end and outputting the setting completion signal set_end to the master controller 102 to inform the master controller 102 of completion of parameter transmission to the setup register 108.

The register portion 202 has a function of retaining data corresponding to the selection signal Lsel and data corresponding to the parameter signal sr_ff. For example, one register 204 can retain 1-bit data. In other words, the register portion 202 includes m+n or more registers 204.

The setup register 108 includes the selection circuit 203 and a plurality of switch groups 211 and a plurality of memory circuit groups 221. One switch group 211 includes n switches 210. One memory circuit group 221 includes n memory circuits 220. Note that a CMOS transistor can be used as the switch 210, for example.

The selection circuit 203 has a function of selecting, for example, one switch group 211 in accordance with the logic of the selection signals Lsel(0) to Lsel(m−1) output from the registers 204. When the switch group 211 is selected, for example, the switches 210 included in the switch group 211 are turned on. The selection signals Lsel(0) to Lsel(m−1) can represent $2^m$ patterns of numbers in total and accordingly, the setup register 108 can include $2^m$ switch groups 211. Thus, the setup register 108 can include $2^m$ memory circuit groups 221.

In this specification and the like, for example, the $2^m$ switch groups 211 are distinguished from each other by being called switch groups 211(0) to 211($2^m$−1) in some cases. In this specification and the like, for example, the $2^m$ memory circuit groups 221 are distinguished from each other by being called memory circuit groups 221(0) to 221($2^m$−1) in some cases.

Note that the selection circuit 203 has a function of generating switch selection signals sr_sw(0) to sr_sw($2^m$−1) and switch selection inverted signals sr_swb(0) to sr_swb($2^m$−1) and outputting them to the switch groups 211. For example, the switch selection signal sr_sw(a) (a is an integer of greater than or equal to 0 and less than or equal to $2^m$−1) and the switch selection inverted signal sr_swb(a) can be output to the switch group 211(a). Here, the switch group 211(a) can be selected when the switch selection signal sr_sw(a) is set to a high potential to be active and the switch selection inverted signal sr_swb(a) is set to a low potential to be active. That is, the switch selection signal sr_sw(a) and the switch selection inverted signal sr_swb(a) can be made active to select the switch group 211(a) in the case where the selection signal Lsel(0) is the least significant bit (LSB), the selection signal Lsel(m−1) is the most significant bit (MSB), and a value represented by the selection signals Lsel(0) to Lsel(m−1) is a when given in decimal notation, for example.

For the switch group 211 that is not selected, the corresponding switch selection signal sr_sw can be set to a low potential to be inactive, and the corresponding switch selection inverted signal sr_swb can be set to a high potential to be inactive.

The operation of the selection circuit 203 can be controlled in accordance with the signal sr_load. For example, the selection circuit 203 can select the switch group 211 when the signal sr_load is active.

The register 204 has a function of retaining the parameter signal sr_ff. An output terminal of one register 204 is electrically connected to one switch 210 of each switch group. In other words, an output terminal of one register 204 is electrically connected to $2^m$ switches 210. One switch 210 is electrically connected to one memory circuit 220. For example, the switch 210 included in the switch group 211(a) is electrically connected to the memory circuit 220 included in the memory circuit group 221(a).

The switch 210 has a function of selecting the memory circuit 220 to which the parameter signal sr_ff is to be output. When the switch 210 is turned on, data corresponding to the parameter signal sr_ff is retained in the memory circuit 220 that is electrically connected to the switch 210.

The memory circuits 220 have a function of retaining data corresponding to the parameter signals sr_ff[0] to sr_ff[n−1] output from the register portion 202 and outputting the data to the outside of the setup register 108 (for example, to the circuits included in the controller 100). One memory circuit 220 can retain 1-bit data, for example. Since one memory circuit group 221 includes n memory circuits 220, one memory circuit group 221 can retain all the data corresponding to the parameter signals sr_ff[0] to sr_ff[n−1].

In this specification and the like, the data corresponding to the parameter signal sr_ff[b] (b is an integer of greater than or equal to 0 and less than or equal to $2^m-1$) and retained in the memory circuit 220 of the memory circuit group 221(*a*) is called data Q(a)[b] in some cases.

Although details are described later, the memory circuit 220 includes a latch circuit, for example. The memory circuit 220 also includes a backup circuit. The backup circuit can retain data even when power supply to the setup register 108 is stopped because of the normally-off operation or the like. Since the memory circuit 220 includes the backup circuit, at the time of resumption of the power supply to the setup register 108 that has been stopped, the latch circuit included in the memory circuit 220 can read the data retained in the backup circuit. Thus, restoration after the resumption of power supply can be performed at high speed. Owing to the structure in which the memory circuit 220 includes the backup circuit, data can be restored through a simple process at the time of the resumption of power supply to the setup register 108.

Flag signals sr_flag(0) to sr_flag($2^m-1$) are input to input terminals of the AND circuit 205. The output completion signal initial_end is output from an output terminal of the AND circuit 205.

When data is retained in the memory circuit group 221(*a*), the flag signal sr_flag(a) is made active. When all the memory circuit groups 221 retain data, i.e., when the flag signals sr_flag(0) to sr_flag($2^m-1$) are made active, the output completion signal initial_end is made active.

When the output terminal of one register 204 is electrically connected to a plurality of switches 210 as illustrated in FIG. 2, the number of the registers 204 can be smaller than when the output terminal of one register 204 is electrically connected to one switch 210. For example, when a parameter output from the setup register 108 is represented by 2m×n bits, 2m×n registers 204 are needed in the structure where the output terminal of one register 204 is electrically connected to one switch 210. In contrast, in the structure where the output terminal of one register 204 is electrically connected to 2m switches 210, for example, the number of the registers 204 is m+n. Accordingly, the display device of one embodiment of the present invention can have a reduced size.

Figure 3:
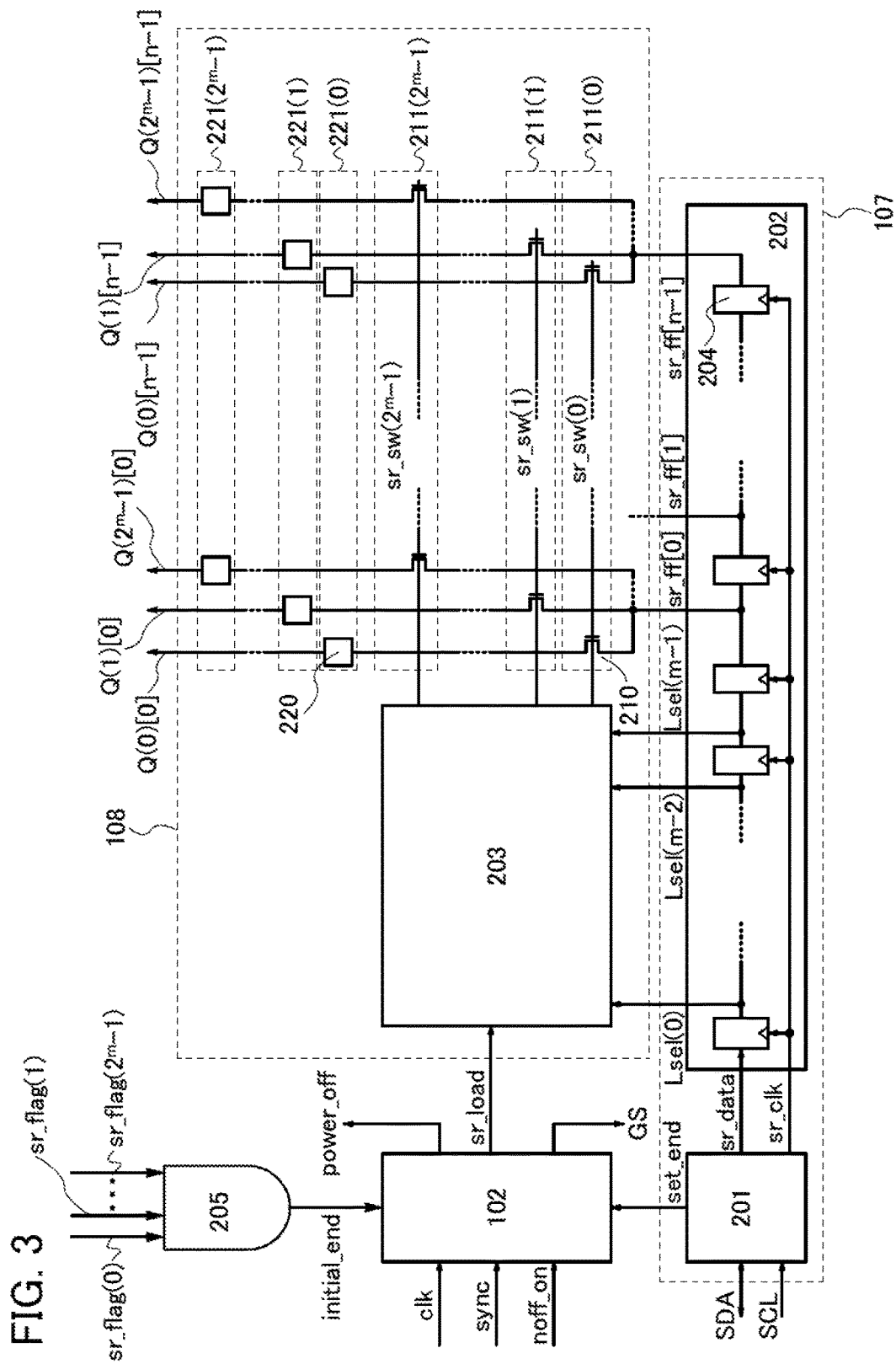
FIG. 3 is a block diagram illustrating a configuration example of a setup register control system.

Although the switch 210 is a CMOS transistor in FIG. 2, the switch 210 may be an n-channel transistor, for example, as illustrated in FIG. 3. In that case, the selection circuit 203 does not necessarily generate the switch selection inverted signals sr_swb(0) to sr_swb($2^m-1$). Furthermore, the switch 210 may be a p-channel transistor. In that case, the selection circuit 203 does not necessarily generate the switch selection signals sr_sw(0) to sr_sw($2^m-1$).

Figure 4:
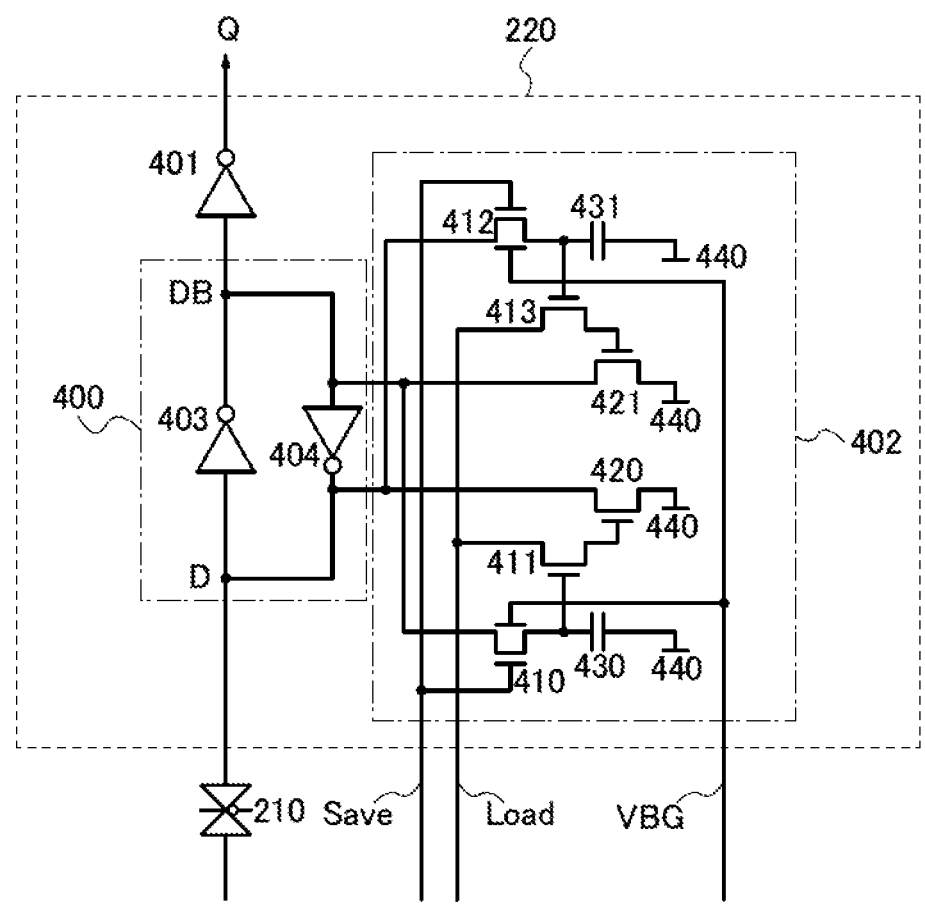
FIG. 4 is a circuit diagram illustrating a configuration example of a memory circuit.

FIG. 4 illustrates a specific circuit configuration example of the memory circuit 220. The memory circuit 220 includes a latch circuit 400, an inverter 401, and a backup circuit 402.

The latch circuit 400 includes an inverter 403 and an inverter 404. The backup circuit 402 includes a transistor 410, a transistor 411, a transistor 412, a transistor 413, a transistor 420, a transistor 421, a capacitor 430, and a capacitor 431. Note that wirings 440 are electrically connected to one of a source and a drain of the transistor 420, one of a source and a drain of the transistor 421, one terminal of the capacitor 430, and one terminal of the capacitor 431.

The node to which the switch 210, an input terminal of the inverter 403, and an output terminal of the inverter 404 are electrically connected is a node D. The node to which an input terminal of the inverter 401, an output terminal of the inverter 403, and an input terminal of the inverter 404 are electrically connected is a node DB.

The latch circuit 400 has a function of retaining data corresponding to the parameter signal sr_ff output from the register chain 107 to the memory circuit 220. The inverter 401 has a function of making the logic of the data corresponding to the parameter signal sr_ff output from the register chain 107 to the memory circuit 220 the same as the logic of the data Q output from the memory circuit 220.

Note that a circuit other than a latch circuit may be used as the latch circuit 400 as long as it has a function of retaining data. For example, the latch circuit 400 may be a flip-flop circuit. The inverter 401 may be omitted as necessary or as appropriate.

The backup circuit 402 has a function of keeping retaining data transmitted to the memory circuit 220 even when power supply to the setup register 108 is stopped because of the normally-off operation or the like. When power supply to the setup register 108 is stopped, the data retained in the latch circuit 400 is lost. In contrast, the backup circuit 402 keeps retaining data so that the latch circuit 400 can read the data retained in the backup circuit 402 at the time of resumption of the power supply to the setup register 108. Thus, restoration after the resumption of power supply can be performed at higher speed than in the case where the memory circuit 220 does not include the backup circuit 402. Owing to the structure in which the memory circuit 220 includes the backup circuit 402, data can be restored through a simple process at the time of the resumption of power supply to the setup register 108.

Note that the wiring 440 in the backup circuit 402 can supply a low potential, for example.

The transistor 410 has a function of controlling the supply of electric charges to the capacitor 430. The transistor 411 has a function of supplying a read signal Load to a gate of the transistor 420 in accordance with the electric charges retained in the capacitor 430. The transistor 412 has a function of controlling the supply of electric charges retained in the capacitor 431. The transistor 413 has a function of supplying the read signal Load to a gate of the transistor 421 in accordance with the electric charges retained in the capacitor 431.

The transistor 420 has a function of supplying the potential of the wiring 440 to the node D in accordance with the gate potential. The transistor 421 has a function of supplying the potential of the wiring 440 to the node DB in accordance with the gate potential.

The capacitor 430 has a function of receiving the potential of the node DB when a write signal Save is active and a function of retaining electric charges corresponding to a supplied potential when the write signal Save is inactive. The capacitor 431 has a function of receiving the potential of the node D when the write signal Save is active and a function of retaining electric charges corresponding to a supplied potential when the write signal Save is inactive. That is, the backup circuit 402 can retain the data supplied to the memory circuit 220, with the use of the capacitor 430 and the capacitor 431.

The transistor 410 and the transistor 412 are preferably OS transistors. Since the off-state current of an OS transistor is extremely low as described above, the transistor 410 and the transistor 412 that are OS transistors can inhibit leakage of the electric charges retained in the capacitor 430 and the capacitor 431. Accordingly, the backup circuit 402 can retain data for a long time.

Note that the transistor 411 and the transistor 413 may be OS transistors. In that case, a short channel effect can be inhibited even when the gate insulating films of the transistor 411 and the transistor 413 are thick. As a result, leakage of the electric charges from gates of the transistor 411 and the transistor 413 can be inhibited.

The transistor 420 and the transistor 421 may be OS transistors. When all of the transistors 410 to 413, 420, and 421 are OS transistors, the backup circuit 402 can be manufactured through a simple process.

Each of the transistors 410 and 412 preferably has a back gate. The back gates of the transistors 410 and 412 can supply a potential VBG. The electrical characteristics of the transistors 410 and 412, such as the threshold voltages, can be controlled by controlling the potential VBG. Thus, the transistors 410 and 412 can have an increased on-state current, for example. Note that the transistors 411, 413, 420, and 421 may also have a back gate. These transistors preferably have a back gate particularly when they are OS transistors.

Figure 5:
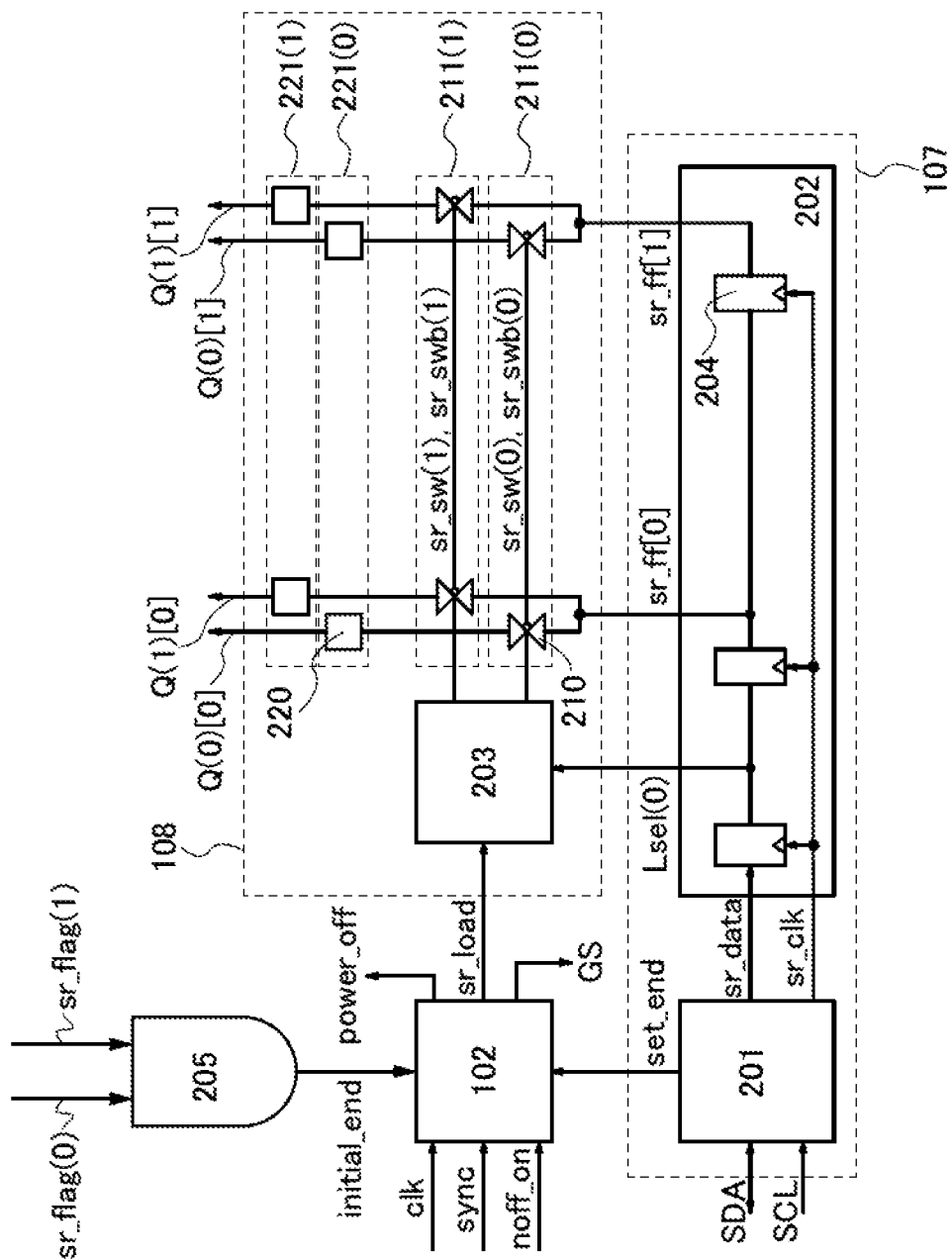
FIG. 5 is a block diagram illustrating a configuration example of a setup register control system.

FIG. 5 illustrates the setup register control system in FIG. 2 when m is one and n is two. The register portion 202 includes three registers 204, which can respectively retain data corresponding to the selection signal Lsel(0), data corresponding to the parameter signal sr_ff[0], and data corresponding to the parameter signal sr_ff[1]. Since the selection signal Lsel(0) is output from the register chain 107 to the selection circuit 203, the selection circuit 203 can generate the switch selection signal sr_sw(0), the switch selection inverted signal sr_swb(0), the switch selection signal sr_sw(1), and the switch selection inverted signal sr_swb(1).

Accordingly, in the setup register control system having the structure illustrated in FIG. 5, the setup register 108 includes the switch group 211(0) including two switches 210 and the switch group 211(1) including two switches 210. The setup register 108 includes the memory circuit group 221(0) including two memory circuits 220 and the memory circuit group 221(1) including two memory circuits 220. When having the above-described structure, the setup register 108 can output data Q(0)[0], data Q(1)[0], data Q(0)[1], and data Q(1)[1].

An example of an operation method of the display device 10 that includes the setup register control system having the structure illustrated in FIG. 5 is described with reference to FIG. 6 to FIG. 9. It is assumed that low-potential data is output as the data Q(0)[0], high-potential data is output as the data Q(1)[0], high-potential data is output as the data Q(0)[1], low-potential data is output as the data Q(1)[1].

Figure 6:
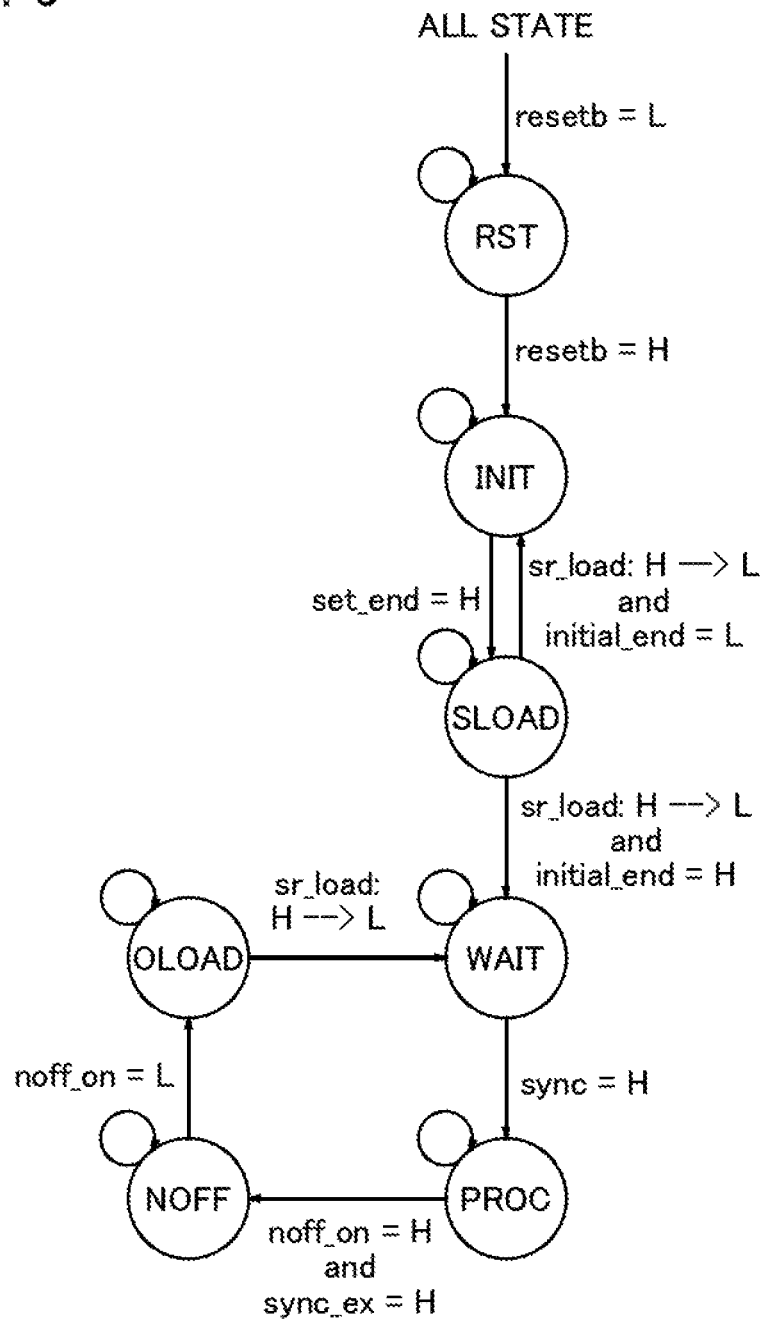
FIG. 6 is a state transition diagram illustrating an example of a method for operating a display device.

FIG. 6 is a state transition diagram of the display device 10. The display device 10 can operate in a state RST, a state INIT, a state SLOAD, a state WAIT, a state PROC, a state NOFF, or a state OLOAD. In FIG. 6, H denotes a high potential and L denotes a low potential.

In the state RST, a circuit included in the display device 10 is reset. In the state INIT, a parameter is set to the register chain 107. In the state SLOAD, the parameter is read from the register chain 107 into the setup register 108, then retained, and output to a circuit included in the controller 100, for example. In the state WAIT, state transition to the state PROC described later is put on hold until the start of a frame. In the state PROC, image data corresponding to the image data data is written into the pixel 20, and an image corresponding to the image data is displayed on the display 110. In the state NOFF, the display device 10 performs the normally-off operation. In the state OLOAD, data corresponding to a parameter retained in the backup circuit of the memory circuit 220 in the setup register 108 is read and output to the outside of the setup register 108.

Figure 7:
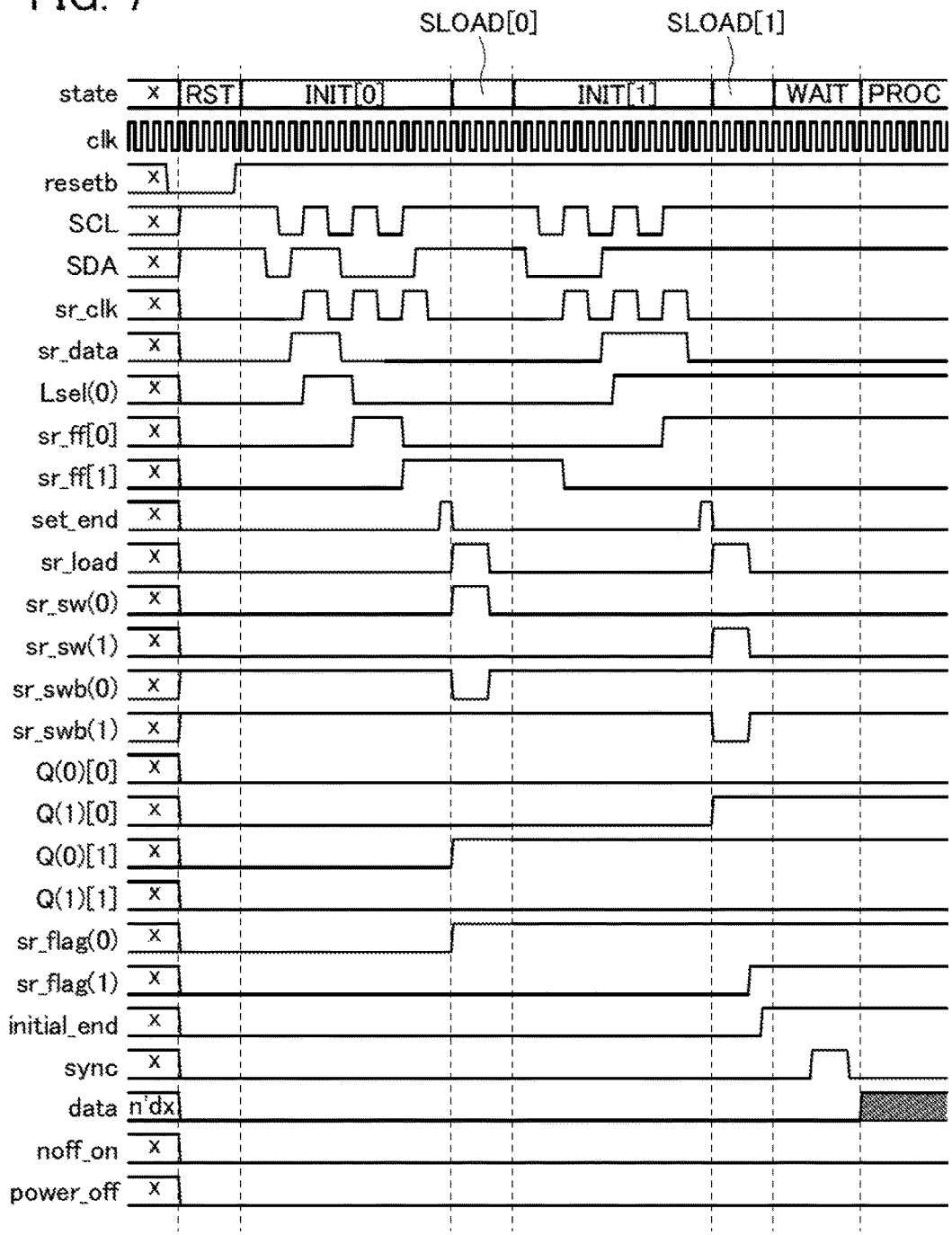
FIG. 7 is a timing chart showing an example of a method for operating a display device.
Figure 9:
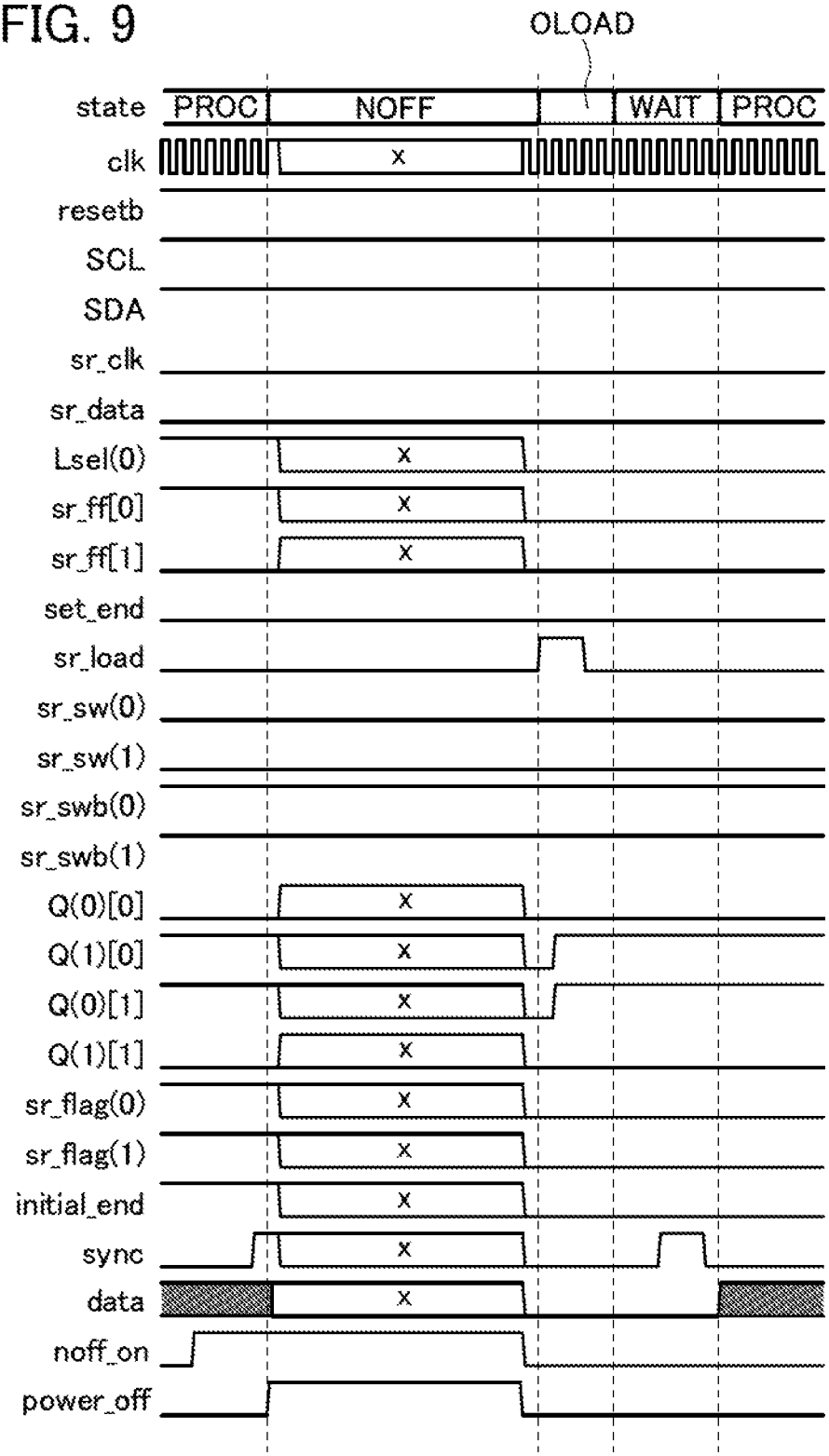
FIG. 9 is a timing chart showing an example of a method for operating a display device.

FIG. 7 and FIG. 9 are each a timing chart showing the states of the display device 10 and the potentials of the signals and data shown in FIG. 1 and FIG. 5. FIG. 7 shows transition from the time when the display device 10 is turned on until the state PROC. FIG. 9 shows transition from the state PROC to the state NOFF and transition from the state NOFF to the state PROC. Note that the image data data is an n-bit data signal.

Although the states of the display device 10 and the potentials of the signals change in response to rises of the clock signal clk in FIG. 7 and FIG. 9, the states of the display device 10 and the potentials of the signals may change in response to falls of the clock signal clk.

The number of times of rises and falls of the clock signal clk in a period between operations can be set freely. For example, in a period from a rise of the start-of-frame signal sync until the next rise of the start-of-frame signal sync, the number of times of rises and falls of the clock signal clk can be greater than or equal to the number of times necessary for driving all the pixels 20 provided in the display 110.

The ratio between the length of the period in which the potential of the start-of-frame signal sync is high and the length of the period in which the potential of the start-of-frame signal sync is low can be set freely.

A parameter is transmitted to the register chain 107 of the controller 100 using I$^2$C. Here, in the case where operation for setting a parameter to the register chain 107 is not performed, the clock signal SCL and the data signal SDA are each set to a high potential.

Figure 8A:
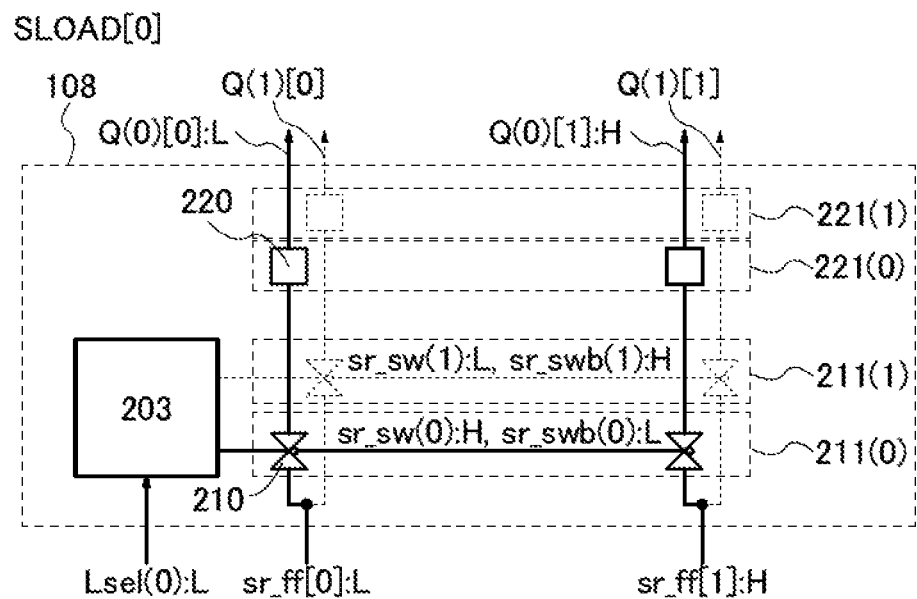
FIGS. 8A and 8B are block diagrams illustrating states of a setup register.
Figure 8B:
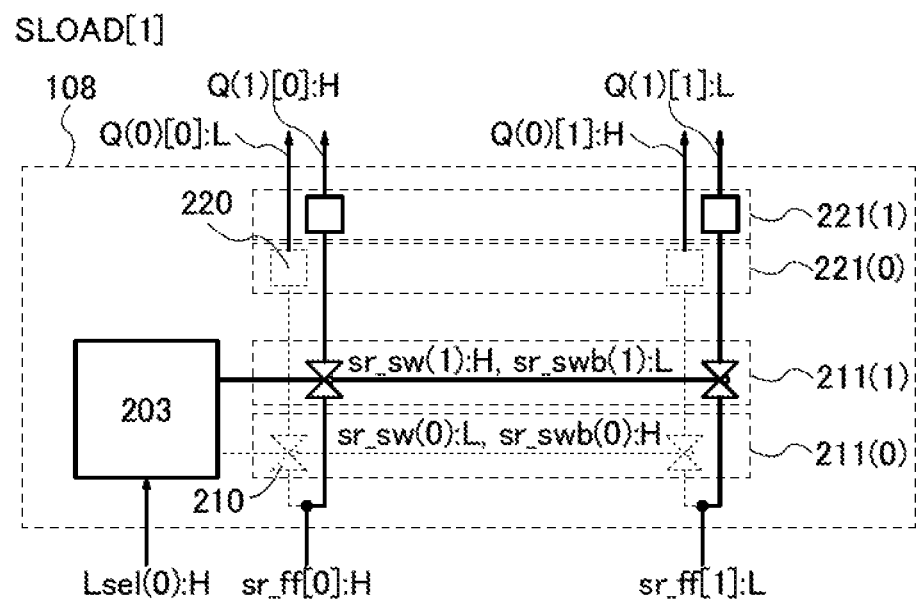

FIGS. 8A and 8B each show the potentials of the signals input to the setup register 108, the switch 210 in an on state, the memory circuit 220 where data writing is being performed, and the potentials of the data Q in the state where the display device 10 operates in the state SLOAD. In FIGS. 8A and 8B, the switch 210 in an on state and a wiring connected to the switch 210 are denoted by solid lines. The switch 210 in an off state and a wiring connected to the switch 210 are denoted by dashed lines. The memory circuit 220 where data writing is being performed is denoted by a solid line, and the memory circuit 220 where data writing is not being performed is denoted by a dashed line. In the case where the data Q retained in the memory circuit 220 is output to the outside of the setup register 108, the data Q is denoted by a solid arrow. In the case where the data Q retained in the memory circuit 220 is not output to the outside of the setup register 108, the data Q is denoted by a dashed arrow. Note that FIG. 8A shows the later-described state SLOAD[0] and FIG. 8B shows the later-described state SLOAD[1].

When the display device 10 is turned on, the in-circuit potentials of the circuits in the display device 10 become indefinite. Accordingly, as shown in FIG. 7, the potentials of the signals output from the circuits of the display device 10 also become indefinite. Then, the reset inverted signal resetb is set to a low potential to be active, so that the display device 10 operates in the state RST as shown in FIG. 6 and FIG. 7.

In the state RST, a circuit included in the display device 10 is reset. As a result, the clock signal sr_clk, the data signal sr_data, the selection signal Lsel(0), the parameter signal sr_ff[0], the parameter signal sr_ff[1], the setting completion signal set_end, the signal sr_load, the switch selection signal sr_sw(0), the switch selection signal sr_sw(1), the flag signal sr_flag(0), the flag signal sr_flag(1), the output completion signal initial_end, the start-of-frame signal sync, and the power supply stop signal power_off are each set to a low potential to be inactive as shown in FIG. 7. The switch selection inverted signal sr_swb(0) and the switch selection inverted signal sr_swb(1) are each set to a high potential to be inactive. The clock signal SCL and the data signal SDA are each set to a high potential. Furthermore, the data Q(0)[0], the data Q(1)[0], the data Q(0)[1], the data Q(1)[1], and the image data data are each set to a low potential. Note that the normally-off control signal noff_on can be set to a low potential to be inactive.

Although the start-of-frame signal sync has a low potential in the state RST, it may have a high potential as necessary. Also in a state other than the state RST, the start-of-frame signal sync may have a high potential as needed in a period in which the start-of-frame signal sync has a low potential in FIG. 7 and FIG. 9.

When the reset inverted signal resetb is set to a high potential to be inactive during the operation of the display device 10 in the state RST, the display device 10 starts to operate in the state INIT as shown in FIG. 6 and FIG. 7. Note that as shown in FIG. 7, the state after the transition from the state RST to the state INIT is referred to as the state INIT[0].

In the state INIT, a parameter is set to the register chain 107. As shown in FIG. 7, the potential of the data signal SDA becomes a potential corresponding to the switch group 211 selected by the selection circuit 203 or a potential corresponding to the data Q output from the setup register 108 to the outside. The data signal SDA is output from the arithmetic circuit 120 illustrated in FIG. 1 to the controller 201 in synchronization with the clock signal SCL.

The controller 201 generates the clock signal sr_clk with a potential corresponding to the potential of the received clock signal SCL and the data signal sr_data with a potential corresponding to the potential of the received data signal SDA and outputs the signals to the register 204. Data corresponding to the data signal sr_data is shifted by the register 204 in synchronization with the clock signal sr_clk, data corresponding to the selection signal Lsel(0), data corresponding to the parameter signal sr_ff[0], and data corresponding to the parameter signal sr_ff[1] are set to the register portion 202, and the data are retained. Note that in the state INIT[0], low-potential data is set as the data corresponding to the selection signal Lsel(0), low-potential data is set as the data corresponding to the parameter signal sr_ff[0], and high-potential data is set as the data corresponding to the parameter signal sr_ff[1].

After parameter setting to the register chain 107 is completed, a high-potential pulse signal is output as the setting completion signal set_end from the controller 201 to the master controller 102. Thus, the display device 10 changes from the state INIT to the state SLOAD as shown in FIG. 6 and FIG. 7. Note that as shown in FIG. 7, the state after the transition from the state INIT[0] to the state SLOAD is referred to as the state SLOAD[0].

In the state SLOAD, the data retained in the register portion 202 is output to the memory circuit 220 in the setup register 108, and the data Q corresponding to the output data is retained in the memory circuit 220 and is output from the memory circuit 220. When the signal sr_load is set to a high potential to be active in the period of the state SLOAD, the selection circuit 203 can select the switch group 211 in accordance with the potential of the selection signal Lsel(0). When the switch group 211 is selected, the data Q corresponding to the parameter signal sr_ff[0] and the data Q corresponding to the parameter signal sr_ff[1] are retained in the memory circuits 220 electrically connected to the switches 210 of the switch group 211. The data Q retained in the memory circuit 220 are output to the outside of the setup register 108.

Note that the data Q retained in the memory circuit 220 is preferably written into the backup circuit provided in the memory circuit 220 retaining the data Q, before the later-described normally-off operation. In other words, when the memory circuit 220 includes a volatile memory circuit such as a latch circuit and a nonvolatile backup circuit including an OS transistor and the like, the data Q retained in the volatile memory circuit is preferably written into the non-volatile backup circuit before the normally-off operation.

As described above, in the state SLOAD[0], the register chain 107 retains low-potential data as the data corresponding to the selection signal Lsel(0). Accordingly, as shown in FIG. 7 and FIG. 8A, the switch selection signal sr_sw(0) is set to a high potential to be active, and the switch selection inverted signal sr_swb(0) is set to a low potential to be active. In the above manner, the switch group 211(0) is selected and the switches 210 of the switch group 211(0) are turned on.

By selection of the switch group 211(0), the data Q corresponding to the parameter signal sr_ff[0] and the data Q corresponding to the parameter signal sr_ff[1] are retained in the memory circuits 220 in the memory circuit group 221(0), and the data Q are output to the outside of the setup register 108. As described above, in the state SLOAD[0], the register chain 107 retains low-potential data as the data corresponding to the parameter signal sr_ff[0] and also retains high-potential data as the data corresponding to the parameter signal sr_ff[1]. Therefore, the data Q(0)[0] remains to have a low potential and the data Q(0)[1] is set to a high potential.

In the state SLOAD[0], the flag signal sr_flag(0) is set to a high potential to be active. As a result, the setup register control system can recognize the output of the data Q(0)[0] and the data Q(0)[1] to the outside of the setup register 108.

When the setup register 108 outputs the data Q(0)[0] and the data Q(0)[1] to the outside, the switch selection signal sr_sw(0) is set to a low potential to be inactive, and the switch selection inverted signal sr_swb(0) is set to a high potential to be inactive. Thus, the selection of the switch group 211(0) by the selection circuit 203 is canceled.

When the setup register 108 outputs the data Q(0)[0] and the data Q(0)[1] to the outside, the signal sr_load is set to a low potential to be inactive. Meanwhile, as shown in FIG. 7, the flag signal sr_flag(0) has a high potential but the flag signal sr_flag(1) has a low potential; thus, the output completion signal initial_end remains to have a low potential and to be inactive. As shown in FIG. 6, when the signal sr_load changes from a high potential to a low potential and the output completion signal initial_end has a low potential, the display device 10 changes from the state SLOAD to the state INIT. Note that as shown in FIG. 7, the state after the transition from the state SLOAD[0] to the state INIT is referred to as the state INIT[1].

In the state INIT[1], high-potential data is set as the data corresponding to the selection signal Lsel(0), high-potential data is set as the data corresponding to the parameter signal sr_ff[0], and low-potential data is set as the data corresponding to the parameter signal sr_ff[1].

As in the state INIT[0], after parameter setting to the register chain 107 is completed, a high-potential pulse signal is output as the setting completion signal set_end from the controller 201 to the master controller 102. Thus, the display device 10 changes from the state INIT to the state SLOAD as shown in FIG. 6 and FIG. 7. Note that as shown in FIG. 7, the state after the transition from the state INIT[1] to the state SLOAD is referred to as the state SLOAD[1].

As described above, in the state SLOAD[1], the register chain 107 retains high-potential data as the data corresponding to the selection signal Lsel(0). Accordingly, as shown in FIG. 7 and FIG. 8B, the switch selection signal sr_sw(1) is set to a high potential to be active, and the switch selection inverted signal sr_swb(1) is set to a low potential to be active. In the above manner, the switch group 211(1) is selected and the switches 210 of the switch group 211(1) are turned on.

By selection of the switch group 211(1), the data Q corresponding to the parameter signal sr_ff[0] and the data Q corresponding to the parameter signal sr_ff[1] are retained in the memory circuits 220 in the memory circuit group 221(1), and the data Q are output to the outside of the setup register 108. As described above, in the state SLOAD[1], the register chain 107 retains high-potential data as the data corresponding to the parameter signal sr_ff[0] and also retains low-potential data as the data corresponding to the parameter signal sr_ff[1]. Therefore, the data Q(1)[0] is set to a high potential and the data Q(1)[1] remains to have a low potential.

In the state SLOAD[1], the flag signal sr_flag(1) is set to a high potential to be active. As a result, the setup register control system can recognize the output of the data Q(1)[0] and the data Q(1)[1] to the outside of the setup register 108.

When the setup register 108 outputs the data Q(1)[0] and the data Q(1)[1] to the outside, the switch selection signal sr_sw(1) is set to a low potential to be inactive, and the switch selection inverted signal sr_swb(1) is set to a high potential to be inactive. Thus, the selection of the switch group 211(1) by the selection circuit 203 is canceled.

When the setup register 108 outputs the data Q(1)[0] and the data Q(1)[1] to the outside, the signal sr_load is set to a low potential to be inactive. As shown in FIG. 7, since the flag signal sr_flag(0) is set to a high potential in the state SLOAD[0] and the flag signal sr_flag(1) is set to a high potential in the state SLOAD[1], both the flag signal sr_flag(0) and the flag signal sr_flag(1) have a high potential to be active. Accordingly, the output completion signal initial_end is set to a high potential to be active. As shown in FIG. 6, when the signal sr_load changes from a high potential to a low potential and the output completion signal initial_end has a high potential, the display device 10 changes from the state SLOAD to the state WAIT. That is, the display device 10 changes from the state SLOAD[1] to the state WAIT as shown in FIG. 7.

In the state WAIT, state transition to the state PROC is put on hold until the start of a frame. Thus, the display device 10 can be inhibited from changing to the state PROC during a frame and operating abnormally.

The start-of-frame signal sync is set to a high potential at the time of the start of a frame, and as shown in FIG. 6 and FIG. 7, the display device changes from the state WAIT to the state PROC. In the state PROC, the potential of the image data data is the potential corresponding to image data generated by the arithmetic circuit 120 as shown in FIG. 7.

As described above, the image data data is output to the data processing circuit 103 and image processing, correction processing, and the like are performed. Then, the image data sdata is output from the data processing circuit 103 to the source driver 111.

In the above manner, image data corresponding to the image data data can be written into the pixel 20 and an image corresponding to the image data can be displayed on the display 110 in the state PROC. Accordingly, the display 110 can display a moving image.

When the potential of the normally-off control signal noff_on is set to a high potential so that the normally-off control signal becomes active during the operation of the display device 10 in the state PROC, as shown in FIG. 6 and FIG. 9, the display device transistions to the state NOFF after the potential of the start-of-frame signal sync is set to a high potential. When the display device is configured to change to the state NOFF after the potential of the start-of-frame signal sync is set to a high potential, the display device 10 can be inhibited from operating abnormally as a result of state transition during a frame.

After the transition to the state NOFF, the power supply stop signal power_off is set to a high potential to be active, as shown in FIG. 9. Thus, power supply to a circuit or the like included in the display device 10 is stopped. That is, the display device 10 performs the normally-off operation. Note that power keeps being supplied to a portion of the master controller 102 that is needed for generation of the power supply stop signal power_off. The potentials of the clock signal clk, the start-of-frame signal sync, and the like become indefinite.

During the operation of the display device 10 in the state NOFF, when the power supply stop signal power_off is set to a low potential to be inactive, power supply to the circuit and the like included in the display device 10 is resumed. When the normally-off control signal noff_on is set to a low potential to be inactive, the display device changes to the state OLOAD as shown in FIG. 6 and FIG. 9.

When the signal sr_load is set to a high potential to be active after the transition to the state OLOAD, the data Q retained in the backup circuits in the memory circuits 220 are read and the read data Q are output from the setup register 108 to the outside. The backup circuits retain the low-potential data Q(0)[0], the high-potential data Q(1)[0], the high-potential data Q(0)[1], and the low-potential data Q(1)[1]. Thus, as shown in FIG. 9, the low-potential data Q(0)[0], the high-potential data Q(1)[0], the high-potential data Q(0)[1], and the low-potential data Q(1)[1] are output from the setup register 108 to the outside in the state OLOAD.

When the data Q are output from the setup register 108 to the outside, the signal sr_load is set to a low potential to be inactive. As a result, the display device 10 changes from the state OLOAD to the state WAIT as shown in FIG. 6 and FIG. 9. After that, the start-of-frame signal sync is set to a high potential at the time of the start of a frame, and as shown in FIG. 6 and FIG. 9, the display device changes from the state WAIT to the state PROC. The above is an example of an operation method of the display device 10.

Figure 10:
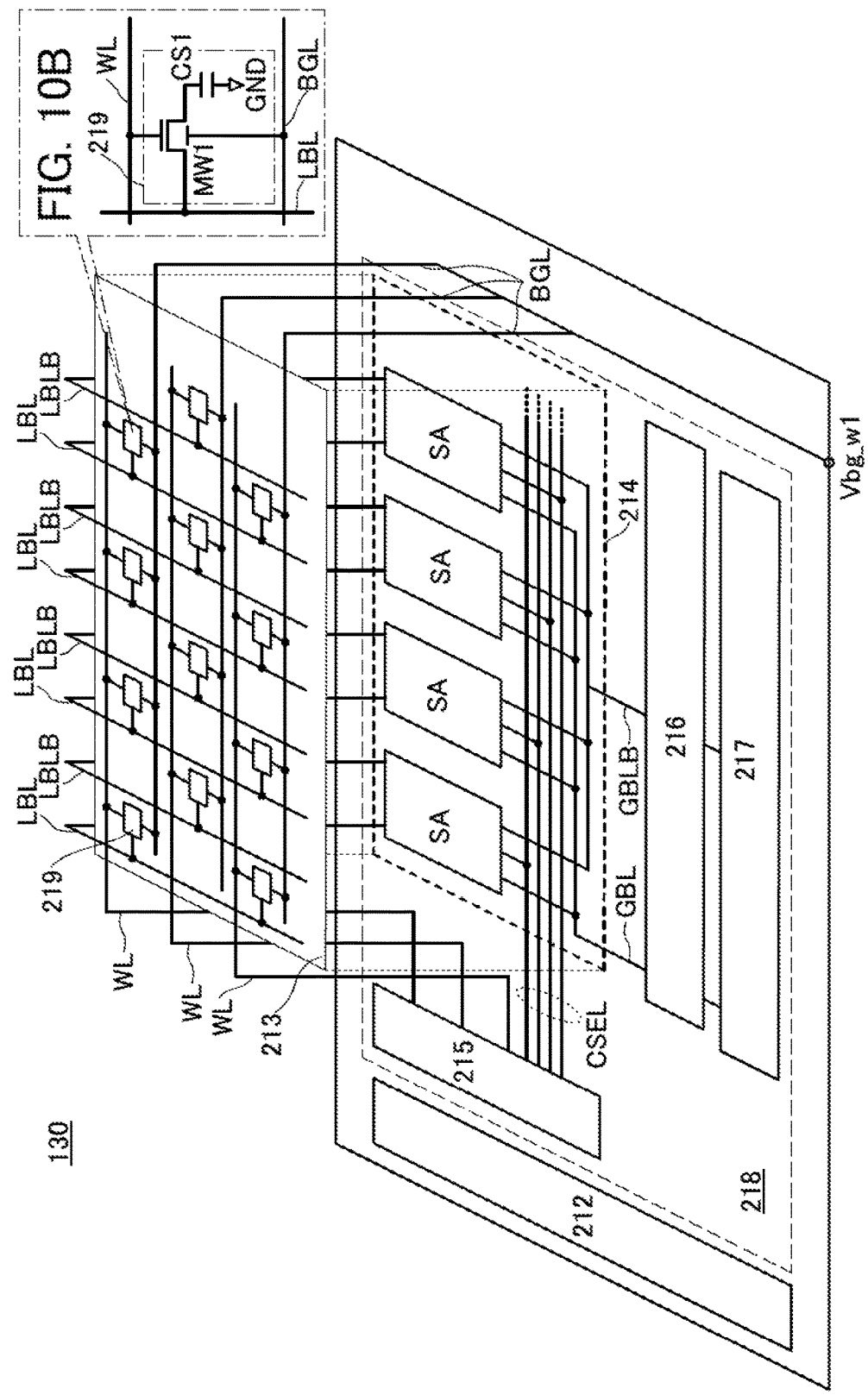
FIGS. 10A and 10B are a block diagram and a circuit diagram illustrating a configuration example of a memory circuit.

FIG. 10A is a block diagram illustrating a configuration example of the memory circuit 130. The memory circuit 130 includes a control portion 212, a cell array 213, and a peripheral circuit 218. The peripheral circuit 218 includes a sense amplifier circuit 214, a driver 215, a main amplifier 216, and an input/output circuit 217.

The control portion 212 has a function of controlling the memory circuit 130. For example, the control portion 212 controls the driver 215, the main amplifier 216, and the input/output circuit 217.

The driver 215 is electrically connected to a plurality of wirings WL and CSEL. The driver 215 generates signals output to the plurality of wirings WL and CSEL.

The cell array 213 includes a plurality of memory cells 219. The memory cells 219 are electrically connected to wirings WL, LBL (or LBLB), and BGL. The wiring WL is a word line. The wirings LBL and LBLB are local bit lines. Although a folded-bit-line method is employed for the configuration of the cell array 213 in the example of FIG. 10A, an open-bit-line method can also be employed.

FIG. 10B illustrates a configuration example of the memory cell 219. The memory cell 219 includes a transistor MW1 and a capacitor CS1. The transistor MW1 in this example is a transistor having a back gate. The back gate of the transistor MW1 is electrically connected to the wiring BGL. A potential Vbg_w1 is input to the wiring BGL.

The capacitor CS1 has a function of retaining electric charges corresponding to image data. The transistor MW1 has a function of controlling writing and reading of the image data written in the memory circuit 130. That is, the transistor MW1 has a function of controlling charge and discharge of the electric charges retained in the capacitor CS1.

The transistor MW1 is preferably an OS transistor. Owing to its extremely low off-state current, the use of an OS transistor in the memory cell 219 can inhibit leakage of electric charges from the capacitor CS1; thus, the image data can be retained for a long time even when power supply to the memory circuit 130 is stopped. Moreover, by setting the potential Vbg_w1 to a negative potential, the threshold voltage of the transistor MW1 can be shifted to the positive potential side and thus the retention time of the memory cell 219 can be increased.

The transistors MW1 in the plurality of memory cells 219 included in the cell array 213 are OS transistors; thus, Si transistors formed over a silicon wafer can be used as transistors in other circuits, for example. Accordingly, the cell array 213 can be stacked over the sense amplifier circuit 214. Thus, the circuit area of the memory circuit 130 can be reduced.

The cell array 213 is stacked over the sense amplifier circuit 214. The sense amplifier circuit 214 includes a plurality of sense amplifiers SA. The sense amplifiers SA are electrically connected to adjacent wirings LBL and LBLB (a pair of local bit lines), wirings GBL and GBLB (a pair of global bit lines), and the plurality of wirings CSEL. The sense amplifiers SA have a function of amplifying the potential difference between the wirings LBL and LBLB.

In the sense amplifier circuit 214, one wiring GBL is provided for four wirings LBL, and one wiring GBLB is provided for four wirings LBLB. However, the configuration of the sense amplifier circuit 214 is not limited to the configuration example of FIG. 10A.

The main amplifier 216 is connected to the sense amplifier circuit 214 and the input/output circuit 217. The main amplifier 216 has a function of amplifying the potential difference between the wirings GBL and GBLB. The main amplifier 216 is not necessarily provided.

The input/output circuit 217 has a function of outputting a potential corresponding to a write data to the wirings GBL and GBLB or the main amplifier 216 and a function of reading the potentials of the wirings GBL and GBLB or an output potential of the main amplifier 216 and outputting the potential(s) to the outside as data. The sense amplifier SA from which data is read and the sense amplifier SA to which data is written can be selected using the signal of the wiring CSEL. Therefore, there is no need to provide a selection circuit such as a multiplexer in the input/output circuit 217. Thus, the input/output circuit 217 can have a simple circuit configuration and a small occupied area.

Note that the memory circuit 130 may have a structure not including an OS transistor. In that case, for example, a dynamic random access memory (DRAM), a static random access memory (SRAM), or the like can be used as the memory circuit 130.

Figure 11:
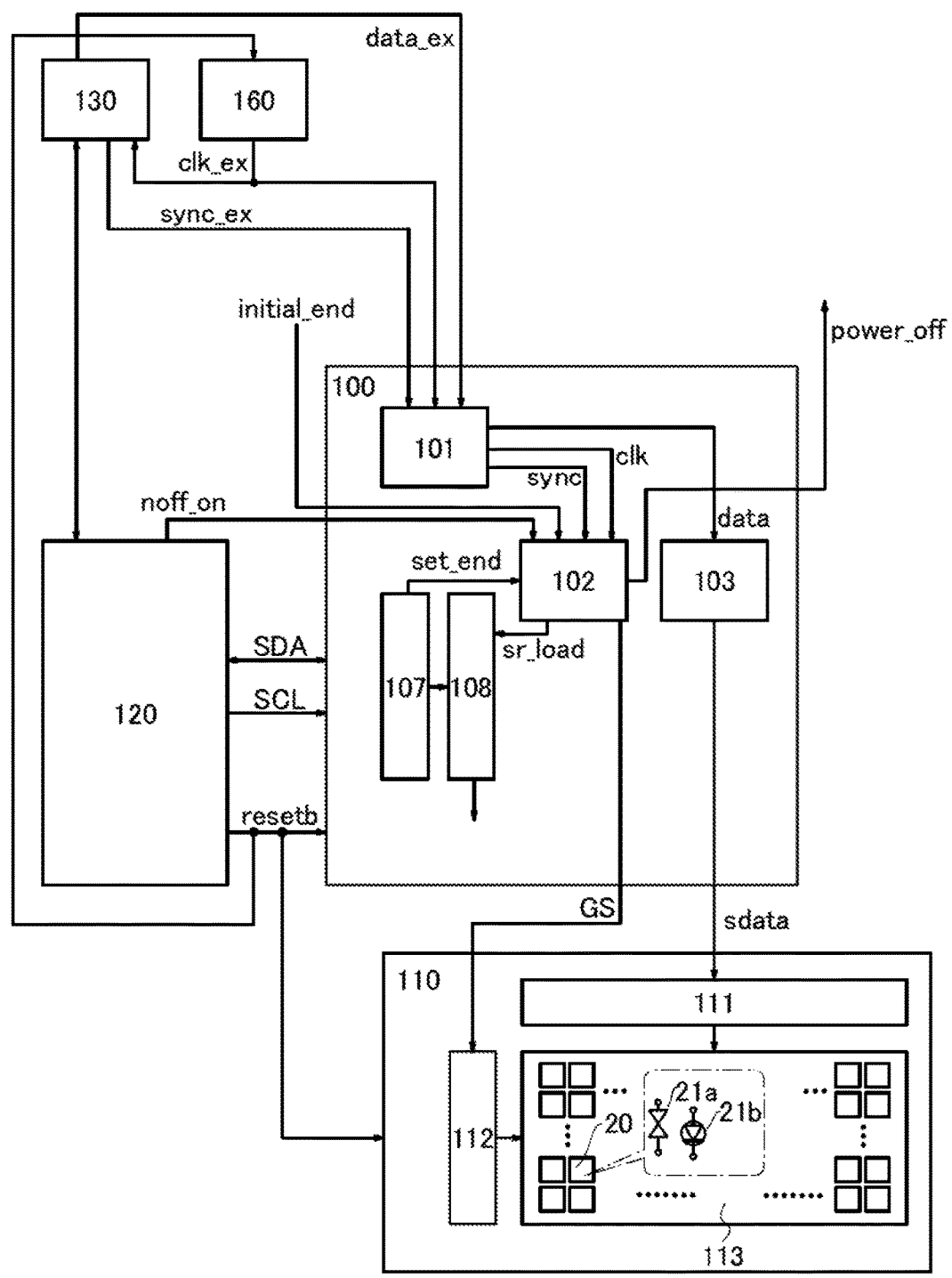
FIG. 11 is a block diagram illustrating a configuration example of a display device.

FIG. 11 is a block diagram showing a modification example of the structure of the display device 10. The display device 10 illustrated in FIG. 11 is different from the display device 10 having the structure in FIG. 1 in that the controller 100 includes a clock gating circuit 101. In the display device 10 having the structure in FIG. 11, the image data output from the memory circuit 130 is image data data_ex, the start-of-frame signal output from the memory circuit 130 is the start-of-frame signal sync_ex, and the clock signal output from the clock signal generation circuit 160 is a clock signal clk_ex.

The clock signal clk_ex, the start-of-frame signal sync_ex, and the image data data_ex are supplied to the clock gating circuit 101. The clock gating circuit 101 has a function of outputting the clock signal clk corresponding to the clock signal clk_ex and the start-of-frame signal sync corresponding to the start-of-frame signal sync_ex to the master controller 102 as necessary. The clock gating circuit 101 has a function of outputting the image data data corresponding to the image data data_ex to the data processing circuit 103 as necessary.

Owing to the clock gating circuit 101 included in the display device 10, when there is no need to supply the clock signal clk and the start-of-frame signal sync to the master controller 102, e.g., when the display device 10 operates in the state RST, the state INIT, the state SLOAD, the state WAIT, or the state OLOAD, the supply of these signals can be stopped. In addition, the supply of the image data data can be stopped when there is no need to supply the image data data to the data processing circuit 103. This reduces the power consumption of the display device 10.

Figure 12:
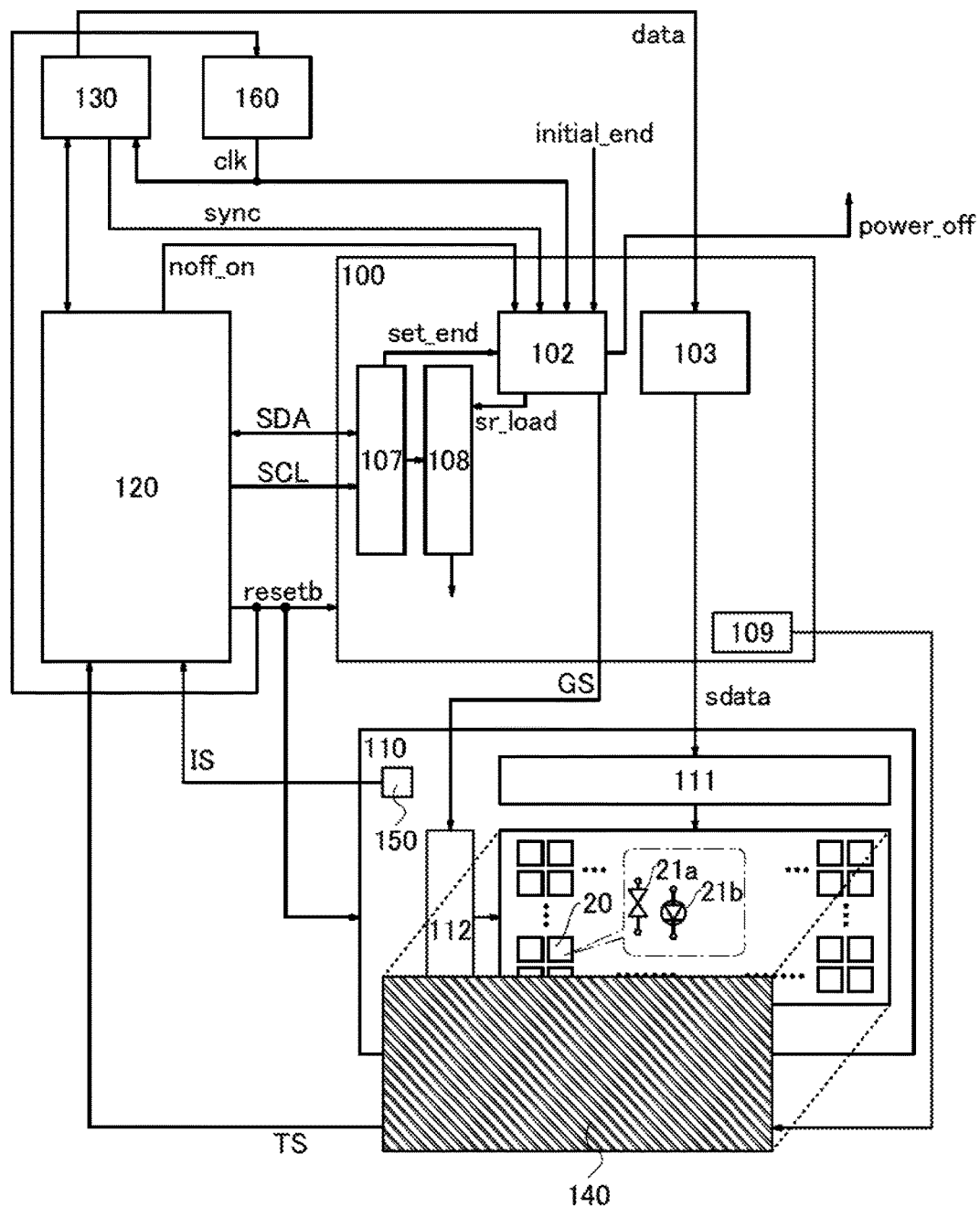
FIG. 12 is a block diagram illustrating a configuration example of a display device.

FIG. 12 is a block diagram showing another modification example of the structure of the display device 10. The display device 10 illustrated in FIG. 12 has the same structure as the display device 10 illustrated in FIG. 1 except that the controller 100 includes a touch sensor controller 109 and that the display 110 includes a touch sensor 140 and an optical sensor 150. As illustrated in FIG. 12, the touch sensor 140 includes a region overlapping with the pixel array 113 of the display 110.

Although the optical sensor 150 is provided in the display 110 in FIG. 12, the optical sensor 150 may be provided outside the display 110. Furthermore, either of the touch sensor 140 and the optical sensor 150 may be omitted. When the touch sensor 140 is not provided, a structure without the touch sensor controller 109 can be employed.

The touch sensor controller 109 has a function of outputting a control signal to the touch sensor 140. The touch sensor 140 recognizes a touch motion in response to the control signal.

The touch sensor 140 has a function of outputting, to the arithmetic circuit 120, a signal TS corresponding to the touch motion to the display 110. On the basis of the signal TS, the arithmetic circuit 120 can add display data to the image data generated by the arithmetic circuit 120 and perform user interface processing for operating an application, for example.

The optical sensor 150 has a function of measuring the illuminance of external light and outputting a signal IS corresponding to the illuminance to the arithmetic circuit 120. Thus, for example, the arithmetic circuit 120 can make part of the data signal SDA correspond to the illuminance of external light, whereby some parameters output from the setup register 108 can be changed in accordance with the illuminance of external light. In the above manner, for example, the hue, lightness, and chroma of the image displayed by the display 110 can be adjusted with the data processing circuit 103 or the like. For example, the lightness of the image displayed by the display 110 is increased when the external light is intense, and the lightness of the image displayed by the display 110 is reduced when the external light is weak. As a result, the viewability of the image displayed by the display 110 can be increased independently of the illuminance of the external light.

Figure 13:
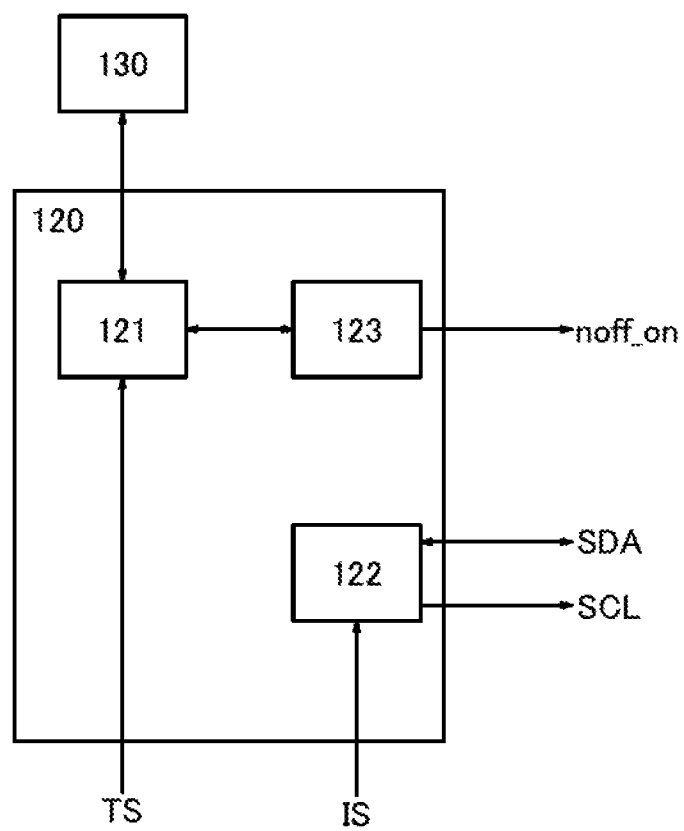
FIG. 13 is a block diagram illustrating a configuration example of an arithmetic circuit.

FIG. 13 is a block diagram illustrating a specific structure of the arithmetic circuit 120. The arithmetic circuit 120 includes a data processing circuit 121, a register value generation circuit 122, and a controller 123. The signal TS can be input to the data processing circuit 121 and the signal IS can be input to the register value generation circuit 122, for example.

The data processing circuit 121 has a function of generating image data corresponding to images to be displayed on the display 110. The image data generated by the data processing circuit 121 can be output to the memory circuit 130, for example.

The register value generation circuit 122 has a function of generating the data signal SDA and the clock signal SCL.

The controller 123 has a function of changing the logic of the normally-off control signal noff_on. The logic of the normally-off control signal noff_on can be determined in accordance with, for example, the image data generated by the data processing circuit 121.

Figure 14:
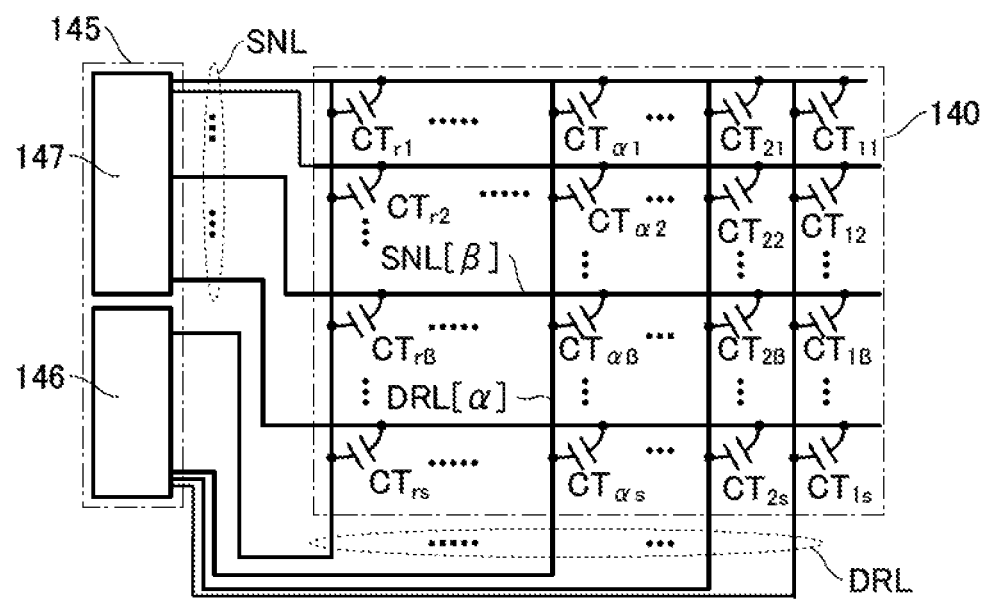
FIG. 14 illustrates a configuration example of a touch sensor.

FIG. 14 is a block diagram illustrating configuration examples of the touch sensor 140 and its peripheral circuit. Note that the touch sensor 140 and the peripheral circuit form a touch sensor unit 149 as illustrated in FIG. 14. Illustrated in FIG. 14 is an example where the touch sensor 140 is a mutual capacitive touch sensor.

The touch sensor unit 149 includes the touch sensor 140 and a peripheral circuit 145. The peripheral circuit 145 includes a touch sensor driver 146 and a sensing circuit 147. The peripheral circuit 145 can be composed of a dedicated IC.

The touch sensor 140 includes r wirings DRL (r is an integer of one or more) and s wirings SNL (s is an integer of one or more). The wiring DRL is a driving line, and the wiring SNL is a sensing line. Here, the α-th wiring DRL is referred to as a wiring DRL[α] and the β-th wiring SNL is referred to as a wiring SNL[β]. A capacitor $CT_{\alpha\beta}$ refers to a capacitor formed between the wiring DRL[α] and the wiring SNL[β].

The r wirings DRL are electrically connected to the touch sensor driver 146. The touch sensor driver 146 has a function of driving the wirings DRL. The s wirings SNL are electrically connected to the sensing circuit 147. The sensing circuit 147 has a function of sensing signals of the s wirings SNL. A signal of the wiring SNL[β] at the time when the wiring DRL[α] is driven by the touch sensor driver 146 has information on the change amount of capacitance of the capacitor $CT_{\alpha\beta}$. By analysis of signals of the s wirings SNL, information on whether touch operation is performed or not, touch position, and the like can be obtained.

At least part of this embodiment can be implemented in combination with any of the other embodiments described in this specification as appropriate.

Embodiment 2

In this embodiment, details of the display 110 described in Embodiment 1 will be described.

Figure 15:
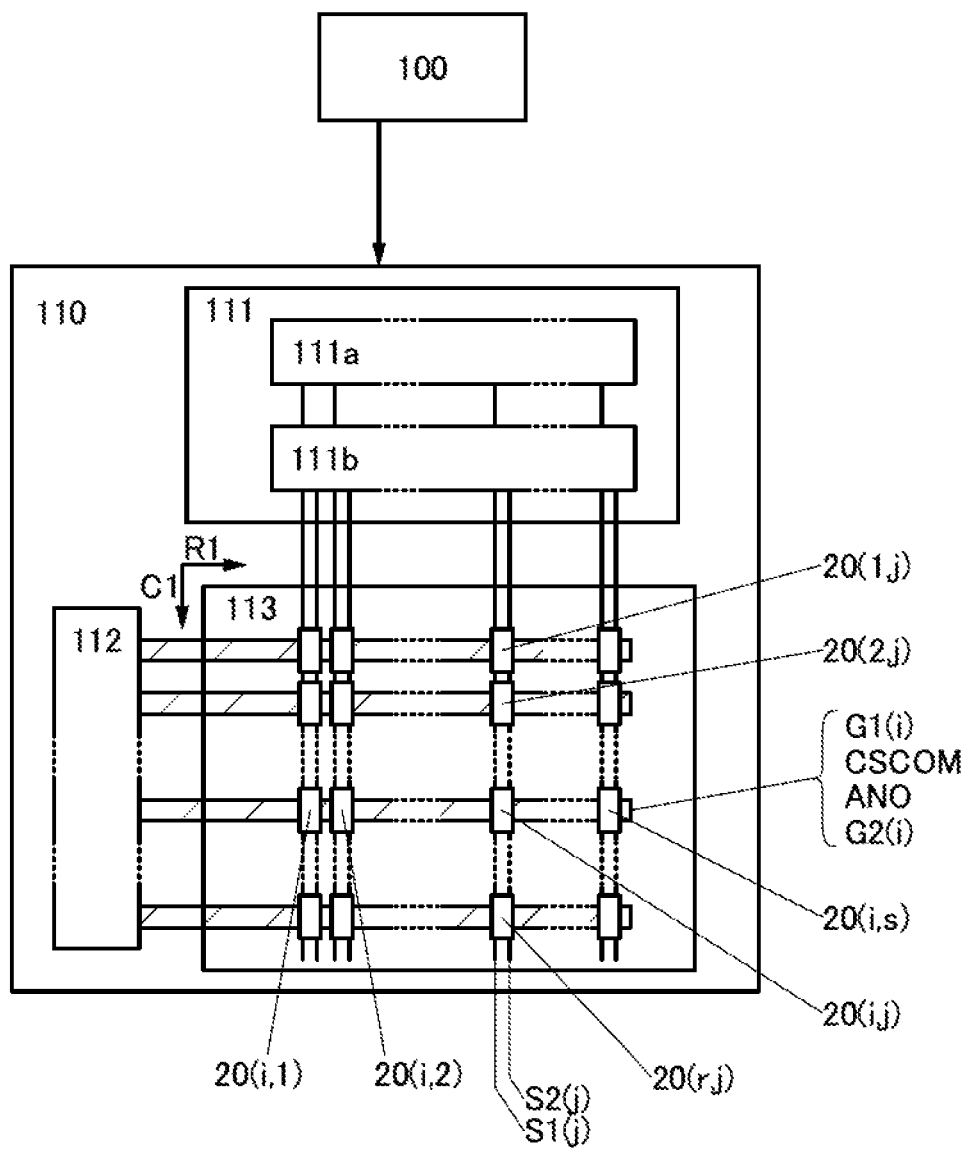
FIG. 15 is a block diagram illustrating a configuration example of a display device.

FIG. 15 is a block diagram illustrating a configuration example of the display 110.

The display 110 includes the pixel array 113. The display 110 can include the gate driver 112 and the source driver 111.

The pixel array 113 includes one group of pixels 20($i$,1) to 20($i$,$s$), another group of pixels 20(1,$j$) to 20($r$,$j$), and a scan line G1($i$). In addition, a scan line G2($i$), a wiring CSCOM, a wiring ANO, a signal line S1($j$), and a signal line S2($j$) are provided. Note that i is an integer greater than or equal to 1 and less than or equal to r, j is an integer greater than or equal to 1 and less than or equal to s, and each of r and s is an integer greater than or equal to 1.

The one group of pixels 20($i$,1) to 20($i$,$s$) include the pixel 20($i$,$j$) and are provided in the row direction (the direction indicated by the arrow R1 in the drawing).

The another group of pixels 20(1,$j$) to 20($r$,$j$) include the pixel 20($i$,$j$) and are provided in the column direction (the direction indicated by the arrow C1 in the drawing) that intersects the row direction.

The scan line G1($i$) and the scan line G2($i$) are electrically connected to the one group of pixels 20($i$,1) to 20($i$,$s$) provided in the row direction.

The another group of pixels 20(1,$j$) to 20($r$,$j$) provided in the column direction are electrically connected to the signal line S1($j$) and the signal line S2(1).

The gate driver 112 has a function of supplying a selection signal on the basis of control information.

For example, the gate driver has a function of supplying a selection signal to one scan line at a frequency of 30 Hz or higher, preferably 60 Hz or higher, on the basis of the control information. Accordingly, moving images can be smoothly displayed.

For example, the gate driver has a function of supplying a selection signal to one scan line at a frequency lower than 30 Hz, preferably lower than 1 Hz, and further preferably less than once per minute, on the basis of the control information. Accordingly, a still image can be displayed while flickering is suppressed.

The source driver 111 includes a source driver 111a and a source driver 111b. The source driver 111a and the source driver 111b have a function of supplying a data signal on the basis of a signal from the controller 100.

The source driver 111a has a function of generating a data signal that is to be supplied to a pixel circuit electrically connected to one display element. Specifically, the source driver 111a has a function of generating a signal whose polarity is inverted. With this configuration, for example, a liquid crystal display element can be driven.

The source driver 111b has a function of generating a data signal that is to be supplied to a pixel circuit electrically connected to another display element which displays an image by a method different from that of the one display element. With this configuration, for example, an organic EL element can be driven.

For example, a variety of sequential circuits, such as a shift register, can be used for the source driver 111.

For example, an integrated circuit in which the source driver 111a and the source driver 111b are integrated can be used for the source driver 111. Specifically, an integrated circuit formed over a silicon substrate can be used for the source driver 111.

The source driver 111 may be included in the same integrated circuit as the controller 100. Specifically, an integrated circuit formed over a silicon substrate can be used for each of the controller 100 and the source driver 111.

For example, the above integrated circuit can be mounted on a terminal by a chip on glass (COG) method or a chip on film (COF) method. Specifically, an anisotropic conductive film can be used to mount the integrated circuit on the terminal.

Figure 16:
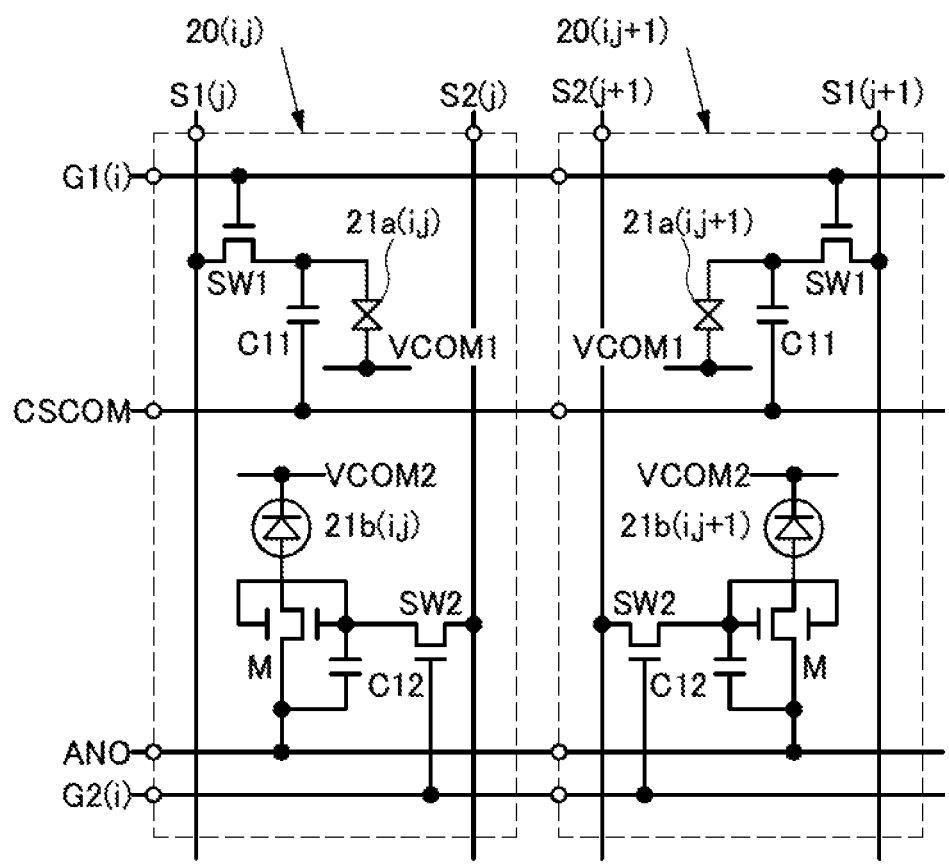
FIG. 16 is a circuit diagram illustrating a configuration example of pixels.

FIG. 16 is a circuit diagram illustrating configuration examples of pixels 20. The pixel 20($i$,$j$) has a function of driving a reflective element 21a($i$,$j$) and a light-emitting element 21b($i$,$j$). Accordingly, the reflective element 21a and the light-emitting element 21b, which performs display by a method different from that for the reflective element 21a, can be driven with the pixel circuit which can be formed in the same process, for example. The display performed using the reflective element 21a, which is a reflective display element, can be performed with lower power consumption. Alternatively, an image with high contrast can be favorably displayed in an environment with bright external light. With the use of the light-emitting element 21b, which is a light-emitting display element, images can be favorably displayed in a dark environment.

Note that display may also be performed with both the reflective element 21a and the light-emitting element 21b. Note that display performed with both the reflective element 21a and the light-emitting element 21b can be called hybrid display. Furthermore, a display having a function of performing hybrid display can be called a hybrid display.

Hybrid display is a method for displaying a letter and/or an image using reflected light and self-emitted light together in one panel that complement the color tone or light intensity of each other. Alternatively, hybrid display is a method for displaying a letter and/or an image using light from a plurality of display elements in one pixel or one subpixel. Note that when a hybrid display performing hybrid display is locally observed, a pixel or a subpixel performing display using any one of the plurality of display elements and a pixel or a subpixel performing display using two or more of the plurality of display elements are included in some cases.

Note that in this specification and the like, hybrid display satisfies any one or a plurality of the above-described descriptions.

Furthermore, a hybrid display includes a plurality of display elements in one pixel or one subpixel. Note that as an example of the plurality of display elements, a reflective element that reflects light and a self-luminous element that emits light can be given. Note that the reflective element and the self-luminous element can be controlled independently. A hybrid display has a function of displaying a letter and/or an image using one or both of reflected light and self-emitted light in a display portion.

The pixel 20(i,j) is electrically connected to the signal line S1(j), the signal line S2(j), the scan line G1(i), the scan line G2(i), the wiring CSCOM, and the wiring ANO.

The pixel 20(i,j) includes a switch SW1, a capacitor C11, a switch SW2, a transistor M, and a capacitor C12.

A transistor that includes a gate electrode electrically connected to the scan line G1(i) and a first electrode electrically connected to the signal line S1(j) can be used as the switch SW1.

The capacitor C11 includes a first electrode electrically connected to a second electrode of the transistor used as the switch SW1 and includes a second electrode electrically connected to the wiring CSCOM.

A transistor that includes a gate electrode electrically connected to the scan line G2(i) and a first electrode electrically connected to the signal line S2(j) can be used as the switch SW2.

The transistor M includes a gate electrode electrically connected to a second electrode of the transistor used as the switch SW2 and includes a first electrode electrically connected to the wiring ANO.

Note that the transistor M may include a first gate electrode and a second gate electrode. The first gate electrode and the second gate electrode may be electrically connected to each other. The first gate electrode and the second gate electrode preferably have regions overlapping with each other with a semiconductor film positioned therebetween.

The capacitor C12 includes a first electrode electrically connected to the second electrode of the transistor used as the switch SW2 and includes a second electrode electrically connected to the first electrode of the transistor M.

A first electrode of the reflective element 21a(i,j) is electrically connected to the second electrode of the transistor used as the switch SW1. A second electrode of the reflective element 21a(i,j) is electrically connected to a wiring VCOM1. This enables the reflective element 21a(i,j) to be driven.

A first electrode of the light-emitting element 21b(i,j) is electrically connected to the second electrode of the transistor M. A second electrode of the light-emitting element 21b(i,j) is electrically connected to a wiring VCOM2. This enables the display element 21b(i,j) to be driven.

The capacitor C11 has a function of retaining image data corresponding to an image to be displayed with the reflective element 21a, i.e., a function of retaining electric charges corresponding to the luminance of light reflected by the reflective element 21a. The capacitor C12 has a function of retaining image data corresponding to an image to be displayed with the light-emitting element 21b, i.e., a function of retaining electric charges corresponding to the emission intensity of the light-emitting element 21b.

The switch SW1 has a function of controlling writing and retention of image data to and in the capacitor C11. When the switch SW1 is on, the image data is written to the capacitor C11 through the signal line S1. When the switch SW1 is off, the image data is retained in the capacitor C11.

The switch SW2 has a function of controlling writing and retention of image data to and in the capacitor C12. When the switch SW2 is on, the image data is written to the capacitor C12 through the signal line S2. When the switch SW2 is off, the image data is retained in the capacitor C12.

The switches SW1 and SW2 are preferably OS transistors. Since an OS transistor has an extremely low off-state current, image data can be retained in the capacitors C11 and C12 for a long time. That is, the pixel 20 can retain image data for a long time. As a result, even if the number of times of writing image data into the pixel 20 in a certain period is small, the display 110 can keep displaying an image in accordance with the image data retained in the pixel 20. For example, without writing image data into the pixel 20 every frame, i.e., without performing refresh operation every frame, the display 110 can keep displaying an image in accordance with the image data retained in the pixel 20. This reduces the power consumption of the display device 10.

Figure 17A:
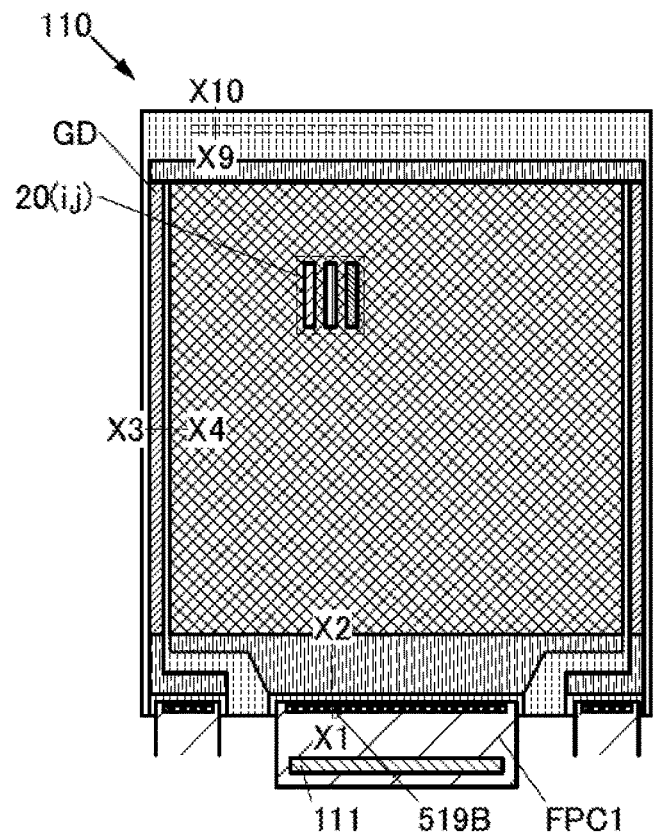
FIG. 17A is a top view illustrating a structure example of a display device.
Figure 17B:
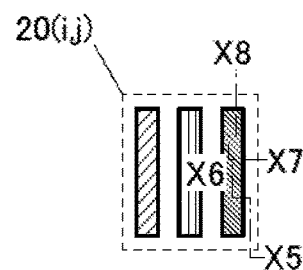
FIGS. 17B and 17C are each a top view illustrating a structure example of a pixel.
Figure 17C:
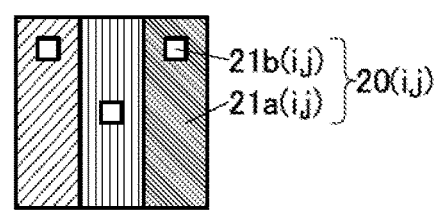

FIGS. 17A to 17C illustrate the structure of the display 110. FIG. 17A is a top view of the display 110. FIG. 17B is a top view illustrating one pixel of the display 110 illustrated in FIG. 17A. FIG. 17C is a schematic view illustrating the structure of the pixel illustrated in FIG. 17B.

In the example in FIG. 17A, the source driver 111 and a terminal 519B are provided over a flexible printed circuit FPC1.

The pixel 20(i,j) in FIG. 17C includes the reflective element 21a(i,j) and the light-emitting element 21b(i,j).

Figure 18A:
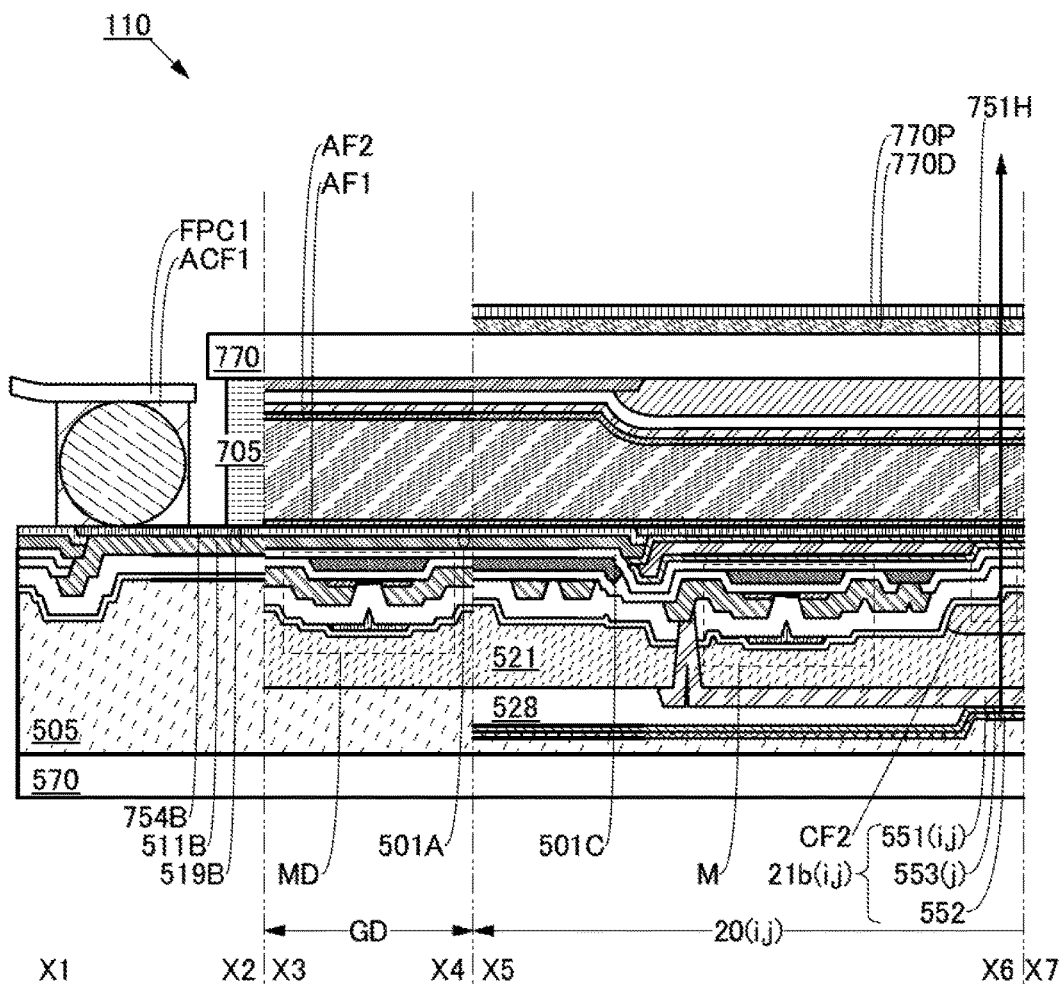
FIGS. 18A and 18B are cross-sectional views illustrating a structure example of a display device.
Figure 18B:
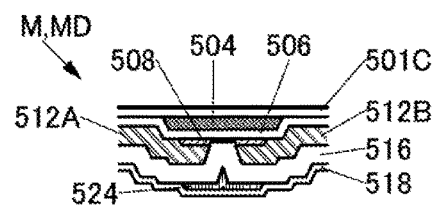

FIGS. 18A and 18B and FIGS. 19A and 19B are cross-sectional views illustrating the structure of the display 110. FIG. 18A is a cross-sectional view taken along lines X1-X2, X3-X4, and X5-X6 in FIG. 17A. FIG. 18B illustrates part of FIG. 18A.

Figure 19A:
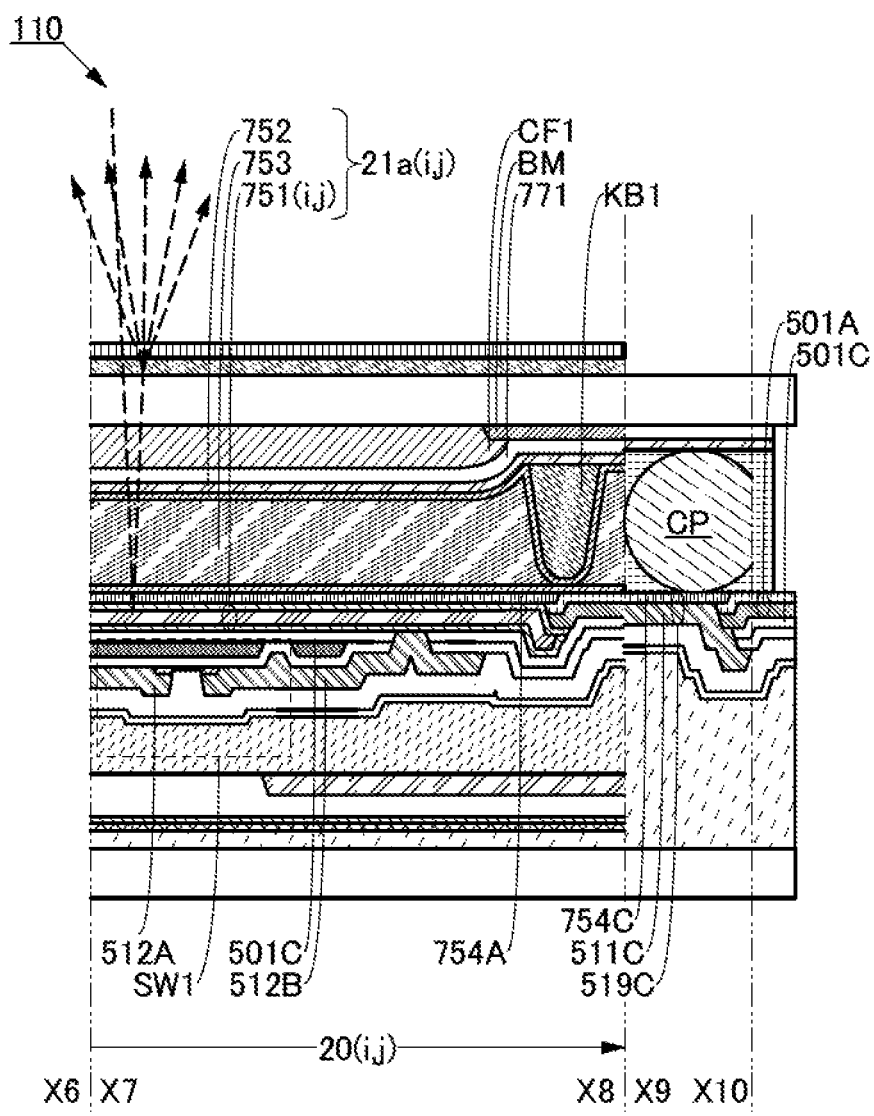
FIGS. 19A and 19B are cross-sectional views illustrating a structure example of a display device.
Figure 19B:
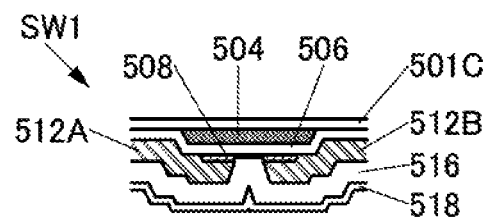

FIG. 19A is a cross-sectional view taken along lines X7-X8 and X9-X10 in FIG. 17B. FIG. 19B illustrates part of FIG. 19A.

Components of the display 110 will be described with reference to FIGS. 18A and 18B and FIGS. 19A and 19B.

The substrate 570 or the like can be formed using a material having heat resistance high enough to withstand heat treatment in the manufacturing process. For example, a material having a thickness of greater than or equal to 0.1 mm and less than or equal to 0.7 mm can be used for the substrate 570. Specifically, a material polished to a thickness of approximately 0.1 mm can be used.

For example, a large-sized glass substrate having any of the following sizes can be used as the substrate 570 or the like: the 6th generation (1500 mm×1850 mm), the 7th generation (1870 mm×2200 mm), the 8th generation (2200 mm×2400 mm), the 9th generation (2400 mm×2800 mm), and the 10th generation (2950 mm×3400 mm). Thus, a large-sized display device can be manufactured.

For the substrate 570 or the like, an organic material, an inorganic material, a composite material of an organic material and an inorganic material, or the like can be used. For example, an inorganic material such as glass, ceramic, or metal can be used for the substrate 570 or the like.

Specifically, non-alkali glass, soda-lime glass, potash glass, crystal glass, aluminosilicate glass, tempered glass, chemically tempered glass, quartz, sapphire, or the like can be used for the substrate 570 or the like. Specifically, an inorganic oxide film, an inorganic nitride film, an inorganic oxynitride film, or the like can be used for the substrate 570 or the like. For example, a silicon oxide film, a silicon nitride film, a silicon oxynitride film, an aluminum oxide film, or the like can be used for the substrate 570 or the like. Stainless steel, aluminum, or the like can be used for the substrate 570 or the like.

For example, a single crystal semiconductor substrate or a polycrystalline semiconductor substrate of silicon or silicon carbide, a compound semiconductor substrate of silicon germanium or the like, an SOI substrate, or the like can be used as the substrate 570 or the like. Thus, a semiconductor element can be provided over the substrate 570 or the like.

For example, an organic material such as a resin, a resin film, or plastic can be used for the substrate 570 or the like. Specifically, a resin film or a resin plate of polyester, polyolefin, polyamide, polyimide, polycarbonate, an acrylic resin, or the like can be used for the substrate 570 or the like.

For example, a composite material formed by attaching a metal plate, a thin glass plate, or a film of an inorganic material to a resin film or the like can be used for the substrate 570 or the like. For example, a composite material formed by dispersing a fibrous or particulate metal, glass, an inorganic material, or the like into a resin film can be used for the substrate 570 or the like. For example, a composite material formed by dispersing a fibrous or particulate resin, an organic material, or the like into an inorganic material can be used for the substrate 570 or the like.

Furthermore, a single-layer material or a layered material in which a plurality of layers are stacked can be used for the substrate 570 or the like. For example, a layered material in which a base, an insulating film that prevents diffusion of impurities contained in the base, and the like are stacked can be used for the substrate 570 or the like. Specifically, a layered material in which glass and one or a plurality of films that are selected from a silicon oxide layer, a silicon nitride layer, a silicon oxynitride layer, and the like and that prevent diffusion of impurities contained in the glass are stacked can be used for the substrate 570 or the like. Alternatively, a layered material in which a resin and a film for preventing diffusion of impurities that penetrate the resin, such as a silicon oxide film, a silicon nitride film, or a silicon oxynitride film, are stacked can be used for the substrate 570 or the like.

Specifically, a resin film, a resin plate, a layered material, or the like of polyester, polyolefin, polyamide, polyimide, polycarbonate, an acrylic resin, or the like can be used for the substrate 570 or the like.

Specifically, a material including polyester, polyolefin, polyamide (e.g., nylon or aramid), polyimide, polycarbonate, polyurethane, an acrylic resin, an epoxy resin, or a resin having a siloxane bond, such as silicone, can be used for the substrate 570 or the like.

Specifically, polyethylene terephthalate (PET), polyethylene naphthalate (PEN), polyethersulfone (PES), an acrylic resin, or the like can be used for the substrate 570 or the like. Alternatively, a cycloolefin polymer (COP), a cycloolefin copolymer (COC), or the like can be used.

Alternatively, paper, wood, or the like can be used for the substrate 570 or the like.

For example, a flexible substrate can be used as the substrate 570 or the like.

Note that a transistor, a capacitor, or the like can be directly formed on the substrate. Alternatively, a transistor, a capacitor, or the like can be formed on a substrate which is for use in the manufacturing process and can withstand heat applied in the manufacturing process, and then the transistor, the capacitor, or the like can be transferred to the substrate 570 or the like. Accordingly, a transistor, a capacitor, or the like can be formed over a flexible substrate.

A light-transmitting material can be used for a substrate 770. Specifically, any of the materials that can be used for the substrate 570 can be used for the substrate 770.

For example, aluminosilicate glass, tempered glass, chemically tempered glass, sapphire, or the like can be favorably used for the substrate 770 that is provided on the user side of the display panel. This can prevent damage or a crack of the display panel caused by the use thereof.

Moreover, a material having a thickness of greater than or equal to 0.1 mm and less than or equal to 0.7 mm, for example, can be used for the substrate 770. Specifically, a substrate polished for reducing the thickness can be used. Thus, a functional film 770D can be provided so as to be close to the reflective element $21a(i,j)$. As a result, image blur can be reduced and an image can be displayed clearly.

For example, an organic material, an inorganic material, or a composite material of an organic material and an inorganic material can be used for the structure body KB1. Accordingly, a predetermined space can be provided between components between which the structure KB1 and the like are provided.

Specifically, for the structure body KB1, polyester, polyolefin, polyamide, polyimide, polycarbonate, polysiloxane, an acrylic resin, or the like, or a composite material of a plurality of resins selected from these can be used. Alternatively, a photosensitive material may be used.

For a sealant 705, an inorganic material, an organic material, a composite material of an inorganic material and an organic material, or the like can be used.

For example, an organic material such as a thermally fusible resin or a curable resin can be used for the sealant 705 or the like.

For example, an organic material such as a reactive curable adhesive, a photo-curable adhesive, a thermosetting adhesive, and/or an anaerobic adhesive can be used for the sealant 705 or the like.

Specifically, an adhesive containing an epoxy resin, an acrylic resin, a silicone resin, a phenol resin, a polyimide resin, an imide resin, a polyvinyl chloride (PVC) resin, a polyvinyl butyral (PVB) resin, an ethylene vinyl acetate (EVA) resin, or the like can be used for the sealant 705 or the like.

Any of the materials that can be used for the sealant 705 can be used for a bonding layer 505.

For example, an insulating inorganic material, an insulating organic material, or an insulating composite material containing an inorganic material and an organic material can be used for an insulating film 521, an insulating film 518, or the like.

Specifically, an inorganic oxide film, an inorganic nitride film, an inorganic oxynitride film, or a layered material obtained by stacking some of these films can be used as the insulating film 521, the insulating film 518, and the like. For example, a film including any of a silicon oxide film, a silicon nitride film, a silicon oxynitride film, an aluminum oxide film, and the like, or a film including a material obtained by stacking some of these films can be used as the insulating film 521, the insulating film 518, and the like.

Specifically, for the insulating film 521, the insulating film 518, and the like, polyester, polyolefin, polyamide, polyimide, polycarbonate, polysiloxane, an acrylic resin, or the like, or a layered or composite material of a plurality of kinds of resins selected from these can be used. Alternatively, a photosensitive material may be used.

Thus, steps due to various components overlapping with the insulating film 521 and the insulating film 518, for example, can be reduced.

For example, any of the materials that can be used for the insulating film 521 can be used for an insulating film 528. Specifically, a 1-μm-thick polyimide-containing film can be used as the insulating film 528.

For example, any of the materials that can be used for the insulating film 521 can be used for an insulating film 501A. For example, a material having a function of supplying hydrogen can be used for the insulating film 501A.

Specifically, a material obtained by stacking a material containing silicon and oxygen and a material containing silicon and nitrogen can be used for the insulating film 501A. For example, a material having a function of releasing hydrogen by heating or the like to supply the hydrogen to another component can be used for the insulating film 501A. Specifically, a material having a function of releasing hydrogen taken in the manufacturing process, by heating or the like, to supply the hydrogen to another component can be used for the insulating film 501A.

For example, a film containing silicon and oxygen that is formed by a chemical vapor deposition method using silane or the like as a source gas can be used as the insulating film 501A.

Specifically, a material obtained by stacking a material containing silicon and oxygen and having a thickness of greater than or equal to 200 nm and less than or equal to 600 nm and a material containing silicon and nitrogen and having a thickness of approximately 200 nm can be used for the insulating film 501A.

For example, any of the materials that can be used for the insulating film 521 can be used for an insulating film 501C. Specifically, a material containing silicon and oxygen can be used for the insulating film 501C. Thus, impurity diffusion into the pixel circuit, a light-emitting element, or the like can be suppressed.

For example, a 200-nm-thick film containing silicon, oxygen, and nitrogen can be used as the insulating film 501C.

For example, a film having a thickness of greater than or equal to 10 nm and less than or equal to 500 nm, preferably greater than or equal to 10 nm and less than or equal to 100 nm, can be used as an intermediate film 754A, an intermediate film 754B, and an intermediate film 754C. In this specification, the intermediate film 754A, the intermediate film 754B, or the intermediate film 754C is referred to as an intermediate film.

For example, a material having a function of allowing the passage of hydrogen or the supply of hydrogen can be used for the intermediate film. For example, a conductive material can be used for the intermediate film. For example, a light-transmitting material can be used for the intermediate film.

Specifically, a material containing indium and oxygen, a material containing indium, gallium, zinc, and oxygen, a material containing indium, tin, and oxygen, or the like can be used for the intermediate film. Note that these materials have a function of allowing the passage of hydrogen.

Specifically, a 50- or 100-nm-thick film containing indium, gallium, zinc, and oxygen can be used as the intermediate film.

Note that a material obtained by stacking films functioning as an etching stopper can be used as the intermediate film. Specifically, a layered material obtained by stacking a 50-nm-thick film containing indium, gallium, zinc, and oxygen and a 20-nm-thick film containing indium, tin, and oxygen, in this order, can be used for the intermediate film.

For example, a conductive material can be used for a wiring or the like. Specifically, the conductive material can be used for the signal line S1($j$), the signal line S2($j$), the scan line G1($i$), the scan line G2($i$), the wiring CSCOM, the wiring ANO, the terminal 519B, a terminal 519C, a conductive film 511B, a conductive film 511C, or the like.

For example, an inorganic conductive material, an organic conductive material, a metal material, a conductive ceramic material, or the like can be used for the wiring or the like.

Specifically, a metal element selected from aluminum, gold, platinum, silver, copper, chromium, tantalum, titanium, molybdenum, tungsten, nickel, iron, cobalt, palladium, and manganese, or the like can be used for the wiring or the like. Alternatively, an alloy including any of the above-described metal elements, or the like can be used for the wiring or the like. In particular, an alloy of copper and manganese is suitably used in microfabrication with the use of a wet etching method.

Specifically, a two-layer structure in which a titanium film is stacked over an aluminum film, a two-layer structure in which a titanium film is stacked over a titanium nitride film, a two-layer structure in which a tungsten film is stacked over a titanium nitride film, a two-layer structure in which a tungsten film is stacked over a tantalum nitride film or a tungsten nitride film, a three-layer structure in which a titanium film, an aluminum film, and a titanium film are stacked in this order, or the like can be used for the wiring or the like.

Specifically, a conductive oxide such as indium oxide, indium tin oxide, indium zinc oxide, zinc oxide, or zinc oxide to which gallium is added can be used for the wiring or the like.

Specifically, a film containing graphene or graphite can be used for the wiring or the like.

For example, a film including graphene oxide is formed and is reduced, so that a film including graphene can be formed. As a reducing method, a method using heat, a method using a reducing agent, or the like can be employed.

For example, a film including a metal nanowire can be used for the wiring or the like. Specifically, a nanowire including silver can be used.

Specifically, a conductive polymer can be used for the wiring or the like.

Note that the terminal 519B can be electrically connected to the flexible printed circuit FPC1 using a conductive material ACF1, for example.

The reflective element 21a(i,j) is a display element having a function of controlling reflection of light. For example, a liquid crystal element, an electrophoretic element, a display element using MEMS, or the like can be used. Specifically, a reflective liquid crystal display element can be used as the reflective element 21a(i,j). The use of a reflective display element can reduce the power consumption of a display panel.

For example, a liquid crystal element that can be driven by any of the following driving methods can be used: an in-plane switching (IPS) mode, a twisted nematic (TN) mode, a fringe field switching (FFS) mode, an axially symmetric aligned micro-cell (ASM) mode, an optically compensated birefringence (OCB) mode, a ferroelectric liquid crystal (FLC) mode, an antiferroelectric liquid crystal (AFLC) mode, and the like.

In addition, a liquid crystal element that can be driven by, for example, a vertical alignment (VA) mode such as a multi-domain vertical alignment (MVA) mode, a patterned vertical alignment (PVA) mode, an electrically controlled birefringence (ECB) mode, a continuous pinwheel alignment (CPA) mode, or an advanced super view (ASV) mode can be used.

In the case where the reflective element 21(i,j) is a liquid crystal element, the resistivity of a liquid crystal material used in the liquid crystal element is greater than or equal to $1.0 \times 10^{13}$ Ω·cm, preferably greater than or equal to $1.0 \times 10^{14}$ Ω·cm, further preferably greater than or equal to $1.0 \times 10^{15}$ Ω·cm. A negative liquid crystal material is preferably used for the liquid crystal. Such a structure can inhibit a change in transmittance of the liquid crystal caused by a reduction in the number of times of writing image data in a certain period. For example, the transmittance of the liquid crystal can be inhibited from changing even when image data is not written in the pixel 20 every frame, i.e., even when refresh operation is not performed every frame. A minimized change in the transmittance of the liquid crystal leads to a minimized reduction in the quality of an image displayed by the display 110.

Note that a transmissive display element may be used as the reflective element 21a. For example, the reflective element 21a may be a transmissive or semi-transmissive display element.

The reflective element 21a(i,j) includes an electrode 751(i,j), an electrode 752, and a layer 753 containing a liquid crystal material. The layer 753 contains a liquid crystal material whose alignment is controlled by a voltage applied between the electrode 751(i,j) and the electrode 752. For example, the alignment of the liquid crystal material can be controlled by an electric field in the thickness direction (also referred to as the vertical direction) of the layer 753, or the direction that crosses the vertical direction (the horizontal direction, or the diagonal direction).

For example, thermotropic liquid crystal, low-molecular liquid crystal, high-molecular liquid crystal, polymer-dispersed liquid crystal, ferroelectric liquid crystal, anti-ferroelectric liquid crystal, or the like can be used for the layer 753. A liquid crystal material that exhibits a cholesteric phase, a smectic phase, a cubic phase, a chiral nematic phase, an isotropic phase, or the like can be used. Alternatively, a liquid crystal material that exhibits a blue phase can be used.

For example, the material that is used for the wiring or the like can be used for the electrode 751(i,j). Specifically, a reflective film can be used for the electrode 751(i,j). For example, a material in which a light-transmitting conductive film and a reflective film having an opening are stacked can be used for the electrode 751(i,j).

For example, a material having conductivity can be used for the electrode 752. For example, a material having a visible-light-transmitting property can be used for the electrode 752.

For example, a conductive oxide, a metal film thin enough to transmit light, or a metal nanowire can be used for the electrode 752.

Specifically, a conductive oxide containing indium can be used for the electrode 752. Alternatively, a metal thin film having a thickness of greater than or equal to 1 nm and less than or equal to 10 nm can be used for the electrode 752. Alternatively, a metal nanowire containing silver can be used for the electrode 752.

Specifically, indium oxide, indium tin oxide, indium zinc oxide, zinc oxide, zinc oxide to which gallium is added, zinc oxide to which aluminum is added, or the like can be used for the electrode 752.

For example, a material reflecting visible light can be used for the reflective film. Specifically, a material containing silver can be used for the reflective film. For example, a material containing silver, palladium, and the like or a material containing silver, copper, and the like can be used for the reflective film.

The reflective film reflects light that passes through the layer 753, for example. This allows the reflective element 21a(i,j) to serve as a reflective display element. Alternatively, a material with an uneven surface can be used for the reflective film. In that case, incident light can be reflected in various directions so that a white image can be displayed.

For example, the electrode 751(i,j), or the like can be used as a reflective film.

For example, the reflective film can be provided as a film including a region sandwiched between the layer 753 and the electrode 751(i,j). In the case where the electrode 751(i,j) has a light-transmitting property, the reflective film can be used as a film including a region provided so that the electrode 751(i,j) is positioned between the region and the layer 753.

The reflective film preferably has a shape, for example, including a region that does not block light emitted from the light-emitting element 21b(i,j). For example, the reflective film may have a shape with one or a plurality of openings 751H.

The opening may have a polygonal shape, a quadrangular shape, an elliptical shape, a circular shape, a cross-like shape, or the like. The opening 751H may also have a stripe shape, a slit-like shape, or a checkered pattern.

If the ratio of the total area of the opening 751H to the total area except for the openings is too high, display performed using the reflective element 21a(i,j) is dark.

If the ratio of the total area of the opening 751H to the total area except for the openings is too low, display performed using the light-emitting element 21b(i,j) is dark.

Figure 20A:
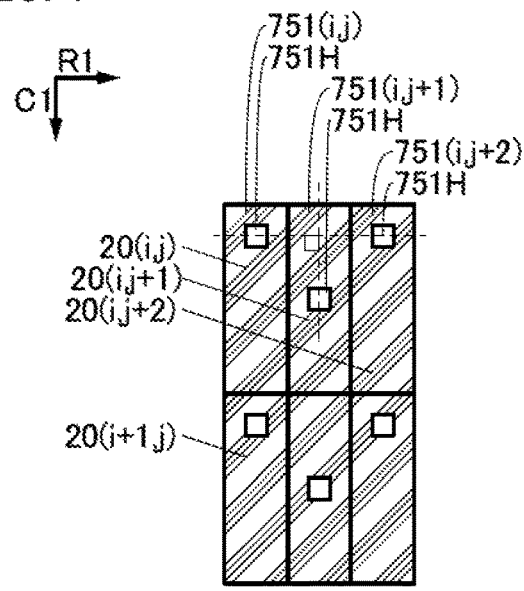
FIGS. 20A to 20C schematically illustrate shapes of reflective films.
Figure 20B:
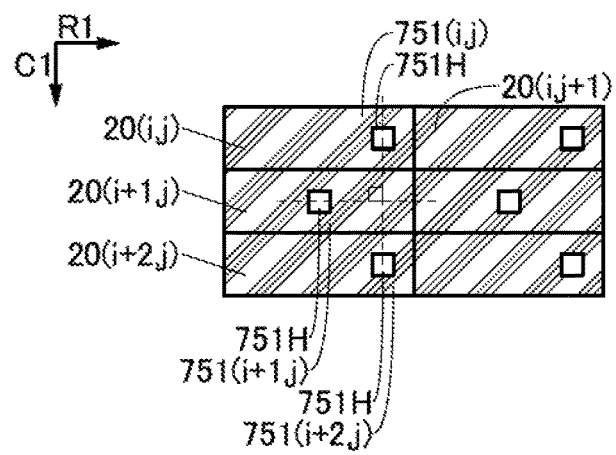
Figure 20C:
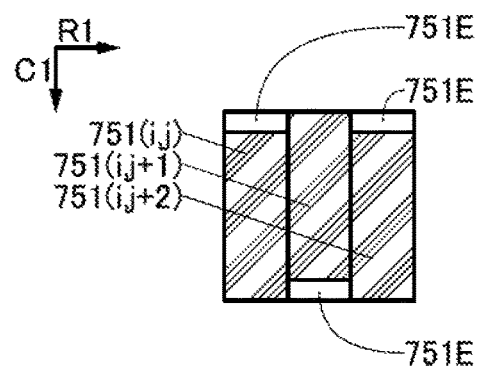

FIGS. 20A to 20C are schematic views each illustrating the shape of a reflective film that can be used in a pixel of the display 110.

The opening 751H of the pixel 20(i,j+1), which is adjacent to the pixel 20(i,j), is not provided on a line that extends in the row direction (the direction indicated by the arrow R1 in each of FIGS. 20A to 20C) through the opening 751H of the pixel 20(i,j) (see FIG. 20A). Alternatively, for example, the opening 751H of the pixel 20(*i*+1,*j*), which is adjacent to the pixel 20(*i*,*j*), is not provided on a line that extends in the column direction (the direction indicated by the arrow C1 in each of FIGS. 20A to 20C) through the opening 751H of the pixel 20(*i*,*j*) (see FIG. 20B).

For example, the opening 751H of the pixel 20(*i*,*j*+2) is provided on a line that extends in the row direction through the opening 751H of the pixel 20(*i*,*j*) (see FIG. 20A). In addition, the opening 751H of the pixel 20(*i*,*j*+1) is provided on a line that is perpendicular to the above-mentioned line between the opening 751H of the pixel 20(*i*,*j*) and the opening 751H of the pixel 20(*i*,*j*+2).

Alternatively, for example, the opening 751H of the pixel 20(*i*+2,*j*) is provided on a line that extends in the column direction through the opening 751H of the pixel 20(*i*,*j*) (see FIG. 20B). In addition, for example, the opening 751H of the pixel 20(*i*+1,*j*) is provided on a line that is perpendicular to the above-mentioned line between the opening 751H of the pixel 20(*i*,*j*) and the opening 751H of the pixel 20(*i*+2,*j*).

Thus, the light-emitting element that includes a region overlapping with an opening of a pixel adjacent to one pixel can be apart from the light-emitting element that includes a region overlapping with an opening of the one pixel. Furthermore, a display element that exhibits color different from that exhibited by the light-emitting element of the one pixel can be provided as the light-emitting element of the pixel adjacent to the one pixel. Furthermore, the difficulty in adjacently arranging a plurality of display elements that exhibit different colors can be lowered.

For example, the reflective film can be formed using a material having a shape in which an end portion is cut off so as to form a region 751E that does not block light emitted from the light-emitting element 21*b*(*i*,*j*) (see FIG. 20C). Specifically, the electrode 751(*i*,*j*) whose end portion is cut off so as to be shorter in the column direction (the direction indicated by the arrow C1 in the drawing) can be used as the reflective film.

For example, an alignment film AF1 and an alignment film AF2 can be formed with a material containing polyimide or the like. Specifically, a material formed by rubbing treatment or an optical alignment technique so that a liquid crystal material has alignment in a predetermined direction can be used.

For example, a film containing soluble polyimide can be used as the alignment film AF1 or the alignment film AF2. In this case, the temperature required in forming the alignment film AF1 or the alignment film AF2 can be low. Accordingly, damage to other components at the time of forming the alignment film AF1 or the alignment film AF2 can be suppressed.

A material transmitting light of a predetermined color can be used for a coloring film CF1 and a coloring film CF2. Thus, the coloring film CF1 or the coloring film CF2 can be used as a color filter, for example. For example, a material that transmits blue light, green light, or red light can be used for the coloring film CF1 or the coloring film CF2. Furthermore, a material that transmits yellow light, white light, or the like can be used for the coloring film CF1 or the coloring film CF2.

Note that a material having a function of converting the emitted light to a predetermined color light can be used for the coloring film CF2. Specifically, quantum dots can be used for the coloring film CF2. Thus, display with high color purity can be achieved.

A material that prevents light transmission can be used for a light-blocking film BM. Thus, the light-blocking film BM can be used as, for example, a black matrix.

An insulating film 771 can be formed of polyimide, an epoxy resin, or an acrylic resin, for example.

An anti-reflection film, a polarizing film, a retardation film, a light diffusion film, a condensing film, or the like can be used as a functional film 770P or the functional film 770D.

Specifically, a film containing a dichromatic pigment can be used as the functional film 770P or the functional film 770D. Furthermore, a material having a pillar-shaped structure with an axis in a direction that intersects a surface of the substrate can be used for the functional film 770P or the functional film 770D. This makes it easy to transmit light in a direction along the axis and to scatter light in the other directions.

Alternatively, an antistatic film preventing the attachment of a foreign substance, a water repellent film suppressing the attachment of stain, a hard coat film suppressing a scratch in use, or the like can be used as the functional film 770P.

Specifically, a circularly polarizing film can be used as the functional film 770P. Furthermore, a light diffusion film can be used as the functional film 770D.

The light-emitting element 21*b*(*i*,*j*) can be an EL element such as an organic electroluminescence element or an inorganic electroluminescence element, a light-emitting diode, or the like. Alternatively, quantum dots can be used for the light-emitting element. Further alternatively, the light-emitting element 21*b*(*i*,*j*) may be a combination of a transmissive display element such as a transmissive liquid crystal element and a backlight.

The light-emitting element 21*b*(*i*,*j*) includes an electrode 551(*i*,*j*), an electrode 552, and a layer 553(*j*) containing a light-emitting material.

For example, a light-emitting organic compound can be used for the layer 553(*j*).

For example, quantum dots can be used for the layer 553(*j*). Accordingly, the half width becomes narrow, and light of a bright color can be emitted.

A quantum dot is a semiconductor nanocrystal with a size of several nanometers and contains approximately $1\times10^3$ to $1\times10^6$ atoms. Since energy shift of quantum dots depends on their size, quantum dots made of the same substance emit light with different wavelengths depending on their size; thus, emission wavelengths can be easily adjusted by changing the size of quantum dots.

Since a quantum dot has an emission spectrum with a narrow peak, emission with high color purity can be obtained. In addition, a quantum dot is said to have a theoretical internal quantum efficiency of approximately 100%, which far exceeds that of a fluorescent organic compound, i.e., 25%, and is comparable to that of a phosphorescent organic compound. Therefore, a quantum dot can be used as a light-emitting material to obtain a light-emitting element having high emission efficiency. Furthermore, since a quantum dot which is an inorganic compound has high inherent stability, a light-emitting element which is favorable also in terms of lifetime can be obtained.

Examples of a material of a quantum dot include a Group 14 element in the periodic table, a Group 15 element in the periodic table, a Group 16 element in the periodic table, a compound of a plurality of Group 14 elements in the periodic table, a compound of an element belonging to any of Groups 4 to 14 in the periodic table and a Group 16 element in the periodic table, a compound of a Group 2 element in the periodic table and a Group 16 element in the periodic table, a compound of a Group 13 element in the periodic table and a Group 15 element in the periodic table, a compound of a Group 13 element in the periodic table and a Group 17 element in the periodic table, a compound of a Group 14 element in the periodic table and a Group 15 element in the periodic table, a compound of a Group 11 element in the periodic table and a Group 17 element in the periodic table, iron oxides, titanium oxides, spinel chalcogenides, and semiconductor clusters.

Specific examples include, but are not limited to, cadmium selenide; cadmium sulfide; cadmium telluride; zinc selenide; zinc oxide; zinc sulfide; zinc telluride; mercury sulfide; mercury selenide; mercury telluride; indium arsenide; indium phosphide; gallium arsenide; gallium phosphide; indium nitride; gallium nitride; indium antimonide; gallium antimonide; aluminum phosphide; aluminum arsenide; aluminum antimonide; lead selenide; lead telluride; lead sulfide; indium selenide; indium telluride; indium sulfide; gallium selenide; arsenic sulfide; arsenic selenide; arsenic telluride; antimony sulfide; antimony selenide; antimony telluride; bismuth sulfide; bismuth selenide; bismuth telluride; silicon; silicon carbide; germanium; tin; selenium; tellurium; boron; carbon; phosphorus; boron nitride; boron phosphide; boron arsenide; aluminum nitride; aluminum sulfide; barium sulfide; barium selenide; barium telluride; calcium sulfide; calcium selenide; calcium telluride; beryllium sulfide; beryllium selenide; beryllium telluride; magnesium sulfide; magnesium selenide; germanium sulfide; germanium selenide; germanium telluride; tin sulfide; tin selenide; tin telluride; lead oxide; copper fluoride; copper chloride; copper bromide; copper iodide; copper oxide; copper selenide; nickel oxide; cobalt oxide; cobalt sulfide; triiron tetraoxide; iron sulfide; manganese oxide; molybdenum sulfide; vanadium oxide; tungsten oxide; tantalum oxide; titanium oxide; zirconium oxide; silicon nitride; germanium nitride; aluminum oxide; barium titanate; a compound of selenium, zinc, and cadmium; a compound of indium, arsenic, and phosphorus; a compound of cadmium, selenium, and sulfur; a compound of cadmium, selenium, and tellurium; a compound of indium, gallium, and arsenic; a compound of indium, gallium, and selenium; a compound of indium, selenium, and sulfur; a compound of copper, indium, and sulfur; and combinations thereof. What is called an alloyed quantum dot, whose composition is represented by a given ratio, may be used. For example, an alloyed quantum dot of a compound of cadmium, selenium, and sulfur is a means effective in obtaining blue light because the emission wavelength can be changed by changing the content ratio of elements.

As the quantum dot, any of a core-type quantum dot, a core-shell quantum dot, a core-multishell quantum dot, and the like can be used. Note that when a core is covered with a shell formed of another inorganic material having a wider band gap, the influence of defects and dangling bonds existing at the surface of a nanocrystal can be reduced. Since such a structure can significantly improve the quantum efficiency of light emission, it is preferable to use a core-shell or core-multishell quantum dot. Examples of the material of a shell include zinc sulfide and zinc oxide.

Quantum dots have a high proportion of surface atoms and thus have high reactivity and easily cohere together. For this reason, it is preferable that a protective agent be attached to, or a protective group be provided at the surfaces of quantum dots. The attachment of the protective agent or the provision of the protective group can prevent cohesion and increase solubility in a solvent. It can also reduce reactivity and improve electrical stability. Examples of the protective agent (or the protective group) include polyoxyethylene alkyl ethers such as polyoxyethylene lauryl ether, polyoxyethylene stearyl ether, and polyoxyethylene oleyl ether; trialkylphosphines such as tripropylphosphine, tributylphosphine, trihexylphosphine, and trioctylphoshine; polyoxyethylene alkylphenyl ethers such as polyoxyethylene n-octylphenyl ether and polyoxyethylene n-nonylphenyl ether; tertiary amines such as tri(n-hexyl)amine, tri(n-octyl)amine, and tri(n-decyl)amine; organophosphorus compounds such as tripropylphosphine oxide, tributylphosphine oxide, trihexylphosphine oxide, trioctylphosphine oxide, and tridecylphosphine oxide; polyethylene glycol diesters such as polyethylene glycol dilaurate and polyethylene glycol distearate; organic nitrogen compounds such as nitrogen-containing aromatic compounds, e.g., pyridines, lutidines, collidines, and quinolines; aminoalkanes such as hexylamine, octylamine, decylamine, dodecylamine, tetradecylamine, hexadecylamine, and octadecylamine; dialkylsulfides such as dibutylsulfide; dialkylsulfoxides such as dimethylsulfoxide and dibutylsulfoxide; organic sulfur compounds such as sulfur-containing aromatic compounds, e.g., thiophenes; higher fatty acids such as a palmitin acid, a stearic acid, and an oleic acid; alcohols; sorbitan fatty acid esters; fatty acid modified polyesters; tertiary amine modified polyurethanes; and polyethyleneimines.

Since band gaps of quantum dots are increased as their size is decreased, the size is adjusted as appropriate so that light with a desired wavelength can be obtained. Light emission from the quantum dots is shifted to a blue color side, i.e., a high energy side, as the crystal size is decreased; thus, emission wavelengths of the quantum dots can be adjusted over a wavelength region of a spectrum of an ultraviolet region, a visible light region, and an infrared region by changing the size of quantum dots. The range of size (diameter) of quantum dots which is usually used is 0.5 nm to 20 nm, preferably 1 nm to 10 nm. The emission spectra are narrowed as the size distribution of the quantum dots gets smaller, and thus light can be obtained with high color purity. The shape of the quantum dots is not particularly limited and may be a spherical shape, a rod shape, a circular shape, or the like. Quantum rods which are rod-like shape quantum dots emit directional light polarized in the c-axis direction; thus, quantum rods can be used as a light-emitting material to obtain a light-emitting element with higher external quantum efficiency.

In most EL elements, to improve emission efficiency, light-emitting materials are dispersed in host materials and the host materials need to be substances each having a singlet excitation energy or a triplet excitation energy higher than or equal to that of the light-emitting material. In the case of using a blue phosphorescent material, it is particularly difficult to develop a host material which has a triplet excitation energy higher than or equal to that of the blue phosphorescent material and which is excellent in terms of a lifetime. On the other hand, even when a light-emitting layer is composed of quantum dots and made without a host material, the quantum dots enable emission efficiency to be ensured; thus, a light-emitting element which is favorable in terms of a lifetime can be obtained. In the case where the light-emitting layer is composed of quantum dots, the quantum dots preferably have core-shell structures (including core-multishell structures).

For example, a layered material for emitting blue light, green light, or red light, or the like can be used for the layer 553(j).

For example, a belt-like layered material that extends in the column direction along the signal line S2(j) can be used for the layer 553(j).

Alternatively, a layered material for emitting white light can be used for the layer 5530. Specifically, a layered material in which a layer containing a light-emitting material including a fluorescent material that emits blue light, and a layer containing materials that are other than a fluorescent material and that emit green light and/or red light or a layer containing a material that is other than a fluorescent material and that emits yellow light are stacked can be used for the layer $553(j)$.

For example, a material that can be used for the wiring or the like can be used for the electrode $551(i,j)$.

For example, a material that transmits visible light selected from materials that can be used for the wiring or the like can be used for the electrode $551(i,j)$.

Specifically, conductive oxide, indium-containing conductive oxide, indium oxide, indium tin oxide, indium zinc oxide, zinc oxide, zinc oxide to which gallium is added, or the like can be used for the electrode $551(i,j)$. Alternatively, a metal film that is thin enough to transmit light can be used as the electrode $551(i,j)$. Further alternatively, a metal film that transmits part of light and reflects another part of light can be used as the electrode $551(i,j)$. Thus, the light-emitting element $21b(i,j)$ can be provided with a microcavity structure. Consequently, light of a predetermined wavelength can be extracted more efficiently than light of the other wavelengths.

For example, a material that can be used for the wiring or the like can be used for the electrode 552. Specifically, a material that reflects visible light can be used for the electrode 552.

Any of a variety of sequential circuits, such as a shift register, can be used as the gate driver 112. For example, a transistor MD, a capacitor, and the like can be used in the gate driver 112. Specifically, a transistor including a semiconductor film that can be formed in the same process as the semiconductor film of the transistor M or the transistor which can be used as the switch SW1 can be used.

As the transistor MD, a transistor having a different structure from the transistor that can be used as the switch SW1 can be used, for example. Specifically, a transistor including a conductive film 524 can be used as the transistor MD.

Note that the transistor MD can have the same structure as the transistor M.

For example, semiconductor films formed in the same step can be used for transistors in the gate driver, the source driver, and the pixel circuit.

For example, a bottom-gate transistor, a top-gate transistor, or the like can be used for transistors in the gate driver, the source driver, or a pixel circuit.

For example, the OS transistor described in Embodiment 1 can be used. For example, a transistor including a metal oxide film 508, a conductive film 504, a conductive film 512A, and a conductive film 512B can be used as the switch SW1 (see FIG. 19B). Note that an insulating film 506 includes a region sandwiched between the metal oxide film 508 and the conductive film 504.

The conductive film 504 includes a region overlapping with the metal oxide film 508. The conductive film 504 has a function of a gate electrode. The insulating film 506 has a function of a gate insulating film.

The conductive film 512A and the conductive film 512B are electrically connected to the metal oxide film 508. The conductive film 512A has one of a function of a source electrode and a function of a drain electrode, and the conductive film 512B has the other.

A transistor including the conductive film 524 can be used as the transistor in the gate driver, the source driver, or the pixel circuit. The conductive film 524 includes a region so that the metal oxide film 508 is sandwiched between the conductive film 504 and the region. Note that an insulating film 516 includes a region sandwiched between the conductive film 524 and the metal oxide film 508. For example, the conductive film 524 is electrically connected to a wiring that supplies the same potential as that supplied to the conductive film 504.

A conductive film in which a 10-nm-thick film containing tantalum and nitrogen and a 300-nm-thick film containing copper are stacked in this order can be used as the conductive film 504, for example. Note that the film containing copper includes a region so that the film containing tantalum and nitrogen is sandwiched between the region and the insulating film 506.

A material in which a 400-nm-thick film containing silicon and nitrogen and a 200-nm-thick film containing silicon, oxygen, and nitrogen are stacked can be used for the insulating film 506, for example. Note that the film containing silicon and nitrogen includes a region so that the film containing silicon, oxygen, and nitrogen is sandwiched between the region and the metal oxide film 508.

A 25-nm-thick film containing indium, gallium, and zinc can be used as the metal oxide film 508, for example.

A conductive film in which a 50-nm-thick film containing tungsten, a 400-nm-thick film containing aluminum, and a 100-nm-thick film containing titanium are stacked in this order can be used as the conductive film 512A or the conductive film 512B, for example. Note that the film containing tungsten includes a region in contact with the metal oxide film 508.

Figure 21A:
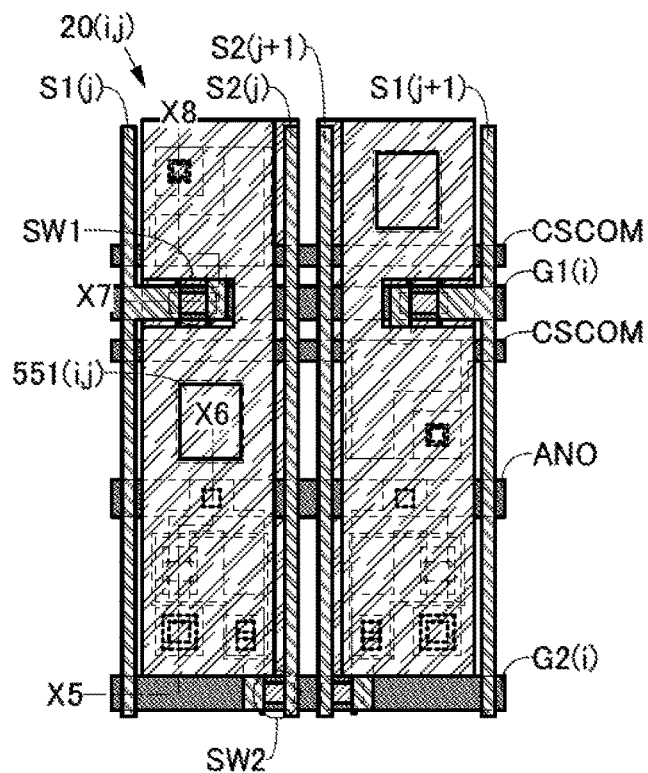
FIGS. 21A and 21B are bottom views each illustrating part of pixels of a display device.
Figure 21B:
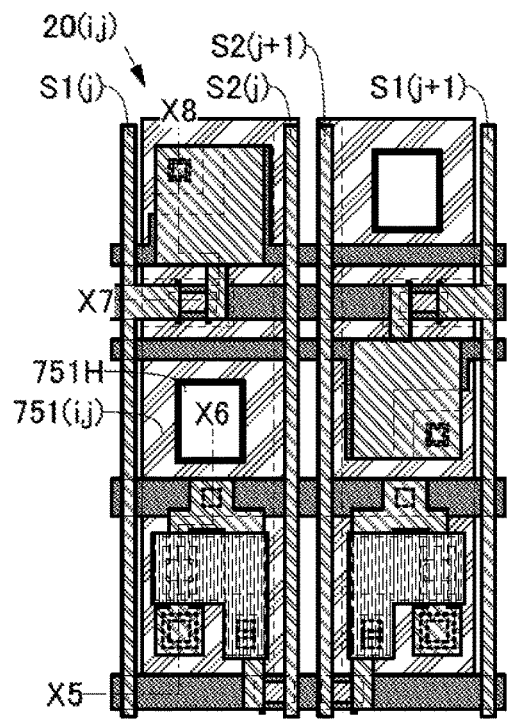

FIG. 21A is a bottom view illustrating part of the pixel of the display panel in FIG. 17B. FIG. 21B is a bottom view illustrating part of the structure in FIG. 21A in which some components are omitted.

At least part of this embodiment can be implemented in combination with any of the other embodiments described in this specification as appropriate.

Embodiment 3

In this embodiment, a display device including a touch sensor will be described.

Figure 22:
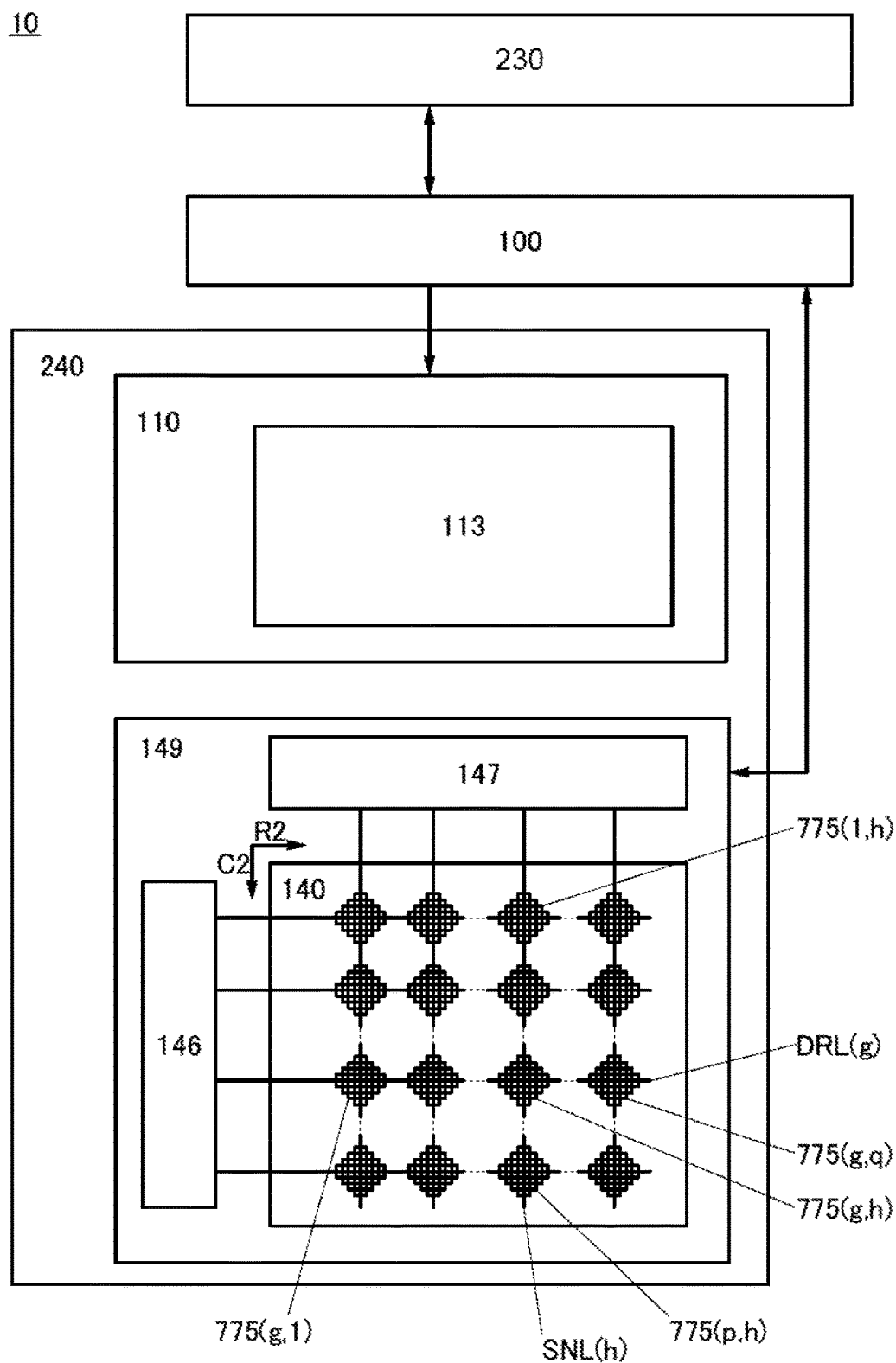
FIG. 22 is a block diagram illustrating a configuration example of a display device.
Figure 23A:
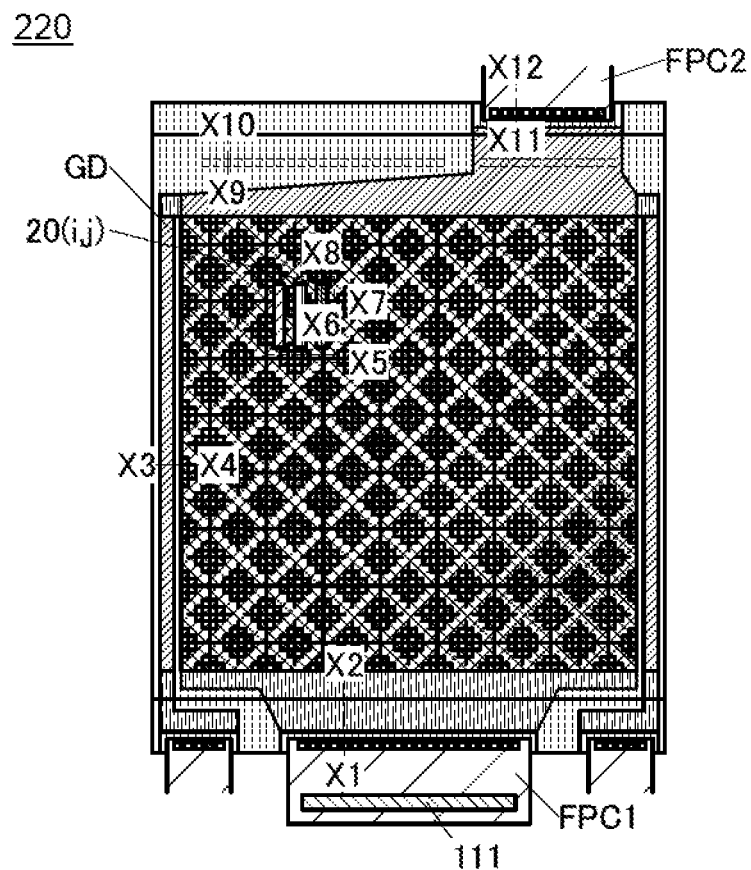
FIGS. 23A and 23B are a top view illustrating a display device and a schematic view illustrating part of an input portion of the display device.
Figure 23B:
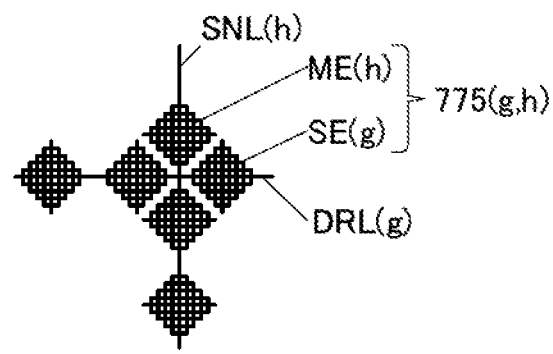

FIG. 22 is a block diagram showing the structure of the display device 10 including the touch sensor unit 149 and the display 110. Note that the touch sensor unit 149 and the display 110 are collectively referred to as a display unit 240. FIG. 23A is a top view of the display unit 240. FIG. 23B is a schematic view showing part of an input portion of the display unit 240.

The touch sensor unit 149 includes the touch sensor 140, the touch sensor driver 146, and the sensing circuit 147 (see FIG. 22).

The touch sensor 140 includes a group of sensing elements $775(g,1)$ to $775(g,q)$ and another group of sensing elements $775(1,h)$ to $775(p,h)$. Note that g is an integer greater than or equal to 1 and less than or equal to p, h is an integer greater than or equal to 1 and less than or equal to q, and each of p and q is an integer greater than or equal to 1.

The group of sensing elements $775(g,1)$ to $775(g,q)$ include the sensing element $775(g,h)$ and are arranged in the row direction (indicated by the arrow R2 in the drawing).

The group of sensing elements $775(1,h)$ to $775(p,h)$ include the sensing element $775(g,h)$ and are provided in the column direction (the direction indicated by the arrow C2 in the drawing) that intersects the row direction.

The group of sensing elements 775(g,1) to 775(g,q) provided in the row direction include an electrode SE(g) that is electrically connected to the wiring DRL(g) (see FIG. 23B).

The group of sensing elements 775(1,h) to 775(p,h) provided in the column direction include an electrode ME(h) that is electrically connected to the wiring SNL(h) (see FIG. 23B).

The electrode SE(g) and the electrode ME(h) preferably have light-transmitting properties.

The wiring DRL(g) has a function of supplying a control signal. The wiring SNL(h) has a function of receiving a sensor signal.

The electrode ME(h) is provided so that an electric field can be formed between the electrode ME(h) and the electrode SE(g). When an object such as a finger approaches the touch sensor 140, the electric field is blocked, and the sensing element 775(g,h) supplies the sensor signal.

The touch sensor driver 146 is electrically connected to the wiring DRL(g) and has a function of supplying the control signal. For example, a rectangular wave, a sawtooth wave, a triangular wave, or the like can be used for the control signal.

The sensing circuit 147 is electrically connected to the wiring SNL(h) and has a function of supplying the sensor signal on the basis of change in the potential of the wiring SNL(h). Note that the sensor signal includes, for example, positional information.

The sensor signal is supplied to the controller 100. The controller 100 supplies information corresponding to the sensor signal to the host 230 to update the image displayed with the pixel array 113.

Figure 24A:
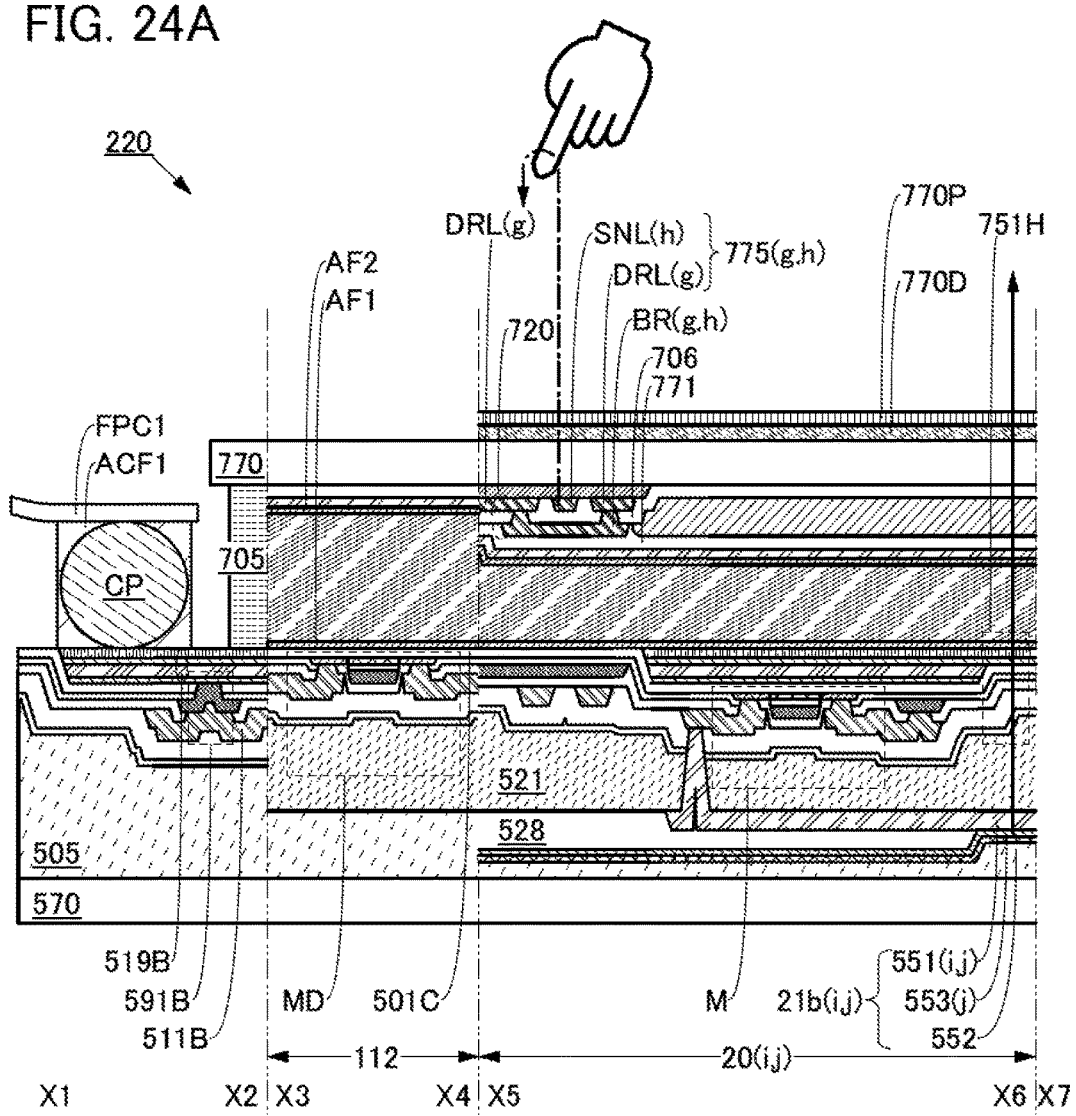
FIGS. 24A and 24B are cross-sectional views illustrating a structure example of a display device.
Figure 24B:
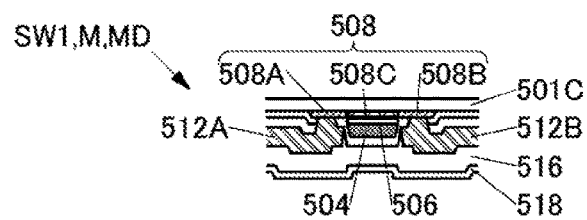
Figure 25:
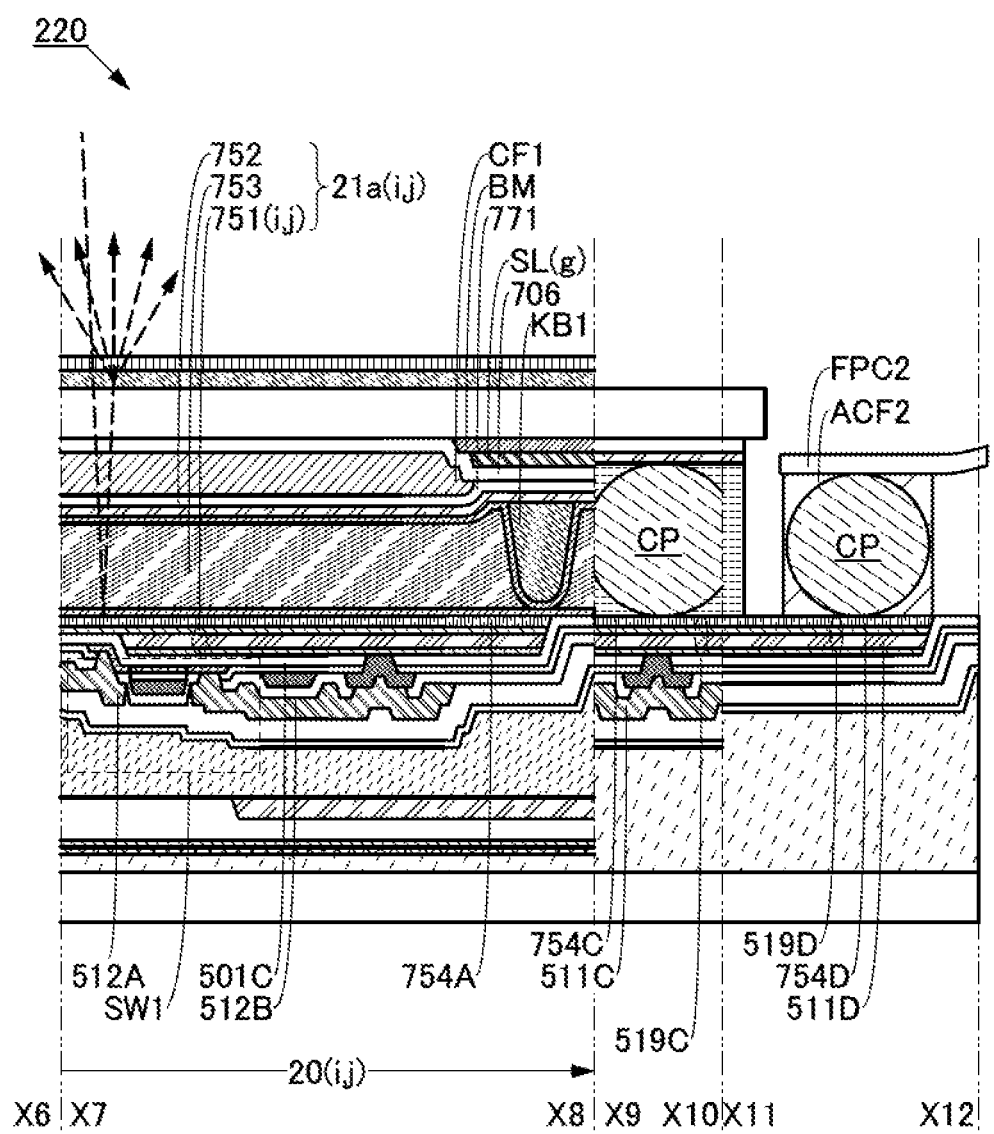
FIG. 25 is a cross-sectional view illustrating a structure example of a display device.

FIGS. 24A and 24B and FIG. 25 illustrate the structure of the display unit 240. FIG. 24A is a cross-sectional view taken along lines X1-X2, X3-X4, and X5-X6 in FIG. 23A. FIG. 24B is a cross-sectional view illustrating part of the structure illustrated in FIG. 24A.

FIG. 25 is a cross-sectional view taken along lines X7-X8, X9-X10, and X11-X12 in FIG. 23A.

The display unit 240 is different from, for example, the display 110 in Embodiment 2 in including a functional layer 720 and a top-gate transistor. Different structures will be described in detail below, and the above description is referred to for the other similar structures.

The functional layer 720 includes a region surrounded by the substrate 770, the insulating film 501C, and the sealant 705 (FIGS. 24A and 24B).

The functional layer 720 includes the wiring DRL(g), the wiring SNL(h), and the sensing element 775(g,h).

The gap between the wiring DRL(g) and the electrode 752 or between the wiring SNL(h) and the electrode 752 is greater than or equal to 0.2 µm and less than or equal to 16 µm, preferably greater than or equal to 1 µm and less than or equal to 8 µm, and further preferably greater than or equal to 2.5 µm and less than or equal to 4 µm.

The display unit 240 includes a conductive film 511D (see FIG. 25).

Note that a conductive material CP or the like can be provided between the wiring DRL(g) and the conductive film 511D to electrically connect the wiring DRL(g) and the conductive film 511D. Alternatively, the conductive material CP or the like can be provided between the wiring SNL(h) and the conductive film 511D to electrically connect the wiring SNL(h) and the conductive film 511D. A material that can be used for the wiring or the like can be used for the conductive film 511D, for example.

The display unit 240 includes a terminal 519D (see FIG. 25).

The terminal 519D is provided with the conductive film 511D and an intermediate film 754D, and the intermediate film 754D includes a region in contact with the conductive film 511D.

A material that can be used for the wiring or the like can be used for the terminal 519D, for example. Specifically, the terminal 519D can have the same structure as the terminal 519B or the terminal 519C.

Note that the terminal 519D can be electrically connected to a flexible printed circuit FPC2 using a conductive material ACF2, for example. Thus, a control signal can be supplied to the wiring DRL(g) with the use of the terminal 519D, for example. Alternatively, a sensor signal can be supplied from the wiring SNL(h) with the use of the terminal 519D.

A transistor that can be used as the switch SW1, the transistor M, and the transistor MD each include the conductive film 504 having a region overlapping with the insulating film 501C and the metal oxide film 508 having a region sandwiched between the insulating film 501C and the conductive film 504. Note that the conductive film 504 functions as a gate electrode (see FIG. 24B).

The metal oxide film 508 includes a first region 508A, a second region 508B, and a third region 508C. The first region 508A and the second region 508B do not overlap with the conductive film 504. The third region 508C is positioned between the first region 508A and the second region 508B and overlaps with the conductive film 504.

The transistor MD includes the insulating film 506 between the third region 508C and the conductive film 504. Note that the insulating film 506 functions as a gate insulating film.

The first region 508A and the second region 508B have a lower resistivity than the third region 508C, and function as a source region and a drain region.

For example, a metal oxide film is subjected to plasma treatment using a gas including a rare gas, so that the first region 508A and the second region 508B can be formed in the metal oxide film 508.

For example, the conductive film 504 can be used for a mask. Thus, part of the third region 508C can be formed into a shape of an end of the conductive film 504 in a self-aligned manner.

The transistor MD includes the conductive film 512A and the conductive film 512B that are in contact with the first region 508A and the second region 508B, respectively. The conductive film 512A and the conductive film 512B function as a source electrode and a drain electrode.

A transistor that can be formed in the same process as the transistor MD can be used as the transistor M, for example.

At least part of this embodiment can be implemented in combination with any of the other embodiments described in this specification as appropriate.

Embodiment 4

In this embodiment, the physical properties and the like of liquid crystal layers that can be suitably used for a display device including a liquid crystal layer will be described. Note that image persistence induced by the liquid crystal layers, the dipole moment of the liquid crystal layer, and the like will be described in detail in this embodiment.

First, the dielectric constant anisotropy of the liquid crystal layers is described with reference to FIG. 26.

Described in this embodiment is image persistence in the display devices whose liquid crystal layers include materials with different values of dielectric constant anisotropy.

In one display device, the liquid crystal material (Material 1) of the liquid crystal layer has a dielectric constant anisotropy of 3.85. In the other display device, the liquid crystal material (Material 2) of the liquid crystal layer has a dielectric constant anisotropy of 2.2.

Image persistence in the display devices is examined by measuring a gray-level deviation between halftone display following white display (White→Halftone) with respect to a gray level in continuous halftone display (Halftone→Halftone) and halftone display following black display (Black→Halftone) with respect to a gray level in continuous halftone display. FIG. 26 shows the results of measuring the changes in gray level after the black and white displays. In FIG. 26, the vertical axis and the horizontal axis represent the change in the gray level and the time elapsed since writing the halftone display, respectively.

Figure 26:
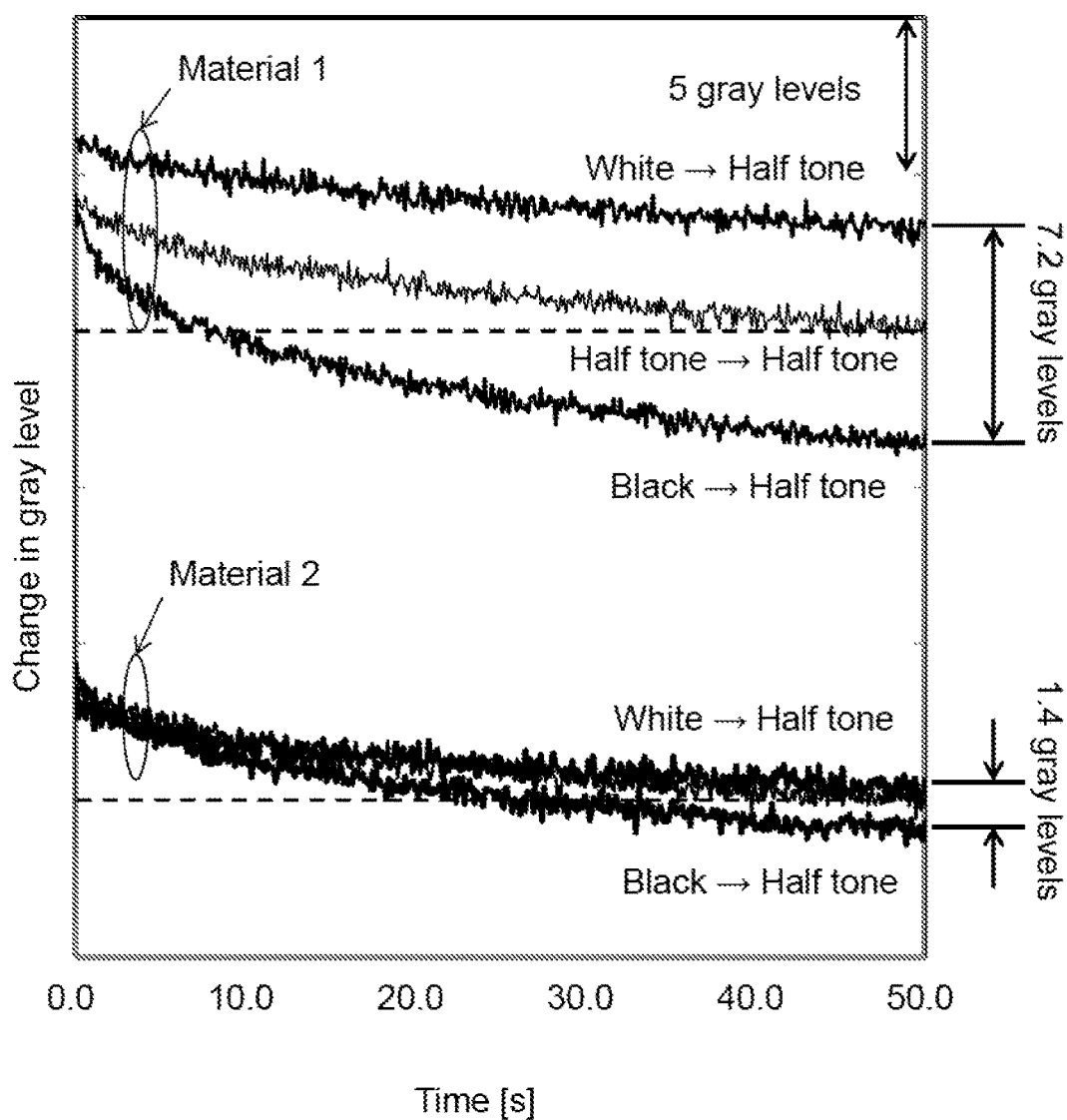
FIG. 26 is a graph showing a change in gray-level in a display device including a liquid crystal layer before and after halftone display.

As can be seen from the results in FIG. 26, the liquid crystal material (Material 1) with a dielectric constant anisotropy of 3.85 has a deviation of 7.2 gray levels between White→Halftone and Black→Halftone. The liquid crystal material (Material 2) with a dielectric constant anisotropy of 2.2 has a deviation of 1.4 gray levels between White→Halftone and Black→Halftone. Note that in FIG. 26, the data of the continuous halftone display (Halftone→Halftone) of the liquid crystal material (Material 2) with a dielectric constant anisotropy of 2.2 is overlapped over the data of the halftone display following the white display (White→Halftone).

The results in FIG. 26 indicate that the use of a material with low dielectric constant anisotropy for a liquid crystal layer inhibits a gray-level deviation.

Note that the acceptable deviation in gray level for displaying the same still image is 0 or more and 3 or less when the image is displayed by controlling 256 levels of transmittance, for example. When the deviation in gray level for displaying the same still image is 0 or more and 3 or less, viewers hardly perceive flickers. As another example, when the image is displayed by controlling 1024 levels of transmittance, the acceptable deviation in gray level is 0 or more and 12 or less. That is, the acceptable range of a deviation in gray level for displaying the same still image is preferably greater than or equal to 1% and less than or equal to 1.2% of the maximum gray levels.

Next, the dipole moment of a liquid crystal layer is described with reference to FIG. 27. The graph in FIG. 27 shows the relation between the dipole moment of molecules and the resistivity.

Figure 27:
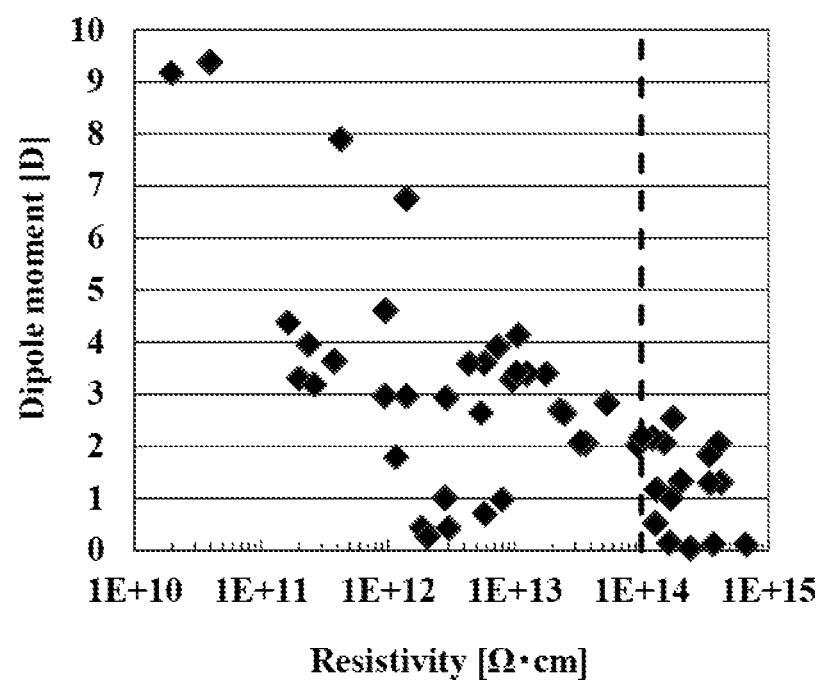
FIG. 27 is a graph showing a relation between resistivity of a liquid crystal layer and dipole moment of molecules in the liquid crystal layer.

The vertical axis of the graph in FIG. 27 represents the dipole moment of a molecule. For measurement of the values in FIG. 27, an additive material is mixed into a mother liquid crystal to form the liquid crystal layer. The dipole moment is that of a molecule of the additive material. The horizontal axis in FIG. 27 represents the resistivity of the liquid crystal layer, i.e., the mixture of the mother liquid crystal and the additive material. As for a mixing ratio of the mother liquid crystal and the additive material, the ratio of the additive material to the entire mixed material is 20 weight %. Hereinafter, the mixture of the mother liquid crystal and the additive material is referred to as a mixed liquid crystal. The relation between the dipole moment of a molecule of an additive material and the resistivity of a mixed liquid crystal including the additive material is examined with various kinds of the additive materials added to the mother liquid crystal. The dots in FIG. 27 show the results.

In FIG. 27, the smaller the dipole moment of the molecule of the additive material is, the higher the resistivity of the mixed liquid crystal is. In other words, the larger the dipole moment of the additive material is, the lower the resistivity is.

According to FIG. 27, the resistivity of a mixed liquid crystal in which the molecule of the additive material has a dipole moment of less than or equal to 3 debye is higher than or equal to $1.0 \times 10^{14}$ Ω·cm. The smaller the dipole moment of the molecule of the additive material is, the higher the resistivity is. For example, when the molecule structure is symmetric with respect to the center of the molecule, there is no distribution deviation of electric charges and thus the dipole moment is zero. For this reason, in the display device of one embodiment of the present invention, the eternal dipole moment of the molecule of the additive material is preferably greater than or equal to 0 debye and less than or equal to 3 debye. The resistivity is preferably higher than or equal to $1.0 \times 10^{14}$ Ω·cm.

At least part of this embodiment can be implemented in combination with any of the other embodiments described in this specification as appropriate.

Embodiment 5

Described in this embodiment is the composition of a CAC-OS applicable to a transistor disclosed in one embodiment of the present invention.

The CAC-OS has, for example, a composition in which elements included in a metal oxide are unevenly distributed. Materials including unevenly distributed elements each have a size of greater than or equal to 0.5 nm and less than or equal to 10 nm, preferably greater than or equal to 1 nm and less than or equal to 2 nm, or a similar size. Note that in the following description of a metal oxide, a state in which one or more metal elements are unevenly distributed and regions including the metal element(s) are mixed is referred to as a mosaic pattern or a patch-like pattern. The region has a size of greater than or equal to 0.5 nm and less than or equal to 10 nm, preferably greater than or equal to 1 nm and less than or equal to 2 nm, or a similar size.

Note that a metal oxide preferably contains at least indium. In particular, indium and zinc are preferably contained. In addition, aluminum, gallium, yttrium, copper, vanadium, beryllium, boron, silicon, titanium, iron, nickel, germanium, zirconium, molybdenum, lanthanum, cerium, neodymium, hafnium, tantalum, tungsten, magnesium, and the like may be contained.

For example, of the CAC-OS, an In—Ga—Zn oxide with the CAC composition (such an In—Ga—Zn oxide may be particularly referred to as CAC-IGZO) has a composition in which materials are separated into indium oxide ($InO_{X1}$, where X1 is a real number greater than 0) or indium zinc oxide ($In_{X2}Zn_{Y2}O_{Z2}$, where X2, Y2, and Z2 are real numbers greater than 0), and gallium oxide ($GaO_{X3}$, where X3 is a real number greater than 0) or the like, gallium zinc oxide ($Ga_{X4}Zn_{Y4}O_{Z4}$, where X4, Y4, and Z4 are real numbers greater than 0), and a mosaic pattern is formed. Then, $InO_{X1}$ or $In_{X2}Zn_{Y2}O_{Z2}$ forming the mosaic pattern is evenly distributed in the film. This composition is also referred to as a cloud-like composition.

That is, the CAC-OS is a composite metal oxide with a composition in which a region including $GaO_{X3}$ as a main component and a region including $In_{X2}Zn_{Y2}O_{Z2}$ or $InO_{X1}$ as a main component are mixed. Note that in this specification, for example, when the atomic ratio of In to an element M in a first region is greater than the atomic ratio of In to an element M in a second region, the first region has higher In concentration than the second region.

Note that a compound including In, Ga, Zn, and O is also known as IGZO. Typical examples of IGZO include a crystalline compound represented by $InGaO_3(ZnO)_{m1}$ (m1 is an integer of one or more) and a crystalline compound represented by $In_{(1+x0)}Ga_{(1-x0)}O_3(ZnO)_{m0}$ ($-1 \le x0 \le 1$; m0 is a given number).

The above crystalline compounds have a single crystal structure, a polycrystalline structure, or a CAAC structure. Note that the CAAC structure is a crystal structure in which a plurality of IGZO nanocrystals have c-axis alignment and are connected in the a-b plane direction without alignment.

On the other hand, the CAC-OS relates to the material composition of a metal oxide. In a material composition of a CAC-OS including In, Ga, Zn, and O, nanoparticle regions including Ga as a main component are observed in part of the CAC-OS and nanoparticle regions including In as a main component are observed in part thereof. These nanoparticle regions are randomly dispersed to form a mosaic pattern. Therefore, the crystal structure is a secondary element for the CAC-OS.

Note that in the CAC-OS, a stacked-layer structure including two or more films with different atomic ratios is not included. For example, a two-layer structure of a film including In as a main component and a film including Ga as a main component is not included.

A boundary between the region including $GaO_{X3}$ as a main component and the region including $In_{X2}Zn_{Y2}O_{Z2}$ or $InO_{X1}$ as a main component is not clearly observed in some cases.

In the case where one or more of aluminum, yttrium, copper, vanadium, beryllium, boron, silicon, titanium, iron, nickel, germanium, zirconium, molybdenum, lanthanum, cerium, neodymium, hafnium, tantalum, tungsten, magnesium, and the like are contained instead of gallium in a CAC-OS, nanoparticle regions including the selected metal element(s) as a main component(s) are observed in part of the CAC-OS and nanoparticle regions including In as a main component are observed in part thereof, and these nanoparticle regions are randomly dispersed to form a mosaic pattern in the CAC-OS.

The CAC-OS can be formed by a sputtering method under conditions where a substrate is not heated intentionally, for example. In the case of forming the CAC-OS by a sputtering method, one or more selected from an inert gas (typically, argon), an oxygen gas, and a nitrogen gas may be used as a deposition gas. The ratio of the flow rate of an oxygen gas to the total flow rate of the deposition gas at the time of deposition is preferably as low as possible, and for example, the flow ratio of an oxygen gas is preferably higher than or equal to 0% and less than 30%, further preferably higher than or equal to 0% and less than or equal to 10%.

The CAC-OS is characterized in that no clear peak is observed in measurement using θ/2θ scan by an out-of-plane method, which is an X-ray diffraction (XRD) measurement method. That is, X-ray diffraction shows no alignment in the a-b plane direction and the c-axis direction in a measured region.

In an electron diffraction pattern of the CAC-OS which is obtained by irradiation with an electron beam with a probe diameter of 1 nm (also referred to as a nanometer-sized electron beam), a ring-like region with high luminance and a plurality of bright spots in the ring-like region are observed. Therefore, the electron diffraction pattern indicates that the crystal structure of the CAC-OS includes a nanocrystal (nc) structure with no alignment in plan-view and cross-sectional directions.

For example, an energy dispersive X-ray spectroscopy (EDX) mapping image confirms that an In—Ga—Zn oxide with the CAC composition has a structure in which a region including $GaO_{X3}$ as a main component and a region including $In_{X2}Zn_{Y2}O_{Z2}$ or $InO_{X1}$ as a main component are unevenly distributed and mixed.

The CAC-OS has a structure different from that of an IGZO compound in which metal elements are evenly distributed, and has characteristics different from those of the IGZO compound. That is, in the CAC-OS, regions including $GaO_{X3}$ or the like as a main component and regions including $In_{X2}Zn_{Y2}O_{Z2}$ or $InO_{X1}$ as a main component are separated to form a mosaic pattern.

The conductivity of a region including $In_{X2}Zn_{Y2}O_{Z2}$ or $InO_{X1}$ as a main component is higher than that of a region including $GaO_{X3}$ or the like as a main component. In other words, when carriers flow through regions including $In_{X2}Zn_{Y2}O_{Z2}$ or $InO_{X1}$ as a main component, the conductivity of a metal oxide is generated. Accordingly, when regions including $In_{X2}Zn_{Y2}O_{Z2}$ or $InO_{X1}$ as a main component are distributed in a metal oxide like a cloud, high field-effect mobility (μ) can be achieved.

In contrast, the insulating property of a region including $GaO_{X3}$ or the like as a main component is higher than that of a region including $In_{X2}Zn_{Y2}O_{Z2}$ or $InO_{X1}$ as a main component. In other words, when regions including $GaO_{X3}$ or the like as a main component are distributed in a metal oxide, leakage current can be suppressed and favorable switching operation can be achieved.

Accordingly, when a CAC-OS is used for a semiconductor element, the insulating property derived from $GaO_{X3}$ or the like and the conductivity derived from $In_{X2}Zn_{Y2}O_{Z2}$ or $InO_{X1}$ complement each other, whereby high on-state current (Ion) and high field-effect mobility (μ) can be achieved.

A semiconductor element including a CAC-OS has high reliability. Thus, the CAC-OS is suitably used in a variety of semiconductor devices typified by a display.

At least part of this embodiment can be implemented in combination with any of the other embodiments described in this specification as appropriate.

Embodiment 6

In this embodiment, a display module that can be fabricated using one embodiment of the present invention will be described with reference to FIG. 28.

Figure 28:
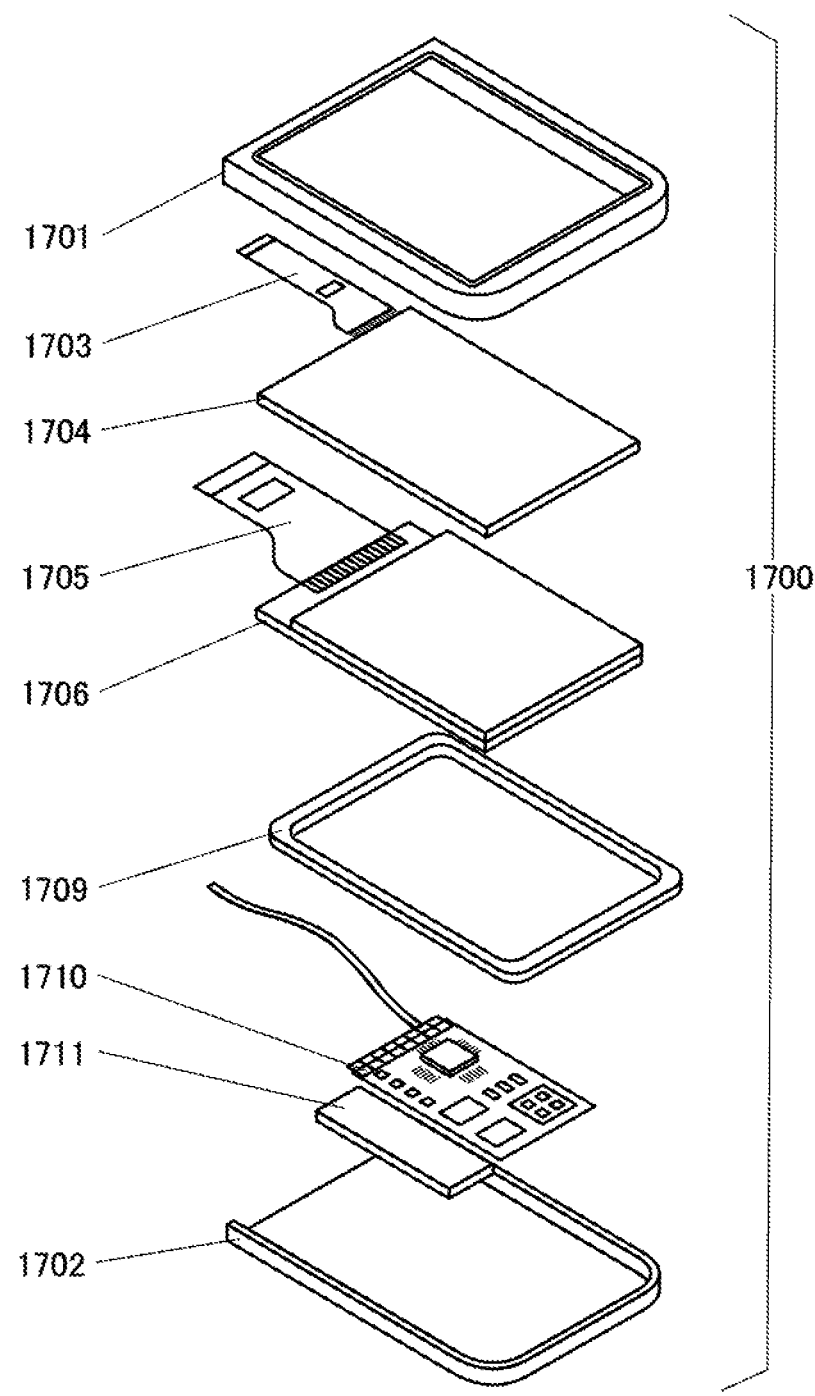
FIG. 28 is a perspective view illustrating a structure example of a display module.

In a display module 1700 in FIG. 28, a touch panel 1704 connected to an FPC 1703, a display panel 1706 connected to an FPC 1705, a frame 1709, a printed circuit board 1710, and a battery 1711 are provided between an upper cover 1701 and a lower cover 1702.

The display device of one embodiment of the present invention can be used for, for example, the display panel 1706. Accordingly, the display module 1700 can be reduced in size.

The shapes and sizes of the upper cover 1701 and the lower cover 1702 can be changed as appropriate in accordance with the sizes of the touch panel 1704 and the display panel 1706.

The touch panel 1704 can be a resistive touch panel or a capacitive touch panel and may be formed to overlap with the display panel 1706. Instead of providing the touch panel 1704, the display panel 1706 can have a touch panel function.

The frame 1709 protects the display panel 1706 and functions as an electromagnetic shield for blocking electromagnetic waves generated by the operation of the printed circuit board 1710. The frame 1709 may also function as a radiator plate.

The printed circuit board 1710 has a power supply circuit and a signal processing circuit for outputting a video signal and a clock signal. As a power source for supplying power to the power supply circuit, an external commercial power source or a power source using the battery 1711 provided separately may be used. The battery 1711 can be omitted in the case of using a commercial power source.

The display module 1700 may be additionally provided with a member such as a polarizing plate, a retardation plate, or a prism sheet.

At least part of this embodiment can be implemented in combination with any of the other embodiments described in this specification as appropriate.

Embodiment 7

In this embodiment, electronic devices including the display device of one embodiment of the present invention will be described with reference to FIGS. 29A to 29D.

The electronic devices illustrated in FIGS. 29A to 29D can have a variety of functions. For example, the electronic devices illustrated in FIGS. 29A to 29D can have a variety of functions, for example, a function of displaying a variety of information (a still image, a moving image, a text image, and the like) on the display portion, a touch panel function, a function of displaying a calendar, date, time, and the like, a function of controlling processing with a variety of software (programs), a wireless communication function, a function of connecting to a variety of computer networks with a wireless communication function, a function of transmitting and receiving a variety of data with a wireless communication function, and a function of reading a program or data stored in a storage medium and displaying the program or data on the display portion. Furthermore, the electronic device including a plurality of display portions can have a function of displaying image information mainly on one display portion while displaying text information mainly on another display portion, a function of displaying a three-dimensional image by displaying images on a plurality of display portions with a parallax taken into account, or the like. Furthermore, the electronic device including an image receiving portion can have a function of shooting a still image, a function of taking moving images, a function of automatically or manually correcting a shot image, a function of storing a shot image in a recording medium (an external recording medium or a recording medium incorporated in the camera), a function of displaying a shot image on the display portion, or the like. Note that functions of the electronic devices in FIGS. 29A to 29D are not limited thereto, and the electronic devices can have a variety of functions.

Figure 29A:
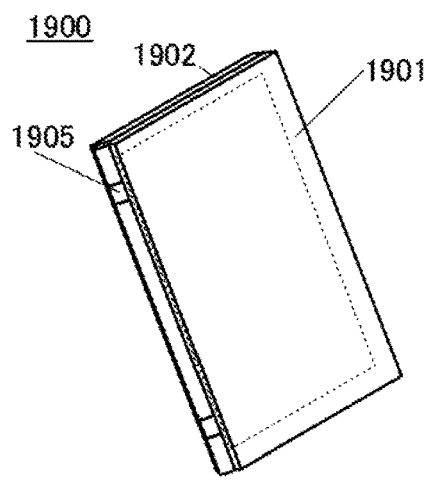
FIGS. 29A to 29D are perspective views each illustrating an example of an electronic device.
Figure 29B:
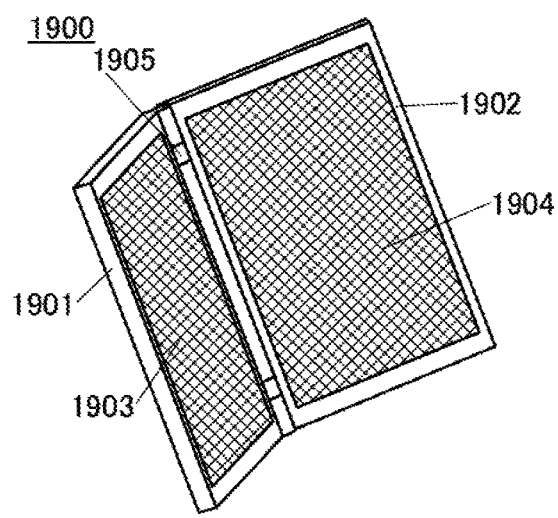

FIGS. 29A and 29B illustrate an example of an information terminal 1900. The information terminal 1900 includes a housing 1901, a housing 1902, a display portion 1903, a display portion 1904, and a hinge 1905, for example.

The housing 1901 and the housing 1902 are joined together with the hinge 1905. The information terminal 1900 can be changed from a folded state illustrated in FIG. 29A to an opened state illustrated in FIG. 29B.

For example, text information can be displayed on the display portion 1903 and the display portion 1904; thus, the information terminal 1900 can be used as an e-book reader.

For example, the information terminal 1900 can be used as a textbook. The display portion 1903 and the display portion 1904 each can display a still image or a moving image.

In this manner, the information terminal 1900 has high versatility because it can be folded when carried.

Note that the housing 1901 and the housing 1902 may have a power button, an operation button, an external connection port, a speaker, a microphone, and the like.

The information terminal 1900 that includes the display device of one embodiment of the present invention can be reduced in size.

Figure 29C:
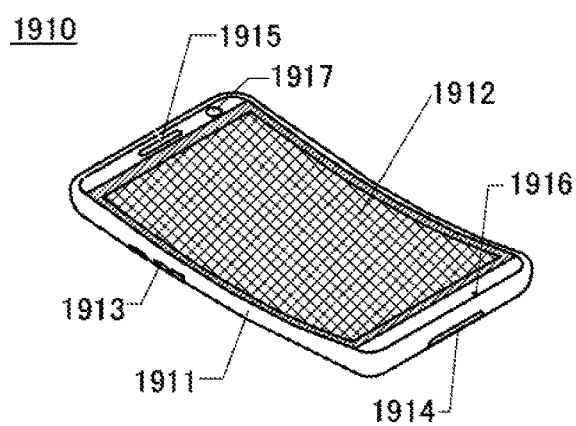

FIG. 29C shows an example of an information terminal. An information terminal 1910 shown in FIG. 29C includes a housing 1911, a display portion 1912, an operation button 1913, an external connection port 1914, a speaker 1915, a microphone 1916, and a camera 1917, for example.

The information terminal 1910 includes a touch sensor in the display portion 1912. Moreover, operations such as making a call and inputting a letter can be performed by touch on the display portion 1912 with a finger, a stylus, or the like.

The power can be turned on or off with the operation button 1913. In addition, types of images displayed on the display portion 1912 can be switched; for example, switching images from a mail creation screen to a main menu screen is performed with the operation button 1913.

When a detection device such as a gyroscope sensor or an acceleration sensor is provided inside the information terminal 1910, the direction of display on the screen of the display portion 1912 can be automatically changed by determining the orientation of the information terminal 1910 (whether the information terminal 1910 is placed horizontally or vertically). Furthermore, the direction of display on the screen can be changed by touch on the display portion 1912, operation with the operation button 1913, sound input using the microphone 1916, or the like.

The information terminal 1910 has one or more of a telephone function, a notebook function, an information browsing function, and the like, for example. Specifically, the information terminal can be used as a smartphone. The information terminal 1910 is capable of executing a variety of applications such as mobile phone calls, e-mailing, viewing and editing texts, music reproduction, video replay, Internet communication, and games.

The information terminal 1910 that includes the display device of one embodiment of the present invention can be reduced in size.

Figure 29D:
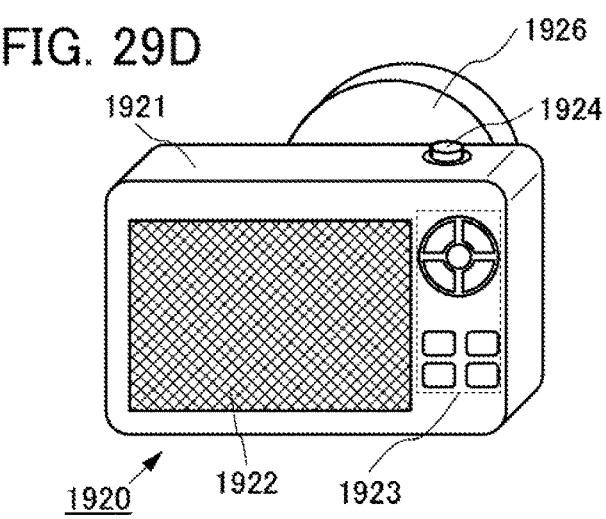

FIG. 29D illustrates an example of a camera. A camera 1920 includes a housing 1921, a display portion 1922, operation buttons 1923, and a shutter button 1924, for example. Furthermore, an attachable/detachable lens 1926 is attached to the camera 1920.

Although the lens 1926 of the camera 1920 here is detachable from the housing 1921 for replacement, the lens 1926 may be included in the housing.

Still and moving images can be taken with the camera 1920 at the press of the shutter button 1924. In addition, images can be taken at the touch of the display portion 1922 that serves as a touch panel.

Note that a stroboscope, a viewfinder, or the like can be additionally provided in the camera 1920. Alternatively, these may be included in the housing 1921.

The camera 1920 that includes the display device of one embodiment of the present invention can be reduced in size.

At least part of this embodiment can be implemented in combination with any of the other embodiments described in this specification as appropriate.

This application is based on Japanese Patent Application Serial No. 2016-191171 filed with Japan Patent Office on Sep. 29, 2016, the entire contents of which are hereby incorporated by reference.

What is claimed is:

1. A semiconductor device comprising:
a first register;
first and second switches;
first and second memory circuits;
a controller; and
a display,
wherein an output terminal of the first register is electrically connected to the first and second switches,
wherein the first and second switches are electrically connected to the first and second memory circuits,
wherein the first register is configured to retain data corresponding to a parameter used when the controller operates,
wherein the first and second switches are configured to select one of the first and second memory circuits to which the data retained in the first register is to be output,
wherein the one of the first and second memory circuits is configured to retain the data output from the first register, and
wherein the controller is configured to read the data retained in the one of the first and second memory circuits to control operation of the display.

2. The semiconductor device according to claim 1, further comprising a first circuit, wherein the first circuit is configured to select one of the first and second switches that is to be turned on.

3. The semiconductor device according to claim 1, further comprising a second register, wherein the second register is configured to retain data comprising information on one of the first and second switches that is to be turned on.

4. The semiconductor device according to claim 1,
wherein the first and second memory circuits each comprise a backup circuit, and
wherein the backup circuit is configured to, when power supply to the first and second memory circuits is stopped, retain the data output from the first register.

5. The semiconductor device according to claim 4,
wherein the backup circuit comprises a transistor, and
wherein the transistor comprises a metal oxide in a channel formation region.

6. An electronic device comprising:
the semiconductor device according to claim 1; and
an operation button.

7. A semiconductor device comprising:
a first register;
first and second switches;
first and second memory circuits;
a controller; and
a display,
wherein an output terminal of the first register is electrically connected to a first terminal of the first switch and a first terminal of the second switch,
wherein a second terminal of the first switch is electrically connected to the first memory circuit,
wherein a second terminal of the second switch is electrically connected to the second memory circuit,
wherein the first and second switches are configured to select one of the first and second memory circuits to which data retained in the first register is to be output, and
wherein the controller is configured to read the data retained in the one of the first and second memory circuits to control operation of the display.

8. The semiconductor device according to claim 7, further comprising a first circuit, wherein the first circuit is configured to select one of the first and second switches that is to be turned on.

9. The semiconductor device according to claim 7, further comprising a second register, wherein the second register is configured to retain data comprising information on one of the first and second switches that is to be turned on.

10. The semiconductor device according to claim 7,
wherein the first and second memory circuits each comprise a backup circuit, and
wherein the backup circuit is configured to, when power supply to the first and second memory circuits is stopped, retain the data output from the first register.

11. The semiconductor device according to claim 10,
wherein the backup circuit comprises a transistor, and
wherein the transistor comprises a metal oxide in a channel formation region.

12. An electronic device comprising:
the semiconductor device according to claim 7; and
an operation button.

* * * * *